(12) United States Patent
Mascari

(10) Patent No.: US 9,999,986 B2
(45) Date of Patent: Jun. 19, 2018

(54) POWER OPERATED ROTARY KNIFE WITH VACUUM ATTACHMENT ASSEMBLY

(71) Applicant: Bettcher Industries, Inc., Birmingham, OH (US)

(72) Inventor: Nicholas A. Mascari, Wellington, OH (US)

(73) Assignee: Bettcher Industries, Inc., Birmingham, OH (US)

(*) Notice: Subject to any disclaimer, the term of this patent is extended or adjusted under 35 U.S.C. 154(b) by 0 days. days.

(21) Appl. No.: 15/424,808

(22) Filed: Feb. 4, 2017

(65) Prior Publication Data

US 2017/0210024 A1 Jul. 27, 2017

Related U.S. Application Data

(63) Continuation-in-part of application No. 15/269,600, filed on Sep. 19, 2016, which is a continuation of
(Continued)

(51) Int. Cl.
*B26B 25/00* (2006.01)
*B26D 7/18* (2006.01)
(Continued)

(52) U.S. Cl.
CPC .......... *B26D 7/1863* (2013.01); *A22B 5/0017* (2013.01); *A22C 17/0006* (2013.01); *B26B 25/002* (2013.01)

(58) Field of Classification Search
CPC ... B26D 7/1863; A22B 5/0017; B26B 25/002; A22C 17/0006
See application file for complete search history.

(56) References Cited

U.S. PATENT DOCUMENTS 1,476,345 A * 12/1923 McGee ................. F16C 23/043
384/275
1,545,835 A * 7/1925 Komow .................... C14B 5/00
144/150
(Continued)

FOREIGN PATENT DOCUMENTS

DE 4302912 A1 8/1994
DE 29512854 U1 10/1995
(Continued)

*Primary Examiner* — Sean Michalski
(74) *Attorney, Agent, or Firm* — Tarolli, Sundheim, Covell & Tummino LLP

(57) ABSTRACT

A power operated rotary knife including: a handle assembly, a head assembly and a vacuum attachment assembly. The handle assembly includes an elongated cylindrical handle housing defining a handle assembly longitudinal axis extending through a throughbore of the handle housing. The head assembly including a rotary knife blade having an intermediate driven gear, a blade housing supporting the knife blade for rotation and a frame having a lower section and an upper section. A lower section of the blade housing extending laterally from the lower section of the frame and an upper section of the blade housing extending laterally from the upper section of the frame and encircling an axially extending portion of the rotary knife blade adjacent the driven gear. The blade housing including a bearing assembly including a first bearing member disposed in the lower section and a second bearing member disposed in the upper section.

38 Claims, 29 Drawing Sheets

Related U.S. Application Data application No. 14/446,005, filed on Jul. 29, 2014, now Pat. No. 9,452,541, application No. 15/424,808, which is a continuation-in-part of application No. 14/811,221, filed on Jul. 28, 2015, now Pat. No. 9,579,810.

(51) Int. Cl.
*A22C 17/00* (2006.01)
*A22B 5/00* (2006.01)

(56) References Cited

U.S. PATENT DOCUMENTS

| | | | | |
|---|---|---|---|---|
| 2,656,012 A * | 10/1953 | Thorpe | ...................... | F16N 3/12 |
| | | | | 184/5.1 |
| 2,827,657 A * | 3/1958 | Bettcher | ................ | A22C 17/04 |
| | | | | 30/263 |
| 3,024,532 A * | 3/1962 | Bettcher | ............... | B26B 25/002 |
| | | | | 30/276 |
| 3,147,513 A * | 9/1964 | Schneider | ............. | A22B 5/0094 |
| | | | | 452/122 |
| 3,214,869 A | 11/1965 | Stryker | | |
| 3,269,010 A * | 8/1966 | Bettcher | ................ | A22C 17/04 |
| | | | | 30/276 |
| 3,461,557 A * | 8/1969 | Behring | ............... | B26B 25/002 |
| | | | | 30/276 |
| 3,688,403 A * | 9/1972 | Bettcher | ............... | B26B 25/002 |
| | | | | 30/276 |
| 3,816,875 A * | 6/1974 | Duncan | .................... | B26D 1/15 |
| | | | | 452/149 |
| 3,852,882 A * | 12/1974 | Bettcher | ............... | A22B 5/165 |
| | | | | 30/276 |
| 4,170,063 A | 10/1979 | Bettcher | | |
| 4,178,683 A * | 12/1979 | Bettcher | ............... | B26B 25/002 |
| | | | | 30/276 |
| 4,198,750 A * | 4/1980 | Bettcher | ............... | B26B 25/002 |
| | | | | 30/276 |
| 4,236,531 A | 12/1980 | McCullough | | |
| 4,336,651 A * | 6/1982 | Caro | ...................... | B26B 21/00 |
| | | | | 30/49 |
| 4,363,170 A * | 12/1982 | McCullough | ......... | B26B 25/002 |
| | | | | 30/276 |
| 4,422,239 A | 12/1983 | Maier | | |
| 4,439,934 A | 4/1984 | Brown | | |
| 4,494,311 A * | 1/1985 | McCullough | ......... | B26B 25/002 |
| | | | | 30/276 |
| 4,509,261 A * | 4/1985 | Bettcher | ............... | B26B 25/002 |
| | | | | 30/276 |
| 4,516,323 A * | 5/1985 | Bettcher | ............... | B26B 25/002 |
| | | | | 30/276 |
| 4,575,937 A * | 3/1986 | McCullough | ......... | B26B 25/002 |
| | | | | 30/276 |
| 4,575,938 A * | 3/1986 | McCullough | ......... | B26B 25/002 |
| | | | | 30/276 |
| 4,590,576 A * | 5/1986 | Elpiner | ................ | G05D 7/0635 |
| | | | | 137/624.11 |
| 4,637,140 A | 1/1987 | Bettcher | | |
| 4,854,046 A * | 8/1989 | Decker | ................ | B26B 25/002 |
| | | | | 30/264 |
| 4,858,321 A * | 8/1989 | McCullough | ......... | B26B 25/002 |
| | | | | 30/276 |
| 4,865,473 A * | 9/1989 | De Vito | ............. | F16C 33/4635 |
| | | | | 384/572 |
| 4,942,665 A * | 7/1990 | McCullough | .......... | A22C 17/04 |
| | | | | 30/276 |
| 5,031,323 A * | 7/1991 | Honsa | .................... | B25F 5/021 |
| | | | | 30/276 |
| 5,033,876 A * | 7/1991 | Kraus | .................... | F16C 19/463 |
| | | | | 384/572 |
| 5,230,154 A * | 7/1993 | Decker | ................ | B26B 25/002 |
| | | | | 16/422 |
| 5,377,411 A | 1/1995 | Andriotis | | |
| 5,462,477 A * | 10/1995 | Ketels | .................. | A22C 17/004 |
| | | | | 269/22 |
| 5,499,492 A * | 3/1996 | Jameson | ............... | A01D 34/003 |
| | | | | 239/282 |
| 5,522,142 A * | 6/1996 | Whited | .................. | B26B 25/002 |
| | | | | 30/276 |
| 5,529,532 A * | 6/1996 | Desrosiers | ............. | A61C 13/12 |
| | | | | 30/276 |
| 5,582,041 A * | 12/1996 | Spiess | ..................... | C14B 19/00 |
| | | | | 30/276 |
| 5,664,332 A * | 9/1997 | Whited | .................. | B26B 25/002 |
| | | | | 30/276 |
| 5,680,704 A | 10/1997 | Okubo | | |
| 5,924,202 A | 7/1999 | Romani | | |
| 5,967,962 A * | 10/1999 | Huang | .................. | B26D 7/1863 |
| | | | | 493/199 |
| 6,013,079 A | 1/2000 | Salam | | |
| 6,105,253 A | 8/2000 | Kolbert | | |
| 6,219,922 B1 | 4/2001 | Campbell | | |
| 6,233,831 B1 | 5/2001 | Giichi | | |
| 6,247,847 B1 * | 6/2001 | Lob | ........................ | F16C 19/26 |
| | | | | 384/51 |
| 6,308,602 B1 * | 10/2001 | Gerber | ..................... | B26D 5/00 |
| | | | | 83/100 |
| 6,354,949 B1 | 3/2002 | Baris | | |
| 6,364,086 B1 * | 4/2002 | Blaurock | ............ | F16C 33/3825 |
| | | | | 193/35 MD |
| 6,413,157 B1 | 7/2002 | Marton | | |
| 6,655,033 B2 | 12/2003 | Herrmann | | |
| 6,665,940 B2 * | 12/2003 | Sanders | .................. | A01D 34/90 |
| | | | | 30/276 |
| 6,751,872 B1 * | 6/2004 | Whited | .................. | B26B 25/002 |
| | | | | 30/276 |
| 6,769,184 B1 * | 8/2004 | Whited | .................. | B26B 25/002 |
| | | | | 30/276 |
| 6,857,191 B2 | 2/2005 | Whited | | |
| 6,978,548 B2 | 12/2005 | Whited | | |
| 7,107,887 B2 | 9/2006 | Whited | | |
| 7,451,791 B2 * | 11/2008 | Cooper | ..................... | B25F 5/02 |
| | | | | 144/136.95 |
| 8,123,750 B2 * | 2/2012 | Norton | ............... | A61B 17/1631 |
| | | | | 606/114 |
| 8,726,524 B2 | 5/2014 | Whited | | |
| 8,745,881 B2 | 6/2014 | Thompson | | |
| 9,155,316 B2 | 10/2015 | Souli | | |
| 9,452,541 B2 | 9/2016 | Mascari | | |
| 9,579,810 B2 | 2/2017 | Mascari | | |
| 2002/0108255 A1 | 8/2002 | Degrogorio, Jr. | | |
| 2003/0131482 A1 * | 7/2003 | Long | ...................... | A22B 5/165 |
| | | | | 30/276 |
| 2004/0088864 A1 * | 5/2004 | Whited | .................. | B26B 25/002 |
| | | | | 30/123 |
| 2004/0211067 A1 | 10/2004 | Whited et al. | | |
| 2005/0217119 A1 * | 10/2005 | Rapp | ...................... | A22B 5/165 |
| | | | | 30/276 |
| 2006/0037200 A1 * | 2/2006 | Rosu | ..................... | B26B 25/002 |
| | | | | 30/276 |
| 2007/0283574 A1 * | 12/2007 | Levsen | .................. | A22B 5/165 |
| | | | | 30/276 |
| 2008/0022537 A1 * | 1/2008 | Clarke | ..................... | B23D 45/16 |
| | | | | 30/390 |
| 2008/0098605 A1 * | 5/2008 | Whited | .................. | B26B 25/002 |
| | | | | 30/276 |
| 2010/0101097 A1 * | 4/2010 | Thien | .................... | B26B 25/002 |
| | | | | 30/276 |
| 2010/0170097 A1 * | 7/2010 | Levsen | .................. | A22B 5/165 |
| | | | | 30/276 |
| 2011/0023674 A1 * | 2/2011 | Stasiewicz | ........... | B23D 59/006 |
| | | | | 83/112 |
| 2011/0185580 A1 * | 8/2011 | Whited | .................. | B26B 25/002 |
| | | | | 30/276 |
| 2011/0247220 A1 * | 10/2011 | Whited | .................. | B26B 25/002 |
| | | | | 30/276 |
| 2013/0087029 A1 * | 4/2013 | Iyatani | ................... | B26D 1/245 |
| | | | | 83/13 |
| 2013/0104336 A1 * | 5/2013 | Duan | ...................... | B28D 7/02 |
| | | | | 15/415.1 |

(56) References Cited

U.S. PATENT DOCUMENTS

| | | | |
|---|---|---|---|
| 2015/0183130 A1* | 7/2015 | Gadd | B24B 55/02 83/100 |
| 2015/0224666 A1* | 8/2015 | Lin | B23D 59/006 83/100 |
| 2016/0031103 A1* | 2/2016 | Mascari | B26B 25/002 30/124 |

FOREIGN PATENT DOCUMENTS

| | | |
|---|---|---|
| DE | 10217195 C1 | 10/2003 |
| EP | 1226907 | 11/2002 |

* cited by examiner

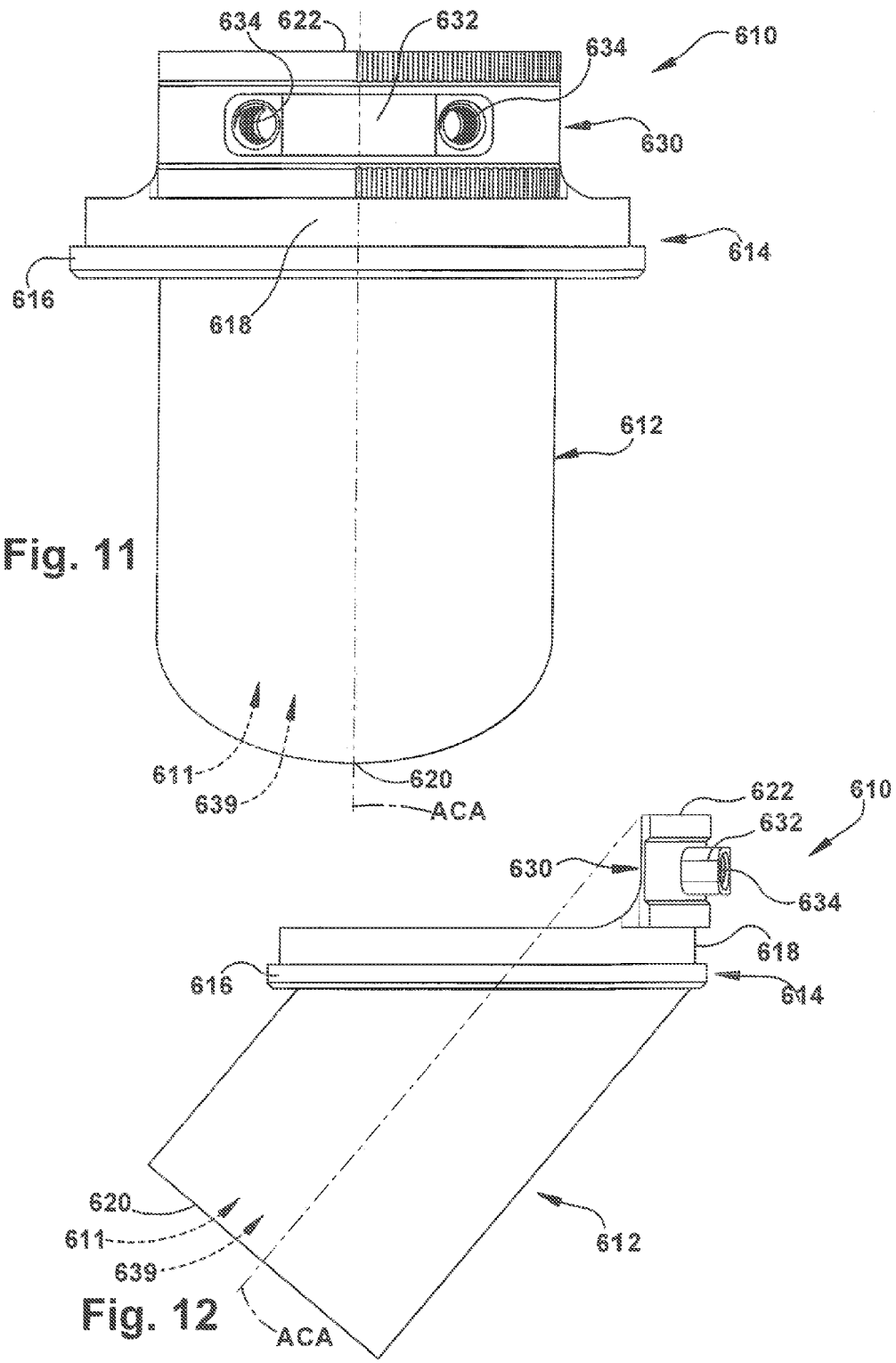

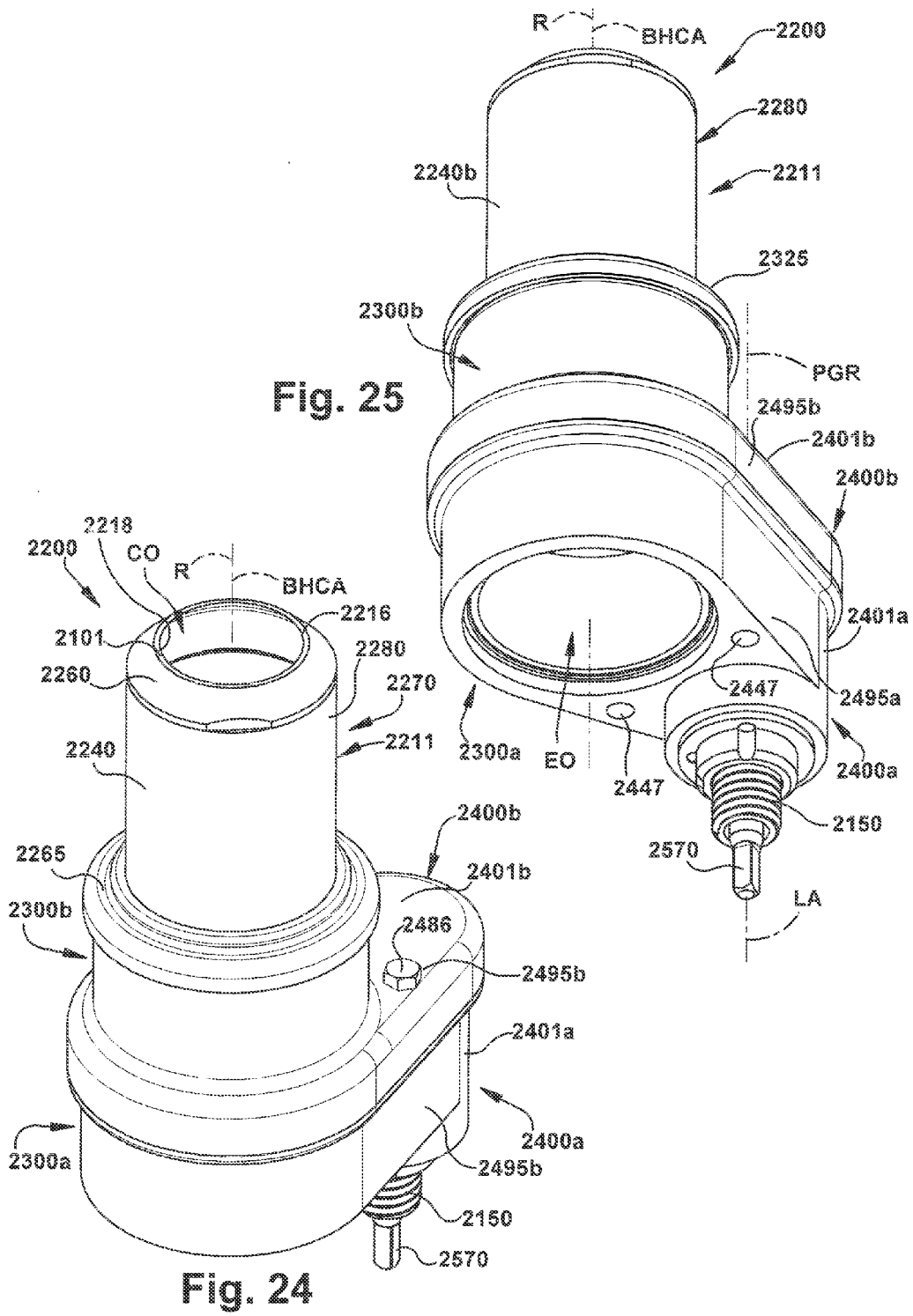

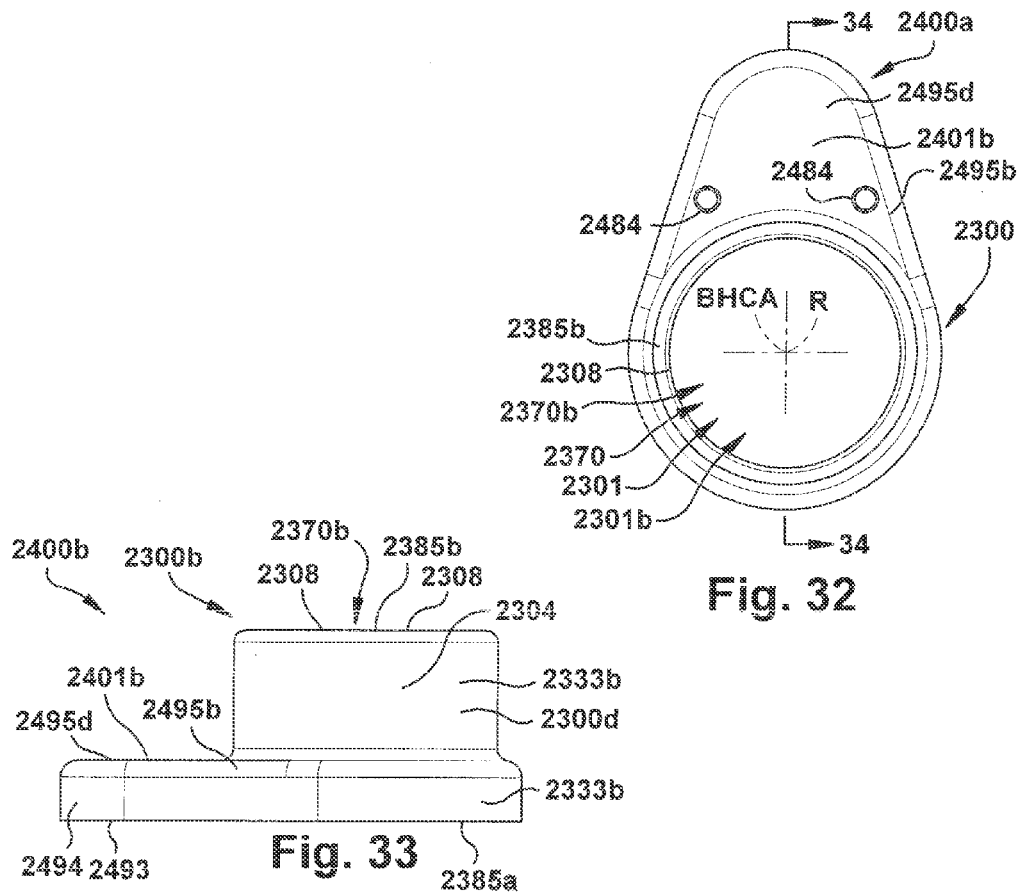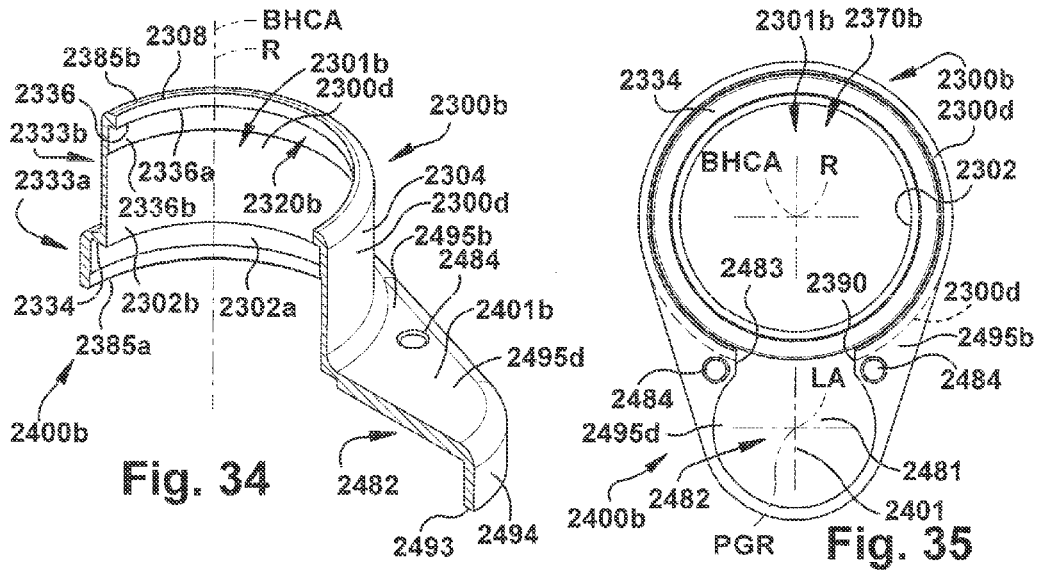

POWER OPERATED ROTARY KNIFE WITH VACUUM ATTACHMENT ASSEMBLY

CROSS-REFERENCE TO RELATED APPLICATIONS

The present application is a continuation-in-part application of co-pending U.S. application Ser. No. 15/269,600, filed Sep. 19, 2016, published as U.S. Publication No. US 2017/0001327, published on Jan. 5, 2017, entitled POWER OPERATED ROTARY KNIFE WITH VACUUM ATTACHMENT ASSEMBLY which is a continuation application of U.S. application Ser. No. 14/446,005, filed Jul. 29, 2014, published as U.S. Publication No. US 2016/0031103, published on Feb. 4, 2016, issuing as U.S. Pat. No. 9,452,541 on Sep. 27, 2016, entitled POWER OPERATED ROTARY KNIFE WITH VACUUM ATTACHMENT ASSEMBLY. The present application is also a continuation-in-part of co-pending U.S. application Ser. No. 14/811,221 filed Jul. 28, 2015, published as U.S. Publication No. US 2016/0031104, published on Feb. 4, 2016, entitled POWER OPERATED ROTARY KNIFE WITH VACUUM ATTACHMENT ASSEMBLY. The present application claims priority from above-identified application Ser. No. 15/269,600 and application Ser. No. 14/811,221, both of which are incorporated herein in their respective entireties by reference, for any and all purposes. Each of U.S. Publication No. US 2017/0001327, U.S. Publication No. US 2016/0031104 and U.S. Publication No. US 2016/0031104 and U.S. Pat. No. 9,452,541 are incorporated herein in their respective entireties for any and all purposes.

TECHNICAL FIELD

The present disclosure relates to a power operated rotary knife and, more specifically, to a power operated rotary knife with a vacuum attachment assembly.

BACKGROUND

Power operated rotary knives are widely used in meat processing facilities for meat cutting and trimming operations where it is desired to remove material, for example, a layer of fat, from a product, for example, an untrimmed piece of meat. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as taxidermy and cutting and trimming of elastomeric or urethane foam for a variety of applications including vehicle seats.

Power operated rotary knives typically include a handle assembly and a head assembly attachable to the handle assembly. The head assembly includes an annular blade housing and an annular rotary knife blade supported for rotation by the blade housing. The annular rotary knife blade of a conventional power operated rotary knife defines a closed loop cutting surface for cutting or trimming material from a product wherein the rotating blade contacts and cuts the material, thereby removing the material from the product. The cut or trimmed material moves away from a cutting edge at one end of the rotary knife blade. An inner wall of the rotary knife blade defines a central, open region of the blade. The cut or trimmed material moves away from the cutting edge, travels or traverses along the inner wall and through the central, open region of the blade before exiting the blade at an end opposite the cutting edge.

The rotary knife blade is typically rotated by a drive assembly which may include a pneumatic or electric motor disposed in an opening or throughbore defined by handle assembly. The pneumatic or electric motor may include a drive shaft that engages and rotates a pinion gear supported by the head assembly. The pinion gear, in turn, engages and rotatably drives the annular rotary knife blade. Gear teeth of the pinion gear engage mating gear teeth formed on an upper surface of the rotary knife blade to rotate the blade. Alternatively, the drive assembly may include a flexible shaft drive assembly extending through an opening in the handle assembly. The shaft drive assembly engages and rotates a pinion gear supported by the head assembly. The flexible shaft drive assembly includes a stationary outer sheath and a rotatable interior drive shaft. The shaft drive assembly is coupled to and driven by a pneumatic or electric motor which is remote from the handle assembly.

Upon rotation of the pinion gear by the drive shaft of the flexible shaft drive assembly, the annular rotary blade rotates within the blade housing at a high RPM, on the order of 900-1900 RPM, depending on the structure and characteristics of the drive assembly including the motor, the shaft drive assembly, and a diameter and the number of gear teeth formed on the rotary knife blade. Conventional power operated rotary knives are disclosed in U.S. Pat. No. 6,354,949 to Baris et al., U.S. Pat. No. 6,751,872 to Whited et al., U.S. Pat. No. 6,769,184 to Whited, and U.S. Pat. No. 6,978,548 to Whited et al., all of which are assigned to the assignee of the present disclosure and all of which are incorporated herein in their respective entireties by reference.

When material is cut or trimmed by a rotary knife blade, the removed material (that is, the cut or trimmed material) moves or travels away from a cutting edge of the blade and through the central, open region defined by the knife blade inner wall and exits the opposite end of the rotary knife blade. Upon exiting the rotary knife blade, the removed material will, depending on the position of the power operated rotary knife and the product, either fall back upon a trimmed or untrimmed portion of the product being cut or trimmed or fall to a surface a workstation where the cutting or trimming operation is being performed. For certain applications, it may be desirable to have a vacuum attachment to a power operated rotary knife to remove, via suction, the removed material such that the removed material does not fall onto the product or fall to the work station surface, but instead is routed away from trimmed product after being cut or trimmed from the product. In certain cutting or trimming operations, the removed material is undesirable and it is desired to immediately physically separate the removed material from the product, for example, if the removed material is unwanted fat tissue to be removed from a steer carcass during a hot defatting process or a contaminated/bruised tissue region of a poultry or pig carcass, it would be desirable to use suction to route the removed/unwanted tissue from the carcass immediately upon cutting or trimming the unwanted tissue to a collection receptacle for disposal purposes and/or to avoid contamination of the carcass by the removed tissue. On the other hand, in certain cutting or trimming operations, the removed material is highly desirable or valuable, for example, removal of desirable oyster meat from a poultry carcass. Again, the suction of a vacuum attachment will route the desirable removed tissue (oyster meat) to a collection receptacle for collection of the desirable removed tissue.

Power operated rotary knives including vacuum attachments are disclosed in, for example, U.S. Pat. No. 6,857,191 to Whited et al. and U.S. Published Application No. US 2004/0211067 to Whited et al., both of which are assigned to the assignee of the present disclosure.

SUMMARY

In one aspect, the present disclosure relates a power operated rotary knife comprising: an elongated handle assembly including a throughbore and a handle assembly longitudinal axis extending through the throughbore; a head assembly coupled to and extending from a distal end of the handle assembly, the head assembly including: a rotary knife blade supported by a blade housing for rotation about a central axis of rotation, the rotary knife blade including: an annular body having an inner wall and a radially spaced apart outer wall, the inner wall defining a central open region extending from a first end to a spaced apart second end of the annular body; the outer wall of the annular body including a drive section disposed intermediate the first and second ends of the annular body, the drive section including a driven gear axially spaced from the first and second ends of the annular body; and a blade section adjacent the second end of the annular body; a blade housing including an upper section and a lower section, the blade housing encircling an axially extending portion of the annular body of the rotary knife blade adjacent the driven gear of the annular body of the rotary knife blade; and a frame having a first section and a second section, the first section of the frame including a central body and a laterally extending interface region, the lower section of the blade housing extending from the interface region of the first section, the second section of the frame including a central body and a laterally extending interface region, the upper section of the blade housing extending from the interface region of the second section, the handle assembly secured to the frame, the blade housing being positioned radially offset from the handle assembly such that the central axis of rotation of the rotary knife blade is spaced apart from the handle assembly longitudinal axis; and a vacuum attachment assembly including a vacuum adapter secured to the first section of the frame, a central open region of the vacuum adapter being in fluid communication with the central open region of the annular body of the rotary knife blade.

In another aspect, the present disclosure relates to a power operated rotary knife comprising: an elongated handle assembly including a throughbore and a handle assembly longitudinal axis extending through the throughbore; a head assembly coupled to and extending from a distal end of the handle assembly, the head assembly including: a rotary knife blade supported by a blade housing for rotation about a central axis of rotation, the rotary knife blade including: an annular body having a central open region extending from a first end to a spaced apart second end of the annular body; a drive section including a driven gear extending from the outer wall of the annular body, the driven gear being axially spaced from the first and second ends of the annular body; and a cutting edge of the rotary knife blade at the second end of the annular body, the blade housing including an upper section and a lower section, the blade housing encircling an axially extending portion of the annular body of the rotary knife blade adjacent the driven gear of the annular body of the rotary knife blade, wherein the blade housing includes a bearing assembly rotatably supporting the rotary knife blade for rotation about the central axis of rotation; and a frame having a first section and a second section, the first section of the frame including a central body and a laterally extending interface region, the lower section of the blade housing extending from the first section interface region, the second section of the frame including a central body and a laterally extending interface region, the upper section of the blade housing extending from the second section interface region, the blade housing positioned radially offset from the handle housing such that the central axis of rotation of the rotary knife blade is spaced apart from the handle assembly longitudinal axis; and a vacuum attachment assembly coupled to the frame.

In another aspect, the present disclosure relates to a power operated rotary knife comprising: a handle assembly including an elongated cylindrical handle housing defining a handle assembly longitudinal axis extending through a throughbore in the handle housing; a head assembly coupled to and extending from a distal end of the handle assembly, the head assembly including: a rotary knife blade supported by a blade housing for rotation about a central axis of rotation, the rotary knife blade including: an annular body having an inner wall and a radially spaced apart outer wall, the inner wall defining a central open region extending from a first end to a spaced apart second end of the annular body; a driven gear formed in the outer wall of the annular body and axially spaced from the first and second ends of the annular body; and a blade section adjacent the second end of the annular body; the blade housing including an upper section and a lower section, the blade housing encircling an axially extending portion of the annular body of the rotary knife blade adjacent the driven gear of the annular body of the rotary knife blade, wherein the blade housing includes a bearing assembly rotatably supporting the rotary knife blade for rotation about the central axis of rotation, the bearing assembly including a first bearing member and a second bearing member, spaced axially apart, the first bearing member disposed in the lower section of the blade housing and spaced axially below the driven gear of the annular body of the rotary knife blade and the second bearing member disposed in upper section of the blade housing and spaced axially above the driven gear of the rotary knife blade; and a frame having a first section and a second section, the first section of the frame including a central body and a laterally extending interface region, the upper section of the blade housing extending from the first section interface region, the second section of the frame including a central body and a laterally extending interface region, the lower section of the blade housing extending from the second section interface region; and a vacuum attachment assembly coupled to the frame.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 11 is a schematic side elevation view of a vacuum adapter of a vacuum attachment assembly of the power operated rotary knife of FIG. 1;

FIG. 12 is a schematic front elevation view of a vacuum adapter of FIG. 10; and

FIG. 24 is a schematic top, rear perspective view of the head assembly of the power operated rotary knife of FIG. 14, including a blade housing assembly, a frame, and an annular rotary knife blade;

FIG. 25 is a schematic bottom, rear perspective view of the head assembly of FIG. 24;

FIG. 32 is a schematic top plan view of a portion of the head assembly of FIG. 24 including a first, upper section of a blade housing of the blade housing assembly and a first, upper section of the frame;

FIG. 33 is a schematic side elevation view of the portion of the head assembly of FIG. 32;

FIG. 34 is a schematic front perspective, longitudinal section view of the portion of the head assembly of FIG. 32, as seen from a plane indicated by the line 34-34 in FIG. 32;

FIG. 35 is a schematic bottom plan view of the portion of the head assembly of FIG. 32;

DETAILED DESCRIPTION

Figure 1:
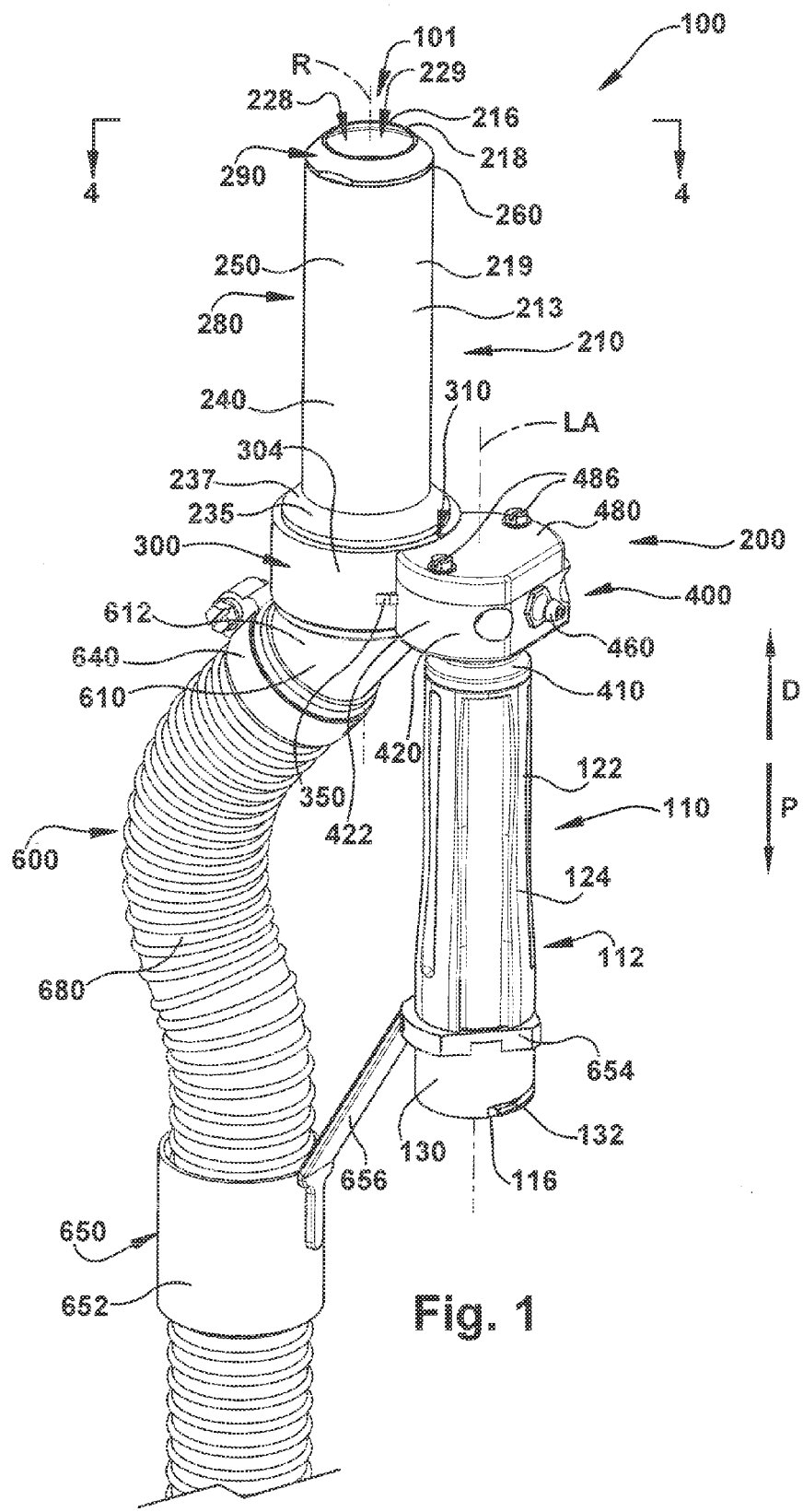
FIG. 1 is a schematic front perspective view of an exemplary embodiment of a power operated rotary knife of the present disclosure including a handle assembly, a head assembly, and a vacuum attachment assembly.
Figure 2:
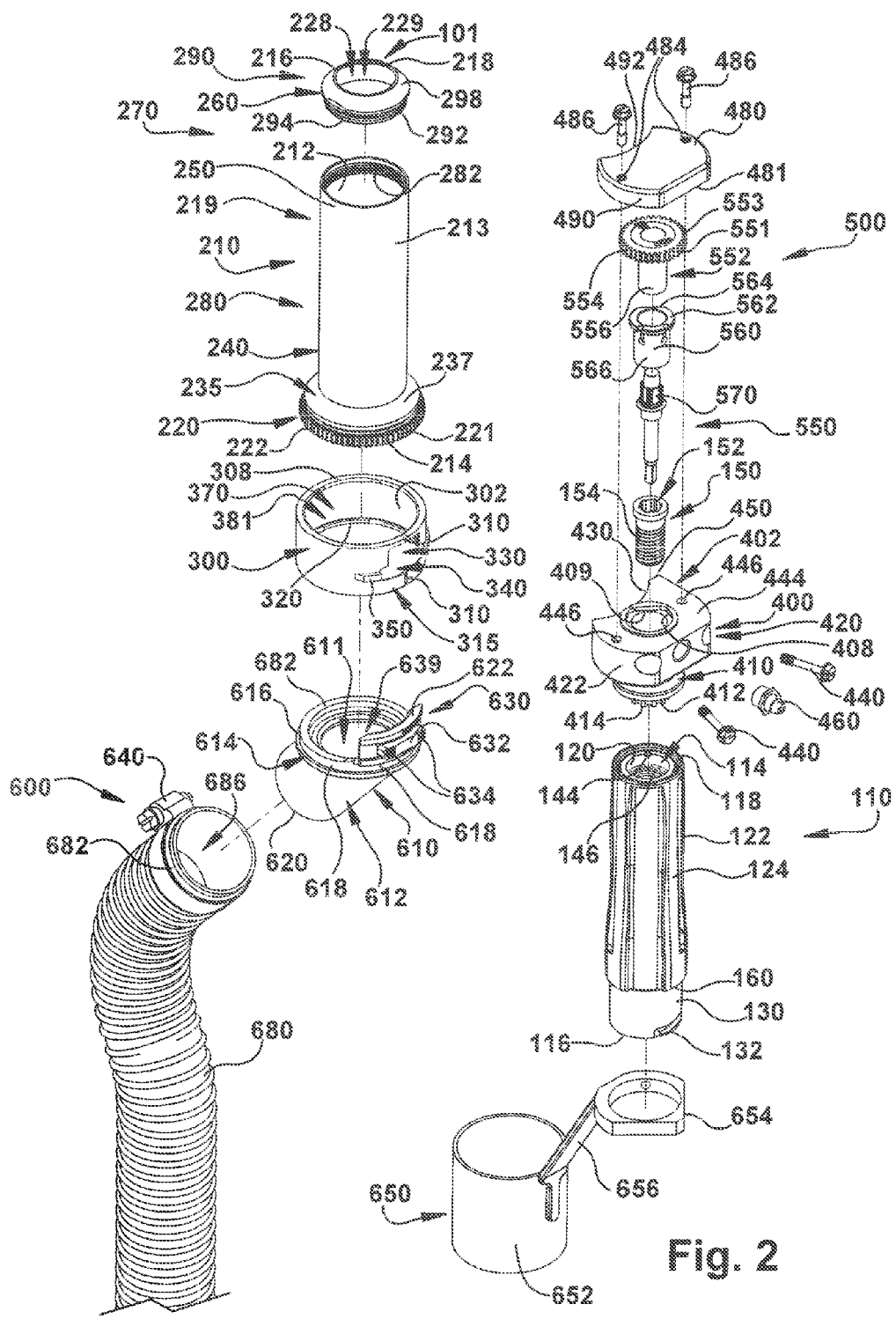
FIG. 2 is a schematic exploded perspective view of the power operated rotary knife of FIG. 1.

Power Operated Rotary Knife 100
Overview

The present disclosure pertains to a power operated rotary knife comprising a head assembly, including an elongated, annular rotary knife blade, a handle assembly, and a vacuum attachment assembly for routing removed material, that is material cut or trimmed by the rotary knife blade from a cutting region of a product, via vacuum pressure, away from the cutting region of the product and away from the rotary knife blade such that the removed material does not have to be manually collected or removed from the cutting region by the operator. The vacuum attachment assembly includes a vacuum hose and a vacuum adapter that couples a vacuum hose to the head assembly of the power operated rotary knife.

Advantageously, the elongated, annular rotary knife blade of the power operated rotary knife includes a cylindrical spacer section disposed between a drive section and a blade section of the knife which substantially elongates the rotary knife blade. The elongated configuration of the rotary knife blade facilitates the operator extending a cutting edge of the rotary knife blade into an narrow interior region of a product (e.g., an abdominal cavity of a carcass) for the purpose of trimming or cutting material from the product that otherwise would be difficult to access with a conventional power operated rotary knife and/or conventional by-hand cutting instruments such as long knives, scissor, nippers, etc. Advantageously, because of the extended length or reach of the rotary knife blade with respect to the gripping portion of the handle assembly, the operator does not have to reach as far into the abdominal cavity of the carcass.

Further, as the spacer and blade sections of the rotary knife blade are of reduced diameter compared to the drive section, a distally extending region of the rotary knife blade has a reduced diameter, as compared to the drive section. The reduced diameter distally extending region and a longitudinal extent of the spacer section further facilitates ease of insertion of the blade into a narrow interior region of the product and manipulation of the cutting edge to cut or trim material from the product. Additionally, the reduced diameter distally extending region of the rotary knife blade reduces drag of the rotary knife blade due to the smaller diameter while maintaining the mechanical advantage resulting from having a larger diameter driven gear in the drive section of the rotary knife blade.

For example, it is desirable in hot defatting operations involving carcasses of larger animals such as steers or pigs to remove certain pockets of fatty tissue that are located between the rib cage and the respective front legs of the carcass. Presently, an operator removes these pockets of fatty tissue when the carcass is hanging vertically with the abdominal cavity cut open. The operator, while holding a cutting instrument in his or her hand, reaches his or her hand into the opened abdominal cavity, and appropriately moves his or hand and the cutting instrument while attempting to locate the pocket of fatty tissue, once the pocket of fatty tissue is located, the operator manipulates the cutting instrument to repeatedly cut portions of the pocket of fatty tissue away from the carcass, the trimmed portions of the fatty tissue falling downwardly within the abdominal cavity and/or to the workstation floor. When the pocket of fatty tissue has been substantially completely cut away from the carcass, the operator repeats the process for the second fatty pocket located between the rib cage and the other front leg. Finally, the removed portions of the two cut-away pockets of fatty tissue must be removed from the abdominal cavity and/or the workstation floor. This is a difficult, time-consuming, labor intensive operation or task for the operator. Adding to the difficulty is the fact that the operator cannot readily see where or what he or she is cutting within the far recesses of the opened abdominal cavity and the operator's arm must be extended sufficiently such that the cutting instrument can reach and cut into the fatty tissue pocket.

With the power operated rotary knife of the present disclosure, this labor intensive task is greatly simplified leading to less time consumed and reduced operator fatigue. The extended length or reach of the rotary knife blade resulting from the spacer portion, with respect to the gripping portion of the handle assembly, means that the operator does not have to reach as far into the abdominal cavity of the carcass. Moreover, in the power operated rotary knife of the present disclosure, a longitudinal axis of a generally cylindrical handle assembly is parallel to but is spaced offset from an axis of rotation of the rotary the annular rotary knife blade. This configuration of the power operated rotary knife blade advantageously allows the operator to more easily reach deep into the abdominal cavity of a carcass and make a plunging or forward-reaching type cut to remove tissue to be removed. Additionally, the high rotational speed of the rotary knife blade makes the actual cutting of the pocket of fatty tissue away from the carcass much easier.

Further, the vacuum attachment assembly of the power operated rotary knife of the present disclosure includes a vacuum adapter that coupled a vacuum hose to a lower end of an annular blade housing. The vacuum adapter is configured so as to space the vacuum hose from the operator's fingers as the operator is gripping the gripping portion of the handle assembly. This advantageously provides clearance for the operator's finger and facilitates ease of manipulation of the power operated rotary knife by the operator to make the forward reaching or plunging type of cut. Additionally, the vacuum attachment assembly is configured such that the vacuum hose extends substantially parallel to the longitudinal axis of the handle assembly. In this way, the handle assembly, rotary knife blade and vacuum hose provide a smaller frontal profile when the power operated rotary knife is being extend within a narrow passageway defined by, for example, an abdominal cavity. Stated another way, if the vacuum hose extended orthogonally from the handle assembly, such a configuration would provide a much larger frontal profile. Thus, it would make it more difficult for the operator to move the power operated rotary knife forward deep into a narrow portion of the abdominal cavity because the orthogonally extending hose would be hitting against the sides of the abdominal cavity as the power operated rotary knife was being moved forward. Finally, the suction provided through the vacuum hose of the vacuum attachment assembly facilitates immediate collection of removed material (removed tissue) from a product (animal carcass). That is, the removed tissue is prevented from falling onto the carcass or onto a surface of a workstation where the carcass is position. This mitigates contamination of the removed material, contamination of the trimmed product and also frees the operator from the task of collecting and or moving the removed material from the trimmed product.

Turning to the drawings, a first exemplary embodiment of a power operated rotary knife of the present invention is generally shown at 100 in FIGS. 1-4. The power operated rotary knife 100 includes a elongated handle assembly 110, a head assembly 200 releasably coupled to and extending from a distal end 118 of the handle assembly 110 and the vacuum attachment assembly 600 releasably coupled to a proximal end 306 of a blade housing 300 of the head assembly 200. The power operated rotary knife 100 additionally includes a drive mechanism 500 that is coupled to an annular rotary knife blade 210 of the head assembly 200 and provides motive power to rotate the rotary knife blade 210 with respect to the blade housing 300 about a blade central axis of rotation R. In one exemplary embodiment, the drive mechanism 500 includes a pneumatic motor 510 and a drive train 550 to couple the rotational force of a rotating output shaft 512 of the pneumatic motor 510 to rotate the rotary knife blade 210.

Figure 3:
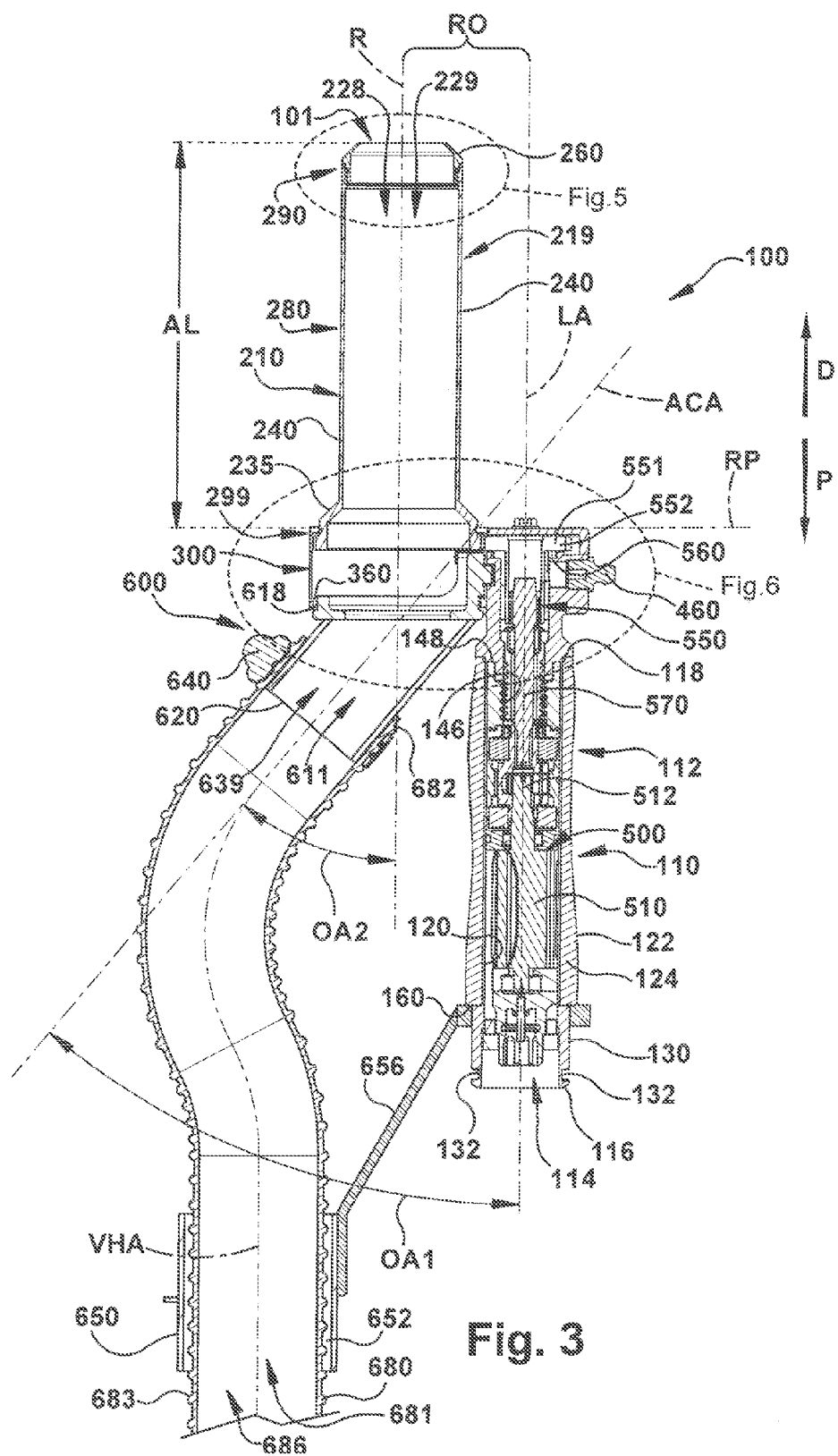
FIG. 3 is a schematic longitudinal section view of the power operated rotary knife of FIG. 1 taken along a longitudinal axis of the handle assembly.
Figure 4:
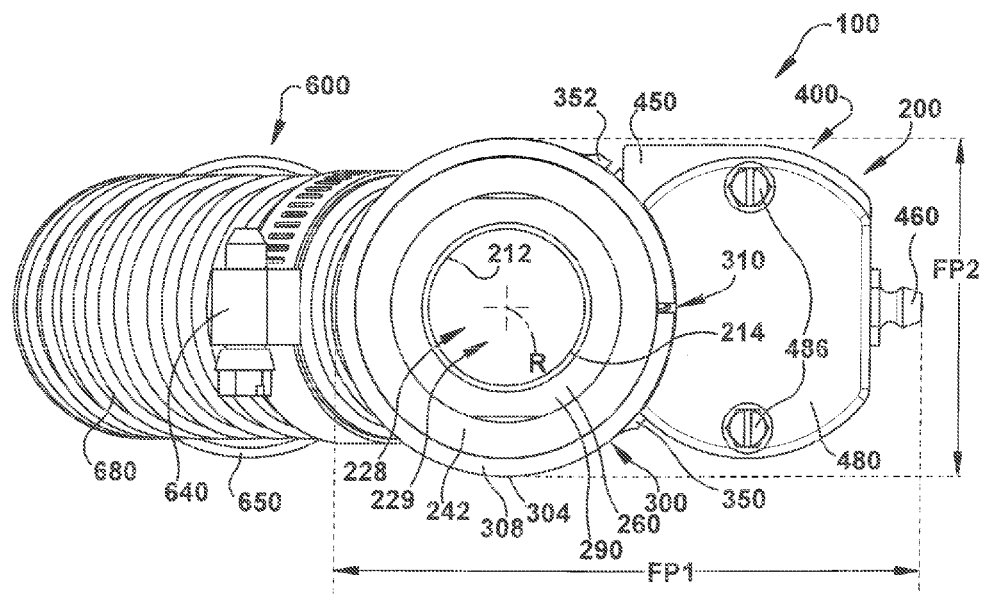
FIG. 4 is a schematic top plan view of the power operated rotary knife of FIG. 1.
Figure 5:
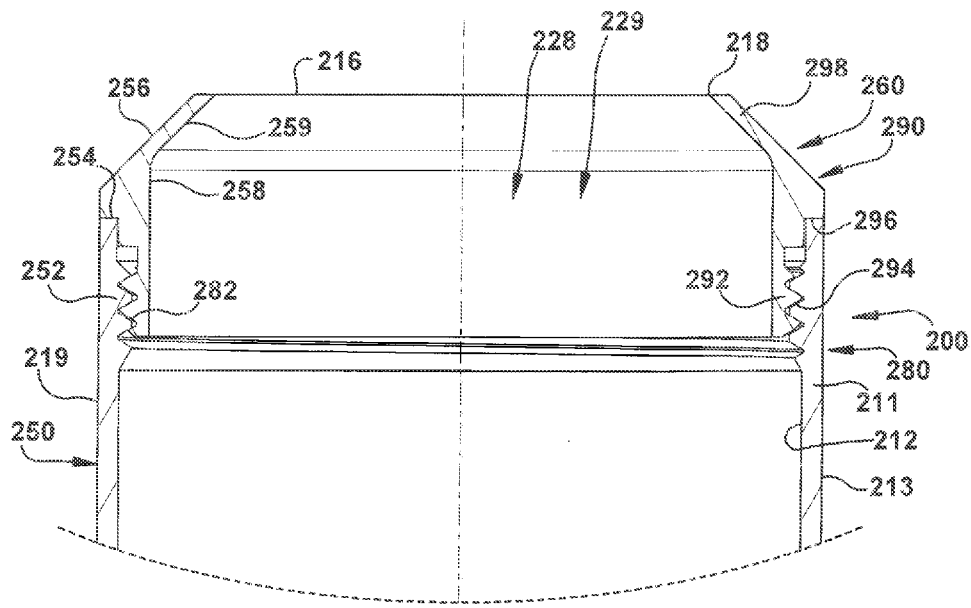
FIG. 5 is a schematic enlarged section view of portions of the power operated rotary knife of FIG. 1 that are within a dashed circle labeled FIG. 5 in FIG. 3.

As can best be seen in FIG. 3, the handle assembly 110 includes an elongated, generally cylindrical handle housing 112 defining a central, longitudinally extending throughbore 114 that extends from a first, proximal or rearward end 116 of the handle assembly 110 to the second, distal or forward end 118 of the handle assembly 110. In one exemplary embodiment, the drive mechanism pneumatic motor 510 is disposed within the throughbore 114 of the handle housing 112. A central longitudinal axis LA of the handle assembly 110 extends through the handle assembly throughbore 114.

Figure 7:
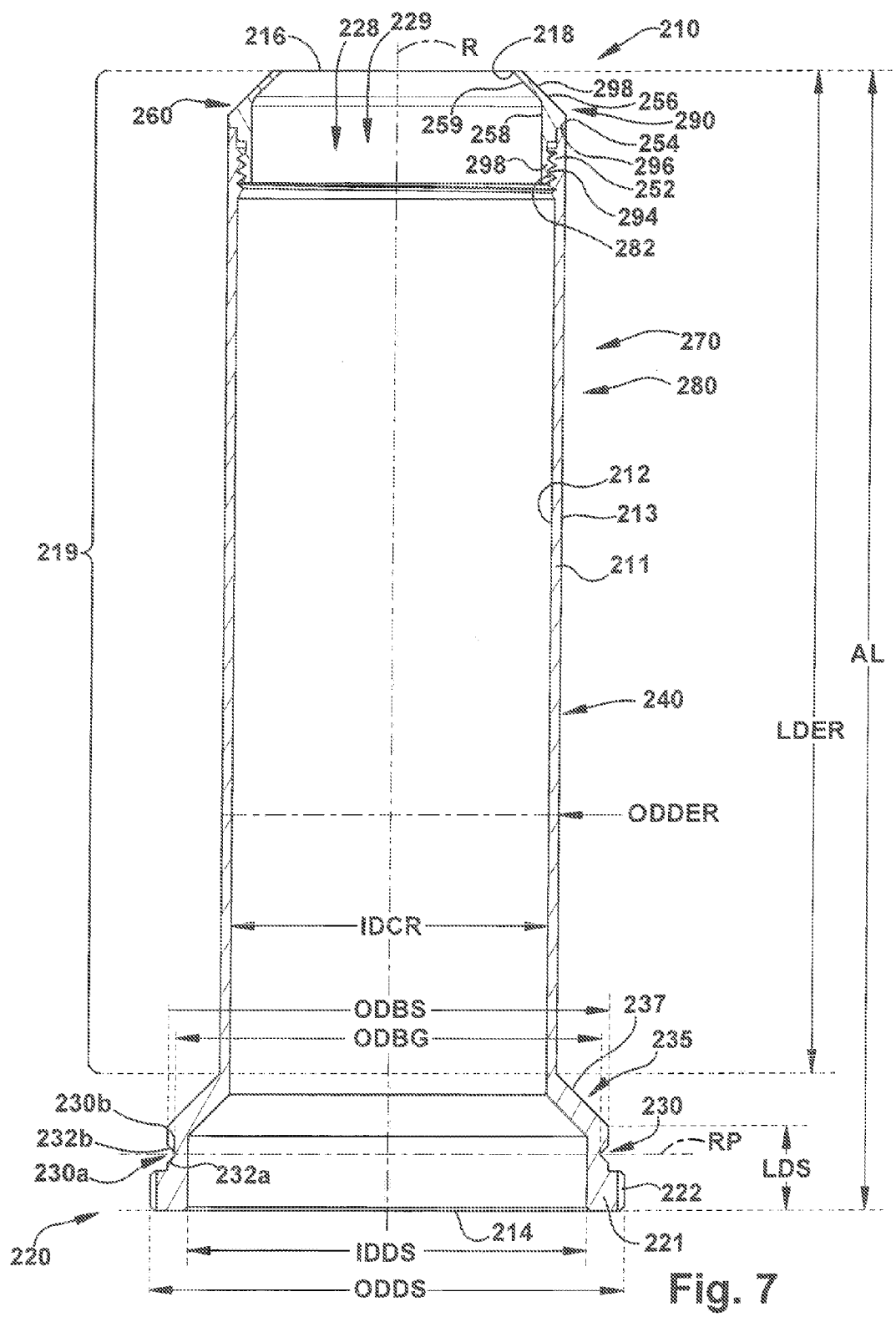
FIG. 7 is a schematic section view of an annular rotary knife blade of a head assembly of the power operated rotary knife blade of FIG. 1.
Figure 8:
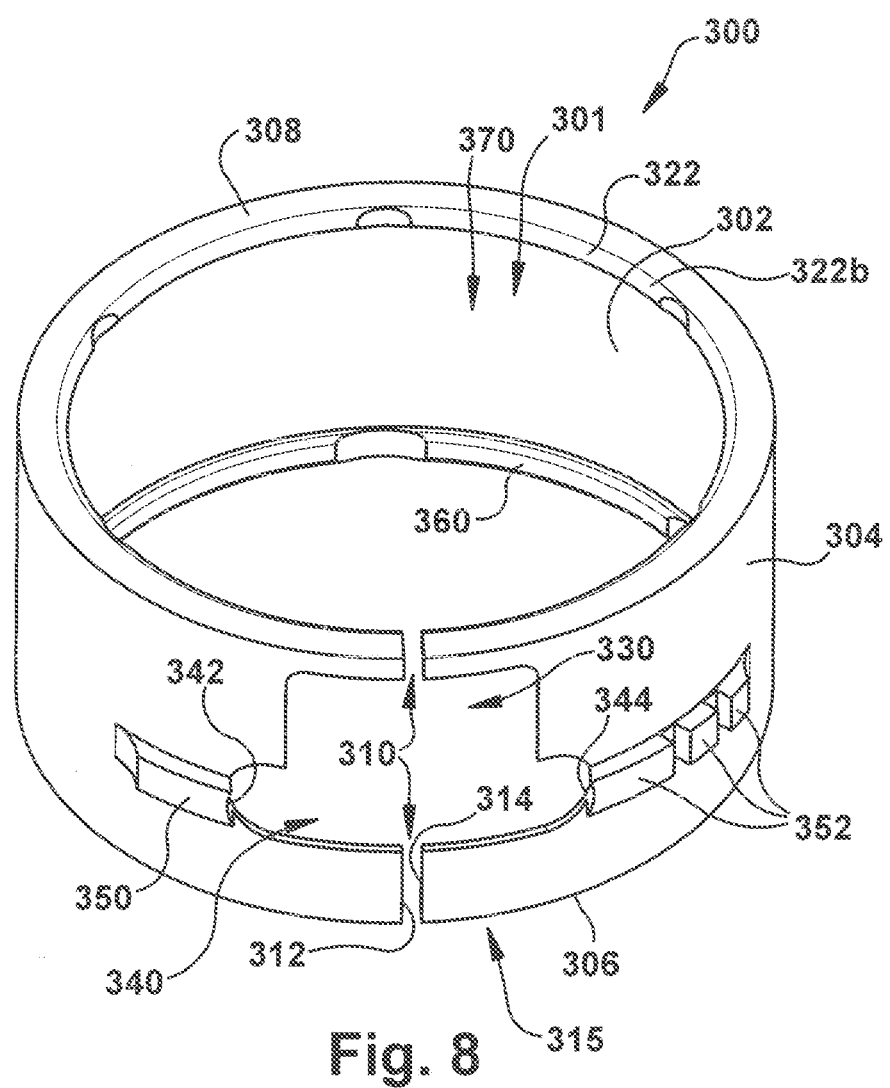
FIG. 8 is a schematic front perspective view of an annular blade housing of a head assembly of the power operated rotary knife blade of FIG. 1.

The head assembly 200 includes the annular rotary knife blade 210 (FIG. 7) rotatably supported by the blade housing 300 (FIG. 8). The head assembly 200 further includes a frame or frame body 400 (FIG. 9) which supports the rotary knife blade 210 and the blade housing 300 and, in turn, is releasably coupled to the handle assembly 110. The frame 400 includes a proximal cylindrical base 410 and an enlarged distal head 420. A throughbore 402 extends through the frame 400 and is aligned with the handle assembly throughbore 114 along the handle assembly longitudinal axis LA. The enlarged head 420 of the frame includes an arcuate mounting region 430 that provides a seating region for a mounting region 315 of the blade housing 300. The arcuate mounting region 430 includes a slotted recess 432 that receives a radially extending tongue 632 of a housing clamp 630 of a vacuum adapter 610 of the vacuum attachment assembly 600 to releasably secure the adapter 610 and the blade housing 300 to the frame 400.

The vacuum attachment assembly 600 includes a vacuum hose 680 and the vacuum adapter 610 which couples the vacuum hose 680 to the proximal end 306 of the blade housing 300. An interior region 686 of defined by the vacuum hose 680 is in fluid communication with respective interior regions 228, 301 of the rotary knife blade 210 and the blade housing 300. The rotary knife blade interior region 228 and the blade housing interior region 301 are defined by aligned throughbores 229, 370 of the knife blade 210 and blade housing 300. Vacuum pressure drawn in the vacuum hose interior region 686 is communicated through the rotary knife blade interior region 228 and the blade housing interior region 301 such that removed material cut by the rotary knife blade 210 flows or is routed from a distal cutting edge 218 of the rotary knife blade 210 though the interior regions 228, 301 of the rotary knife blade and blade housing 210, 300 and into the vacuum hose interior region 686. The removed material accumulates in a container (not shown) at a proximal end of the vacuum hose 680.

Handle Assembly 110

As can best be seen in FIGS. 1-3 and 6, the handle assembly 110 includes the cylindrical handle housing 112. The handle housing includes an inner wall 120 defining the central longitudinally extending throughbore 114 and a radially spaced apart outer wall 122. The handle housing 112 also defines the central longitudinal axis LA of the handle assembly 110 that extends centrally through the throughbore 114. The outer wall 122, in a region extending rearwardly from the distal end 118 of the handle assembly 110 includes a ribbed, contoured handle grip 124 which is grasped by the operator to manipulate the power operated rotary knife 100 during cutting or trimming operations. Extending forwardly from the proximal end 116 of the handle housing 112 is a coupling collar 130 which receives an air supply coupling (not shown) to releasably connect an air hose supplying compressed air to drive the pneumatic motor 510. The coupling collar 130 includes a pair of grooves 132 in the outer wall 122 to lock in mating projections of the air supply coupling.

The handle housing 112 includes a frame attachment collar 140 at the distal end 118 of the handle assembly 110. The collar 140 includes a recessed opening 142 with a radially inwardly, longitudinally extending rib 144. The recessed opening 142 of the collar 140, which defines a portion of the througbbore 114 of the handle assembly 110 and the inner wall 120 of the handle housing 120, receives a splined proximal region 412 of the cylindrical base 410 of the frame 400, when the head assembly 200 and, specifically, the frame 400 is assembled or releasably coupled to the handle assembly 110. The rib 144 interfits with a selected one of a plurality of splines 414 of the splined proximal region 412 to allow the operator to select a desired angular or circumferential orientation between the frame 400 and the contoured handle grip 124 that is most comfortable for the operator. Once the desired orientation between the frame 400 and the handle grip 124 is selected, the handle assembly collar 140 is pushed in a distal direction D (FIGS. 1 and 3) onto the splined proximal region 412 of the frame 400 and the engagement or interfit between the rib 144 and the selected spline of the plurality of splines 414 prevents relative rotation between the frame 400 and the handle assembly 110.

Proximal to the recessed opening 142 of the collar 140 is a threaded region 146 defining a portion of the inner wall 120 of the handle housing 112. A threaded cylindrical fastener 150 includes a throughpassage 152 with a threaded outer wall portion 154 and an exterior shoulder 156. The fastener 150 is inserted through the throughbore 402 of the frame 400 and the threaded outer wall portion 154 threads into the threaded region 146 of the handle housing collar 140 to secure the frame 400 to the handle assembly 100. The exterior shoulder 156 of the fastener 150 abuts and bears against an interior shoulder 406 formed on the inner wall 404 of the frame 400 when the fastener 150 is fully tightened into the collar 140 to affix the frame 400 to the handle assembly 110. Additionally, an annular upper surface 148 (best seen in FIG. 6) of the collar 140 abuts and bears against a mating annular shoulder 407 of the a cylindrical base 410 of the frame 400 surrounding the splined proximal region 412 when the fastener 150 is fully tightened into the collar 140 to affix the frame 400 to the handle assembly 110. The throughpassage 152 of the fastener 150 is aligned with the handle assembly longitudinal axis LA and a drive adapter 570 of the drive train 550 of the drive mechanism extends through the throughpassage 152 to provide a rotating coupling between the output shaft 512 of the pneumatic motor 510 and a pinion gear 552 supported in the throughbore 402 of the frame 400.

Drive Mechanism 500

The drive mechanism 500 rotates the rotary knife blade 210 with respect to the blade housing 300 at a high rotational speed (on the order of 900-1900 RPM) about the central axis of rotation R. The drive mechanism 500, in one exemplary embodiment, includes the pneumatic or air motor 510 disposed within the throughbore 114 of the handle housing 112 and the drive train 550 which is partially disposed within the central opening or throughbore 402 of the frame 400. The throughbore 402 of the frame 400 is defined by an inner wall 404 of the frame 400 and is longitudinally aligned with the handle assembly throughbore 114 and the longitudinal axis LA.

Figure 6:
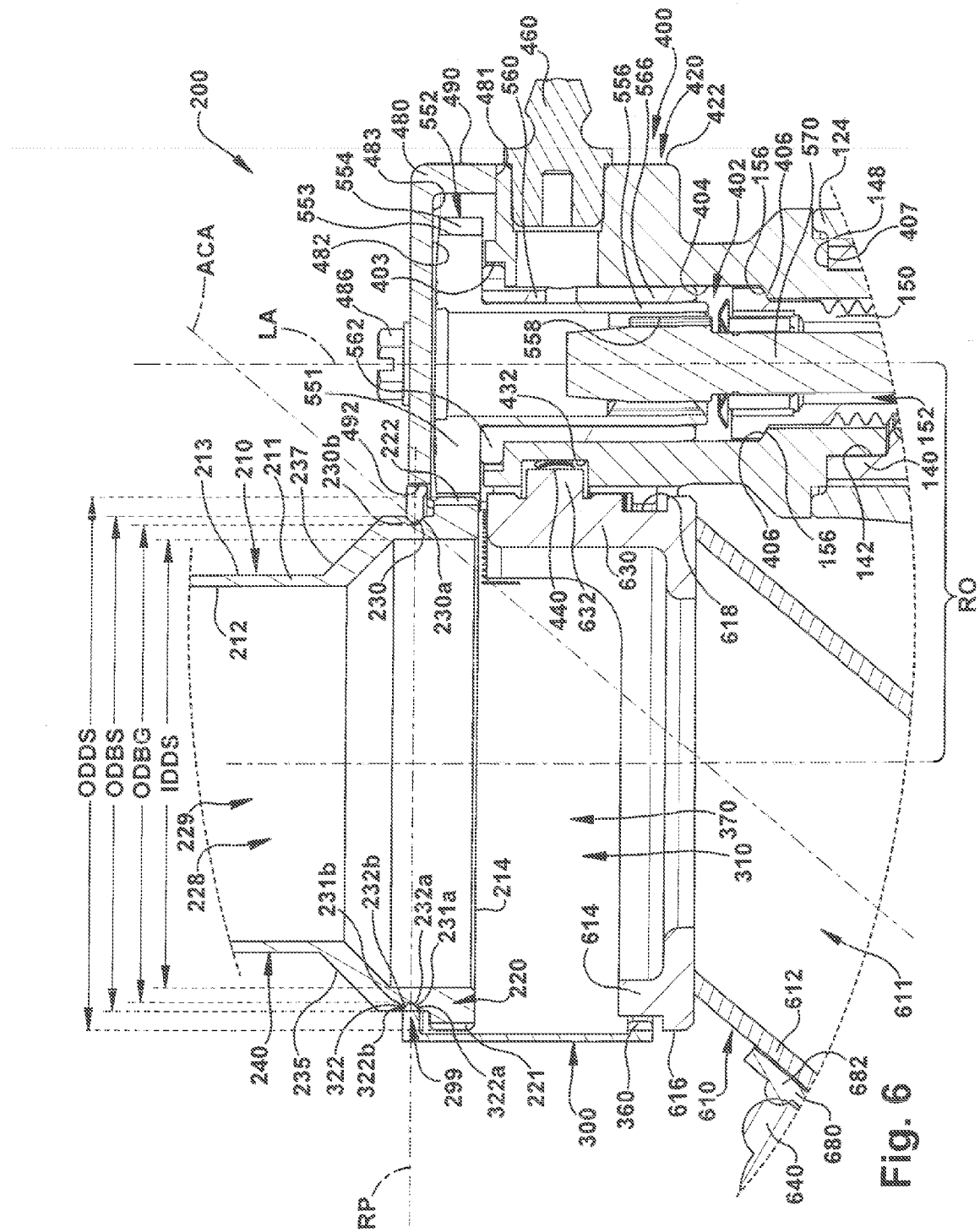
FIG. 6 is a schematic enlarged section view of portions of the power operated rotary knife of FIG. 1 that are within a dashed circle labeled FIG. 6 in FIG. 3.

In one exemplary embodiment, the drive train 550 includes the pinion gear 552, supported for rotation in a pinion gear bushing 560 positioned in the frame throughbore 402 and the drive adapter 570. As best seen in FIGS. 3 and 6, the drive adapter 570 extends from the motor output shaft 512 to the pinion gear 552 through the handle assembly throughbore 114 and through the throughpassage 152 of the handle assembly fastener 150 and into the throughbore 402 of the frame 400.

The pinion gear 552 is driven by the drive adapter 570 extending distally from the output shaft 512 of the pneumatic motor 510. A distal end of the drive adapter 570 is received in a pinion gear drive coupling 558 defined by a rearwardly extending tubular shank 556 of the pinion gear 552. The pinion gear 552 includes an enlarged distal head 551 defining a drive gear 553 comprising a set of involute spur gear teeth 554. The spur gear teeth 554 engage the mating set of involute spur gear teeth 222 of the driven gear 221 of the drive section 220 of the rotary knife blade 210 to rotate the blade 210 about the axis of rotation R.

As would be understood by one of skill in the art, it should be understood that other drive mechanisms may be utilized to drive the rotary knife blade 210, for example, a DC motor disposed in the throughbore 114 of the handle assembly 110 could be used in place of the pneumatic motor 510. Alternatively, a flexible shaft drive assembly extending through the throughbore 114 of the handle assembly 110 could be used to drive the rotary knife blade. The flexible shaft drive assembly could, for example, include a stationary outer sheath and a rotatable interior drive shaft that is driven by a remote pneumatic or electric motor. Such alternative drive mechanisms are contemplated by the present disclosure.

Head Assembly 200

The head assembly 200 includes the annular rotary knife blade 210 (FIG. 7) rotatably supported for rotation about the central axis of rotation R by the blade housing 300 (FIG. 8). The head assembly 200 also includes the frame or frame body 400 (FIG. 9) which supports the rotary knife blade 210 and the blade housing 300 and, in turn, is releasably coupled to the handle assembly 110. The arcuate mounting region 420 of the enlarged head 420 of the frame 400 also supports the vacuum adapter 610 of the vacuum attachment assembly 600 via a fastener interconnection between the housing clamp 630 of the adapter 610 and the frame enlarged head 420. The frame also supports a pinion gear 552 of the drive train 550 of the drive mechanism 500.

Annular Rotary Knife Blade 210

As can best be seen in FIG. 7, the annular rotary knife blade 210 includes a generally cylindrical annular body 211. The annular body 211 of the rotary knife blade 210 includes an inner wall 212 and a radially spaced apart outer wall 213 and extends from a first, proximal end 214 and a second, distal end 216, which defines the cutting edge 218 of the blade. The annular body 211 of the rotary knife blade 210 includes an annular drive section 220, adjacent the proximal end 214 of the blade 210, an intermediate, elongated spacer section 240, and a blade section 260, adjacent the distal end 216 of the blade 210. A tapered transition section 235 extends between the drive section 220 and the spacer section 240. The tapered transition section 235 defines a necked-down tapered region 237 that transitions from a larger diameter of the annular drive section 220 to a smaller diameter of a spacer section 240 and a smaller diameter blade section 260. The spacer section 240 and the blade section 210 define a distally extending region 219 of the rotary knife blade 210.

Advantageously, the annular blade section 260 and the annular spacer section 240 have a reduced outer diameter compared with an outer diameter of the drive section 220. The reduced outer diameter of the blade and spacer sections 260, 240 affords reduced drag and ease of manipulation and position of a distally extending region 219 of the rotary knife blade 210 which is likely to contact the product during cutting and trimming operations. For example, the reduced outer diameter of the distally extending region 219 (blade and spacer sections 260, 240) of the rotary knife blade 210 is advantageous for reduced drag and ease of manipulation, for example, when the power operated rotary knife 100 is inserted into an abdominal cavity of a carcass and the distally extending region 219 of the blade 210 is moved forward into a narrow portion of the abdominal cavity to remove a pocket of fat tissue disposed between the rib cage and a front leg of the carcass. Further, the larger outer diameter of the drive section 220, which allows for a diameter of a driven gear 221 formed on the outer wall 213 of the annular body 211 to be larger, as compared to the distally extending region 219, thereby providing a mechanical advantage with respect to rotatably driving the blade 210 versus a smaller driven gear diameter.

The drive section 220 of the rotary knife blade 210 defines the driven gear 221 comprising a set of involute spur gear teeth 222 extending from the outer wall 213 for rotatably driving the blade 210 about its central axis of rotation R. The drive section 220 further includes a radially inwardly extending generally V-shaped bearing groove or bearing race 230, also formed by the outer wall 213 of the rotary knife blade 210, which is axially spaced from and distal to the gear teeth 222. The bearing groove 230 interfits with a bearing bead 320 of the blade housing 300 defining a bearing structure 299 for rotatably supporting the blade 210 for rotation about the axis of rotation R. The bearing structure 299 defines a rotational plane RP of the rotary knife blade 210 that is substantially orthogonal to the central axis of rotation R of the blade 210 and substantially orthogonal to the longitudinal axis LA of handle assembly 110.

The annular rotary knife blade 210 is an annular structure defining the annular body 211 that is generally cylindrical and tapered from the proximal drive section 220 to the distal blade section 260. The rotary knife blade 210 extends from the proximal end 214 to the axially spaced apart distal end 216 and includes the inner wall 212 and the radially spaced apart outer wall 213. The inner wall 212 of the rotary knife blade 210 defines an interior region 228 and a throughbore 229 extending through the blade 280 and longitudinally centered about the axis of rotation R. Except for the blade cutting edge 218 adjacent the distal end 216 of the annular body 211 where the outer wall 213 tapers toward the inner wall 212; the inner and outer walls 212, 213 are generally parallel. As previously described, the drive section 220 includes, adjacent the proximal end 214, the driven gear 221 which, in one exemplary embodiment is an involute spur gear comprising the plurality of involute gear teeth 222. The outer wall 213 of the drive section 220 further includes the radially inwardly extending bearing groove 230 which is axially spaced from the driven gear 221 along the blade axis of rotation R. The bearing groove 230 defines axially spaced apart lower and upper frustoconical surfaces 232a, 232b. The frustoconical surfaces 232a, 232b define the bearing faces 230a, 230b of the bearing groove 230 of the rotary knife blade 210 which contact and bear against the upper and lower axially spaced apart bearing surfaces 322a, 322b of the bearing surface 322 of the blade housing bead 320 when the rotary knife blade 210 is supported in the blade housing 300. The blade bearing structure 299 of the power operated rotary knife 100 comprises the above-described bearing interface to rotatably support the blade 210 for rotation.

In one exemplary embodiment, an inner diameter IDDS of the drive section 220 is approximately 1.81 in., while a maximum outer diameter ODDS of the drive section 220, that is the outer diameter in the region of the driven gear 221, is approximately 2.16 in. In one exemplary embodiment, an outer diameter ODBS of the drive section 220 adjacent the bearing groove 230 is approximately 2.00 in., while an outer diameter ODBG of the drive section 220 within the bearing groove 230 is approximately 1.93 in. The outer diameter ODBG also defines a minimum outer diameter of the drive section 220. In one exemplary embodiment, an axial length LDS of the drive section 220 is approximately 0.39 in. and extends from the proximal end 214 of the rotary knife blade 210 to the transition section 235. In one exemplary embodiment, an axial length LDER of the distally extending region 219, which includes the spacer section 240 and the blade section 260, is approximately 4.55 in., while an outer diameter ODDER of the distally extending region 219 is approximately 1.52 in. The outer diameter ODDER of the distally extending region 219 also defines the maximum outer diameter of the spacer section 240 and the maximum outer diameter of the blade section 260. Thus, in the rotary knife blade 210 of the present disclosure, a maximum outer diameter ODDER of the spacer section 240 is smaller than a minimum outer diameter ODBG of the drive section 220 and a maximum outer diameter ODDER of the blade section 260 is smaller than the minimum outer diameter ODBG of the drive section 220. In one exemplary embodiment, the maximum outer diameter of the spacer section 240 and the maximum outer diameter of the blade section 260 are the same and are equal to the maximum outer diameter ODDER of the distally extending region 219. In one exemplary embodiment, the maximum outer diameter ODDER of the distally extending region 219 is less than or equal to 70% of the minimum outer diameter of the drive section Advantageously, this reduced diameter configuration of the rotary knife blade 210 maintains the mechanical advantage of having a larger diameter drive gear 221 for purposes of more easily rotating the rotary knife blade 210 with the pneumatic motor 510, while, at the same time, the smaller outer diameter of the distally extending region 219 affords reduced blade drag and facilitates ease of manipulation of the blade 210 when the blade is used for example for trimming or cutting operations in a narrow region of the abdominal cavity of a carcass to be trimmed.

The tapered transition section 235 and the cylindrical spacer section 240 of the rotary knife blade 210 extend between the drive section 220 and the blade section 260. The transition section 235 is adjacent the drive section 220, while the spacer section 240 defines a distal cylindrical region 250 extending between the tapered transition section 235 and the blade section 260. An outer wall of the tapered transition region tapers between a larger outer diameter ODBS at a distal end of the drive section 240 and a smaller outer diameter ODDER at a proximal end of the spacer section 240. In one exemplary embodiment, an inner diameter IDCR of the spacer section 240 is approximately 1.44 in., while an axial length of the spacer section 240 is approximately 4.29 in. In one exemplary embodiment, the rotary knife blade 210 has an overall axial length AL of approximately 5.17 in. and a minimum inner diameter of ODMIN at the cutting edge 218 of approximately 1.04 in. As noted above, in one exemplary embodiment of the rotary knife blade 210, the axial length LDER of the distally extending region 219, comprising the spacer section 240 and the blade section 260, is approximately 4.55 in., while the overall axial length AL of the rotary knife blade 210 is 5.17 in. Accordingly, in one exemplary embodiment, the distally-extending or forwardly-extending, reduced outer diameter distally extending region 219 comprises or accounts for approximately 88% of the overall axial length AL of the rotary knife blade 210. Advantageously, this rotary knife blade configuration, which has the reduced outer diameter, forwardly extending region 219 accounting for approximately 88% of the total axial extent AL of the blade 210, facilitates ease of insertion and manipulation of the blade edge 218 within narrow openings in a product. For example, the reduced outer diameter coupled with the large axial length (compared to the overall blade length) of the distally extending region 219 of the rotary knife 210 facilitates an operator of the power operated rotary knife 100 manipulating the knife such that the distally extending region 219 of the blade 210 may be moved forward and inserted into a narrow portion or region of an abdominal cavity of a carcass for the purposed of trimming an internal pocket of fat tissue deep within the abdominal cavity, while the vacuum attachment assembly 600 advantageously provides for vacuum removal and collection of the trimmed pieces of fat tissue as they are trimmed without the necessity of the operator picking up or otherwise collecting the trimmed pieces of fat tissue.

One of skill in the art will understand and appreciate that the dimensions and configuration of the rotary knife blade 210 may vary depending on the cutting/trimming applications that the rotary knife blade 210 is contemplated for use in connection with. The foregoing dimensions and specific configuration of the rotary knife blade 210 is by way of example, without limitation, and the present disclosure contemplates other dimensions and configurations of the rotary knife blade 210 depending on the specific cutting and trimming applications.

Two Part Rotary Knife Blade 270

In one exemplary embodiment, the annular rotary knife blade 210 of the present disclosure is a two-part annular rotary knife blade 270 including a proximal carrier component or portion 280 and a blade component or portion 290 which are releasably connected via a threaded engagement. The drive section 220 and the spacer section 240 comprise the carrier component 280, while the blade section 260 comprises the blade component 290. The blade component 290 includes a proximal connection region 292 which includes an externally threaded outer wall 294. The threaded outer wall 294 threads into a mating threaded inner wall 282 of the carrier portion 280, specifically a threaded distal portion 252 of the cylindrical region 250 of the spacer section 240. In one exemplary embodiment, the threaded outer wall 294 of the proximal connection region 292 of the blade component 290 includes right-hand threads for a threaded engagement between the blade component 290 and the carrier component 280. The blade component 290 includes a radially extending shoulder 296 that seats against an upper or distal surface 254 of the spacer section 240 bridging the inner and outer walls 212, 213 when the blade component 290 is fully threaded into the carrier component 280.

A distal tapered region 298 of the blade component 290 extends from the shoulder 296 to the cutting edge 218 of the blade section 260. The outer wall 213 of the blade 210 in the distal tapered region 298 defines a generally frustoconical surface 256 that converges in a direction away from the drive section 220 and toward the axis of rotation R, terminating at the cutting edge 218. The inner wall 212 of the blade 210 in the distal tapered region 298 defines a proximal cylindrical surface 258 and a distal frustoconical surface 259. The distal frustoconical surface 259 converges in a direction away from the drive section 220 and toward the axis of rotation R, also terminating at the cutting edge 218. One of skill in the art will recognize that the configuration of the blade component 290 may be changed depending on the specific cutting trimming application, for example, the blade component 290 defines a "hook blade" configuration. Depending on the cutting/trimming applications that the rotary knife blade 210 is contemplated for use in connection with, the blade component 290 may be configured as a "flat blade" configuration or a "straight blade" configuration. U.S. Pat. No. 8,745,881 to Thompson et al., issued Jun. 10, 2014 and assigned to the assignee of the present invention, discloses various annular rotary knife blade configurations and two-part annular rotary blades and is incorporated herein in its entirety by reference.

Again, one of skill in the art will understand that the dimensions and configuration of an exemplary embodiment of the rotary knife blade 210, as stated above and as shown in the FIGS., may vary depending on the cutting/trimming applications that the rotary knife 100 will be used for.

Additionally, the rotary knife blade 210 may be fabricated as a one-piece or one-part blade.

Advantageously, the central axis of rotation R of the rotary knife blade 210 is radially offset by a radial offset distance RO from and substantially parallel to the longitudinal axis LA of handle assembly 110. The radially offset and parallel configuration between the rotary knife blade 210 and the handle assembly 110 allows the adapter 610 of the vacuum attachment assembly 600 to be directly connected to the lower end 306 of the blade housing 300 and further allows a general extent or longitudinal axis VHA of a vacuum hose 680 of the vacuum attachment assembly 610 in a region of a hose bracket 650 to be substantially parallel to the handle assembly longitudinal axis LA and the axis of rotation R of the rotary knife blade 210 for efficient extraction of cut or trimmed material (removed material) by the vacuum attachment assembly 600. Additionally, the adapter 610 of the vacuum attachment assembly 610 is angled away from the handle assembly 110 to provide clearance for the operator's fingers as he or she grips the handle grip 124 and manipulates the power operated rotary knife 100. The adapter 610 defines an adapter central axis ACA which substantially intersects both the handle assembly longitudinal axis LA and the rotary knife blade axis of rotation R. In one exemplary embodiment, the offset angle OA1 between the adapter central axis ACA and the handle assembly longitudinal axis LA is approximately 45° and, similarly, the offset angle OA2 between the adapter central axis ACA and the blade axis of rotation R is 45°.

Blade Housing 300

As can best be seen in FIG. 8, the blade housing 300 is a generally cylindrical blade housing having an inner wall 302 defining the interior region 301 and a radially spaced apart outer wall 304 and the proximal end 306 and an axially spaced apart distal end 308. The throughbore 370 extends through the blade housing 300 from the proximal end 306 to the distal end 308. The blade housing 300 includes a longitudinally extending split 310 though the inner and outer walls 302, 304 to allow expansion of an inner diameter of the blade housing for removal of a rotary knife blade 210 at the end of its useful life and insertion of a new rotary knife blade in its place. Typically, the expected useful lives of the other components of the power operated rotary knife 100, including the blade housing 300 and the vacuum adapter 610, are much greater than the useful life of the rotary knife blade 210, thus, it is expected that the rotary knife blade 210 will be replaced many times during the lifetime of the power operated rotary knife 100. The longitudinally extending split 310 of the blade housing 300 is defined between adjacent side walls 312, 314. The split 310 is generally centered in the mounting region 315 of the blade housing 300.

Near the distal end 308 of the blade housing 300, the inner wall defines a radially inwardly protruding bearing bead 320. The bead 320 defines a bearing surface 322 on which the rotary knife blade 210 is supported for rotation about a rotational plane RP (FIG. 6). Because the rotary knife blade 210 includes the radially inwardly extending generally V-shaped bearing groove or bearing race 230 in its outer wall 213, the bearing surface 322 of the bead 320 comprises upper and lower axially spaced apart bearing surfaces 322a, 322b which contact and bear against mating bearing faces 230a, 230b of the bearing groove 230 of the rotary knife blade 210.

The bearing bead 320 may be continuous around the entire 360° of the inner wall 302 of the blade housing 300 or may be interrupted at one or more points along its circumference to allow for easier expansion of the blade housing 300 when changing rotary knife blades 210. The bearing interaction of the annular bearing groove 230 of the rotary knife blade 210 and the bearing bead 320 of the blade housing 300 results in two axially spaced apart arcuate lines of bearing contact 231a, 231b between the rotary knife blade 210 and the blade housing 300.

The mounting region 315 of the blade housing 300 includes a first, upper circumferentially extending generally rectangular slot 330 that is centered about the longitudinal split 310. The upper or distal slot 330 extending through the blade housing walls 302, 304 provides clearance for the set of gear teeth 554 of the pinion gear 552 to extend into the interior region 301 of the blade housing 300 and engage the set of gear teeth 222 of the rotary knife blade 210 so that the pinion gear 552 can rotate the rotary knife blade 210 about its central axis R. A second, lower circumferentially extending generally oval-shaped slot 340 also centered about the longitudinal split 310 extends through the blade housing walls 302, 304. The lower or proximal slot 340 provides clearance so that the radially or horizontally extending tongue 632 of the upwardly extending housing clamp 630 of the vacuum adapter 610 can extend from the interior region 301 of the blade housing 300 though the inner and outer walls 302, 304 and interfit into the mating slotted recess 432 formed in the arcuate mounting region 430 of the enlarged head 420 of the frame 400. A pair of threaded fasteners 440 extending horizontally through the enlarged head 420 of the frame 400 on opposite sides of the frame throughbore 402, extending through the lower blade housing slot 340, and thread into respective threaded openings 634 of the adapter housing clamp tongue 632. This threaded fastener connection between the frame 400 and the adapter 610 sandwiches the mounting region 315 of the blade housing 300 between the frame 400 and the adapter 610 and secures the blade housing 300 and the vacuum adapter 610 to the frame 400. The pair of threaded fasteners 440 are captured in their respective openings in the enlarged head 420 of the frame 400. That is, the fasteners 420 are configured with enlarged threaded portions such that the fasteners 420 do not fall out of their respective openings in the enlarged head 420 when the fasteners are unscrewed or unthreaded from the respective threaded openings 634 of the adapter housing clamp tongue 632.

The blade housing outer wall 304 includes a single radially outwardly protruding land 350 on one horizontal side 342 of the lower slot 340 and a plurality of circumferentially spaced apart prying lands 352 on an opposite horizontal side 344 of the lower slot 340. When the frame 400 and vacuum adapter 610 are secured by the threaded fasteners 440, as described above, the single land 350 fits into a horizontally extending recess 434a formed on one side 432a of the slotted recess 432 of the frame enlarged head mounting region 430 and the plurality of lands 352 fit into a horizontally extending recess 434b formed on the opposite side of the slotted recess 432. To replace the rotary knife blade 210, both of the threaded fasteners 440 are loosened such that are unthreaded from the respective threaded openings 634 of the adapter housing clamp tongue 632. The blade housing 300 and rotary knife blade 210 are then removed from the arcuate mounting region 430 of the frame 400. A plier-like spreading tool (not shown) is used to increase the circumference of the blade housing 300 such that the worn rotary knife blade 210 may be removed. The spreading tool is also used to spread the blade housing 300 such at a new rotary knife blade 210 may be inserted into the blade housing 300 such that the bearing bead 320 of the blade housing 300 fits into the annular bearing groove 230 of the rotary knife blade 210 to support the blade 210 for rotation with respect to the blade housing 300 about the central axis of rotation R. The blade housing 300, with the new rotary knife blade 210 installed, is then positioned such that the blade housing mounting region 315 is seated against the mounting region 430 of the frame 400 and the vacuum adapter 610 is positioned such that the housing clamp tongue 632 extends through the lower blade housing slot 340 and into the a mating slotted recess 432 formed in the arcuate mounting region 420 of an enlarged head 420 of the frame 400. The two fasteners 440 are then inserted into the threaded openings 634 of the tongue 632 of the vacuum adapter housing clamp 630 and screwed in or tightened to secure the vacuum adapter 610 and the blade housing 300 to the frame 400. The blade housing 300 is sufficient stiff and resilient that the housing 300 will return to is closed or unexpanded diameter condition as soon as the prying force of the spreading tool is released.

The inner wall 302 of the blade housing 300 at its proximal end 306 includes a radially inwardly extending circumferential lip 360 that extends about the entire 360° of the blade housing periphery. As best can be seen in FIG. 6, the lip 360 extends into, but does not contact, a mating arcuate groove 618 formed in an outer wall 616 of a distal annular boss 614 of the adapter 610 in a region of the upwardly extending housing clamp 630 of the adapter 610. The blade housing 300 is secured to the frame 400 and constrained from axial movement with respect to the frame 400 by the threaded interconnection or engagement of the pair of fasteners 440 of the frame 400 and the threaded openings 634 of the tongue 632 of the vacuum adapter housing clamp 630, as explained above. The presence of the lip 360 of the blade housing 300 in the arcuate groove 618 in the outer wall 616 of the vacuum adapter 610 functions to reduce vacuum pressure lost through the blade housing slot 310. The goal is to have as much of the vacuum as possible drawn by the vacuum attachment assembly 600 to be communicated into the interior region 228 of the rotary knife blade 210 and through the throughbore 229 of the rotary knife blade 210 to the cutting edge 218 such that removed product is readily drawn by a strong vacuum through the open regions 228, 301 of the rotary knife blade 201 and blade housing 300 and into the vacuum attachment assembly 600.

When the blade housing 300 is in an expanded diameter condition (when, for example, the rotary knife blade 210 is being changed), as described, above, the circumferential gap between the side walls 312, 314 is increased to allow changing of the blade 210. At the same time, an effective diameter of the lip 360 is increased due to the gap between the side walls 312, 314. When the circumferential gap between the side walls 312 is sufficiently large, an effective diameter of the lip 360 will be large enough such that the annular boss 614 of the adapter 610 may be pull axially down and out of the blade housing 300. Thus, in the expanded diameter condition of the blade housing 300, the vacuum attachment assembly 600 may be detached from the blade housing 300.

Frame 400

Figure 9:
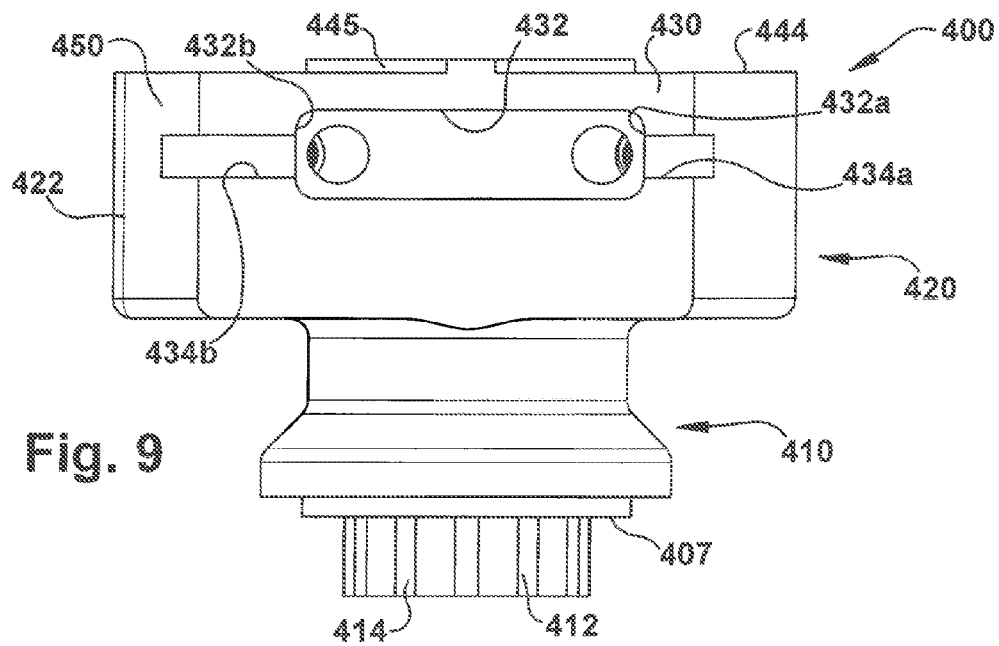
FIG. 9 is a schematic side elevation view of a frame body of a head assembly of the power operated rotary knife of FIG. 1.
Figure 10:
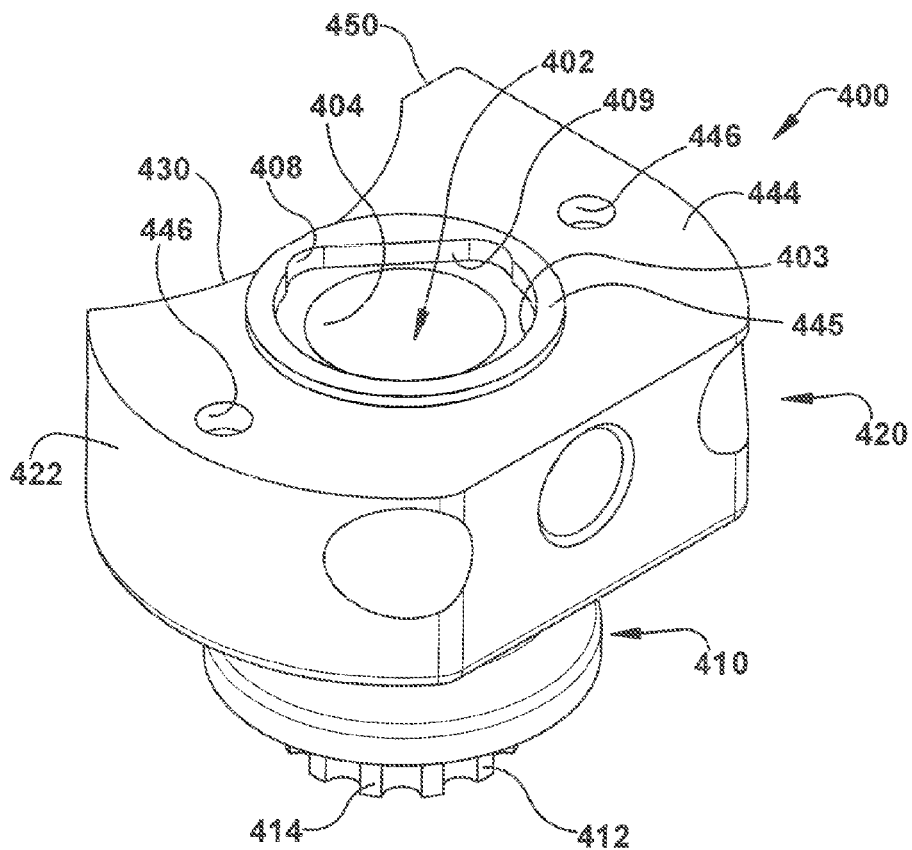
FIG. 10 is a schematic front perspective view of the frame body of FIG. 9.

As can best be seen in FIGS. 6, 9 and 10, the frame or frame body 400 includes the proximal cylindrical base 410 and the enlarged head 420. The enlarged head 420 includes the arcuate mounting region 430. The throughbore 402 of the frame 400 is aligned with the handle assembly throughbore 114 and, therefore, is aligned with the handle axis longitudinal axis LA. The inner wall 404 of the frame 400 defining the throughbore 402 includes the interior shoulder 406 that provides a stop for the exterior shoulder 156 of the handle assembly fastener 150 when the fastener 150 is fully tightened into the collar 140 to affix the to the frame 400 to the handle assembly 110. The enlarged head 420 of the frame 400 also includes a generally planar upper surface 444 that provides a seating surface for a pinion gear cover 480. A raised central portion 445 of the upper surface 444 surrounding the throughbore 402 defines a keyed recessed region 408 that receives and supports an enlarged head 562 of the pinion gear bushing 560. To inhibit relative rotation between the pinion gear bushing 560 and the enlarged head 420 of the frame 400, a planar side wall section 564 of the pinion gear bushing enlarged head 420 fits against a planar wall 409 of the keyed recessed region 408. A rearwardly extending cylindrical body 566 of the pinion gear bushing 560 extends into a portion of the throughbore 402 proximal to the recessed region 408.

In addition to supporting the pair of threaded fasteners 440 that extend horizontally through the enlarged head 420 and exit through the slotted recess 432 of the arcuate mounting region 430, the enlarged head 420 also defines a lubricant passageway to route lubricant from a fitting 460 to a bearing interface between the pinion gear 552 and the pinion gear bushing 560. The mounting region 430 is defined by an arcuate portion of a side wall 422 of the enlarged head 420. The arcuate mounting region 430 conforms to the outer diameter of the blade housing 300, when the blade housing 300 is in an unexpanded condition.

The enlarged head 420 of the frame 400 also includes the generally planar upper surface 444 that provides a seating surface for a pinion gear cover 480. The pinion gear head 551 supported by the pinion gear bushing 560 extends axially above the planar upper surface 444 of the enlarged head 420. The upper planar surface 444 of the enlarged head 420 includes a pair of axially extending threaded openings 446. The pinion gear cover 480 attaches to the enlarged head 420 to overlie and protect the pinion gear head 551. The pinion gear cover 480 includes a pair of threaded openings 484 aligned with the threaded openings 446. A pair of threaded fasteners 486 extend through the openings 484 of the pinion gear cover 480 and thread into the threaded openings 446 to secure the pinion gear cover 480 to the enlarged head 420 of the frame 400.

The pinion gear cover 480 includes a bottom wall 481 defining a central recessed region 482. The central recessed region 482 provides clearance for the pinion gear head 551. A side wall 490 of pinion gear cover 480 defines arcuate cutout 492 that intersects the central recessed region 482. The cutout 492 conforms to the arcuate shape of the arcuate mounting region 430 of the enlarged head 420 such that the set of involute gear teeth 554 of the pinion gear 552 may extending radially outwardly beyond the pinion gear cover side wall 490 (and the side wall 422 of the enlarged head 420 in the area of the arcuate mounting region 430) to permit the gear teeth 554 to operatively engage and drive the driven gear 221 of the rotary knife blade 210.

Vacuum Attachment Assembly 600

As can best be seen in FIGS. 1, 3, 11 and 12, the vacuum attachment assembly 600 includes the vacuum adapter 610, the hose bracket 650 and the vacuum hose 680. The vacuum adapter 610 includes a proximal body 612 and the larger diameter upper annular boss 614. A throughbore 611 extends between a first proximal end 620 and a second distal end 622 of the adapter 610 and defines an interior region 639 of the adapter 610. The throughbore 611 defines the central axis ACA of the adapter 610, as described above. The proximal body 612 that has the general shape of a truncated cylinder.

At the truncated upper end of the body 612 is the radially outwardly and axially upwardly extending annular boss 614. The outer wall 616 of the annular boss 614 includes the arcuate groove 618 that receives the radially inwardly extending lip 360 of the inner wall 302 of the blade housing 300 in the region of the blade housing split 310.

As described above, the annular boss 614 includes the upwardly or axially extending blade housing clamp 630 which, in turn, includes horizontally extending tongue 632. The radially extending tongue 632 extends thought the lower slot 340 of the blade housing 300 and into the slotted recess 432 of the enlarged head 420 of the frame 400. The pair of fasteners 440 on either side of the frame throughbore 402 threaded into the threaded openings 634 in the tongue 632 to clamp together the vacuum adapter 610, the blade housing 300 and the frame 400. Stated another way, when the pair of fasteners 440 of the frame 400 threadedly engage the respective threaded openings 634 of the housing clamp 630 of the vacuum adapter 610, the vacuum adapter 610 bears against the blade housing 300 in a region of the blade housing split 310 to releasably affix the blade housing 300 to the frame 400 and to releasably affix the vacuum attachment assembly 600 to the frame 400. The blade housing 300 is sandwiched between the vacuum adapter 610 and frame 400 as the pair of fasteners 440 are tightened into the threaded openings 634 of the tongue 632 of the housing clamp 630.

The proximal body 612 of the adapter 610 defines a sleeve that receives an end portion 682 of the flexible vacuum hose 680. An exterior hose clamp 640 secures the end portion 682 of the vacuum hose 680 to the adapter proximal body 612. In one exemplary embodiment, an inner diameter of the vacuum hose 680 is approximately 1.5 in. The vacuum hose 680 defines a central opening or throughbore 681 which, in turn defines an interior region 686 of the vacuum hose 680.

As noted previously, the central axis ACA of the vacuum adapter 610 is angled away from the handle assembly longitudinal axis LA and the blade axis of rotation R to provide clearance between the vacuum hose 680 and the operator's hand, while at the same time addressing the need to keep the front profile of the power operated rotary knife 100 as small as possible given the need for the knife 100 to be inserted into and manipulated in narrow body cavities, such as abdominal cavities of carcasses, and the like. The front profile of the rotary knife 100, the boundaries of which are shown schematically by dimensions FP1, FP2 in FIG. 4, may be viewed as an approximate total frontage area or area effectively occupied by the power operated rotary knife 100 when looking in a proximal direction P (FIG. 3) toward a distal end 101 of the knife 100 along a line of the axis of rotation R.

The hose bracket 650 functions to fix the position of the vacuum hose 680 a fixed distance away from the handle assembly 100 such that the hose 680 does not interfere with the operator's hand as the operator manipulates the handle grip 124, while, at the same time, maintains a portion 683 of the vacuum hose 680 that is proximal to the end portion 682 coupled to the adapter 610 in a generally parallel direction with respect to the handle assembly longitudinal axis LA and the rotary knife blade axis of rotation R. In this way, the vacuum hose 680 does not hinder manipulation of the power operated rotary knife 100 by the operator and, at the same time, provides as small a possible front profile FP for the knife 100.

The hose bracket includes a cylindrical sleeve 652 and a collar 654 which are connected by a brace 656. The brace 656 functions to space apart and offset the cylindrical sleeve from the collar 654 radially and axially. The vacuum hose 680 extends through the sleeve 652 and the collar 654 fits over the outer wall 122 of the handle housing 112 in a region of the coupling collar 130. The collar 130 abuts a stepped shoulder 160 in the outer wall 122 between collar 130 and the handle grip 124.

The throughbore 681 and interior region 686 of the vacuum hose 680 are in fluid communication with the throughbore 611 and the interior region 639 of the vacuum adapter 610 which are in fluid communication with the throughbore 370 and the interior region 301 of the blade housing 300 which are in fluid communication with the throughbore 229 and interior region 228 of the rotary knife blade 210. Accordingly, when the vacuum attachment assembly 600 is assembled to the blade housing 300 and the rotary knife blade 210 is assembled to the blade housing 300 and a vacuum pump (not shown) is actuated to draw a vacuum pressure in the vacuum hose 680, because of the fluid communication between the vacuum attachment assembly 600, the blade housing 300 and the rotary knife blade 210 of the head assembly 200, vacuum pressure will be present in the interior region 228 and the throughbore 229 of the rotary knife blade 210. Thus, cut or trimmed product (removed material), cut by the cutting edge 218 of the blade 210 will be pulled or routed by the vacuum pressure in a proximal or rearward direction though the aligned throughbores 229, 370, 611, 681 and, ultimately, routed through the vacuum hose 680 where the removed material is collected in a canister (not shown) for further processing, inspection, grading, packaging, or disposal, depending on the nature of the removed material.

In one exemplary embodiment of the power operated rotary knife 100, the handle housing 112 may be fabricated of stainless steel, while the handle grip 124 may be fabricated of plastic or other material or materials known to have comparable properties and may be formed by molding and/or machining, for example, the handle grip may be fabricated of two over molded plastic layers, an inner layer comprising a hard plastic material and an outer layer or gripping surface comprised of a softer, resilient plastic material that is more pliable and easier to grip for the operator. The frame 400 of the head assembly 200 may be fabricated of aluminum or stainless steel or other material or materials known to have comparable properties and may be formed/shaped by casting and/or machining. The blade and blade housing 400 may be fabricated of a hardenable grade of alloy steel or a hardenable grade of stainless steel, or other material or materials known to have comparable properties and may be formed/shaped by machining, forming, casting, forging, extrusion, metal injection molding, and/or electrical discharge machining or another suitable process or combination of processes. The vacuum adapter 610 of the vacuum attachment assembly 600 may be fabricated of aluminum or steel.

Second Exemplary Embodiment—Power Operated Rotary Knife 2000

Figure 13:
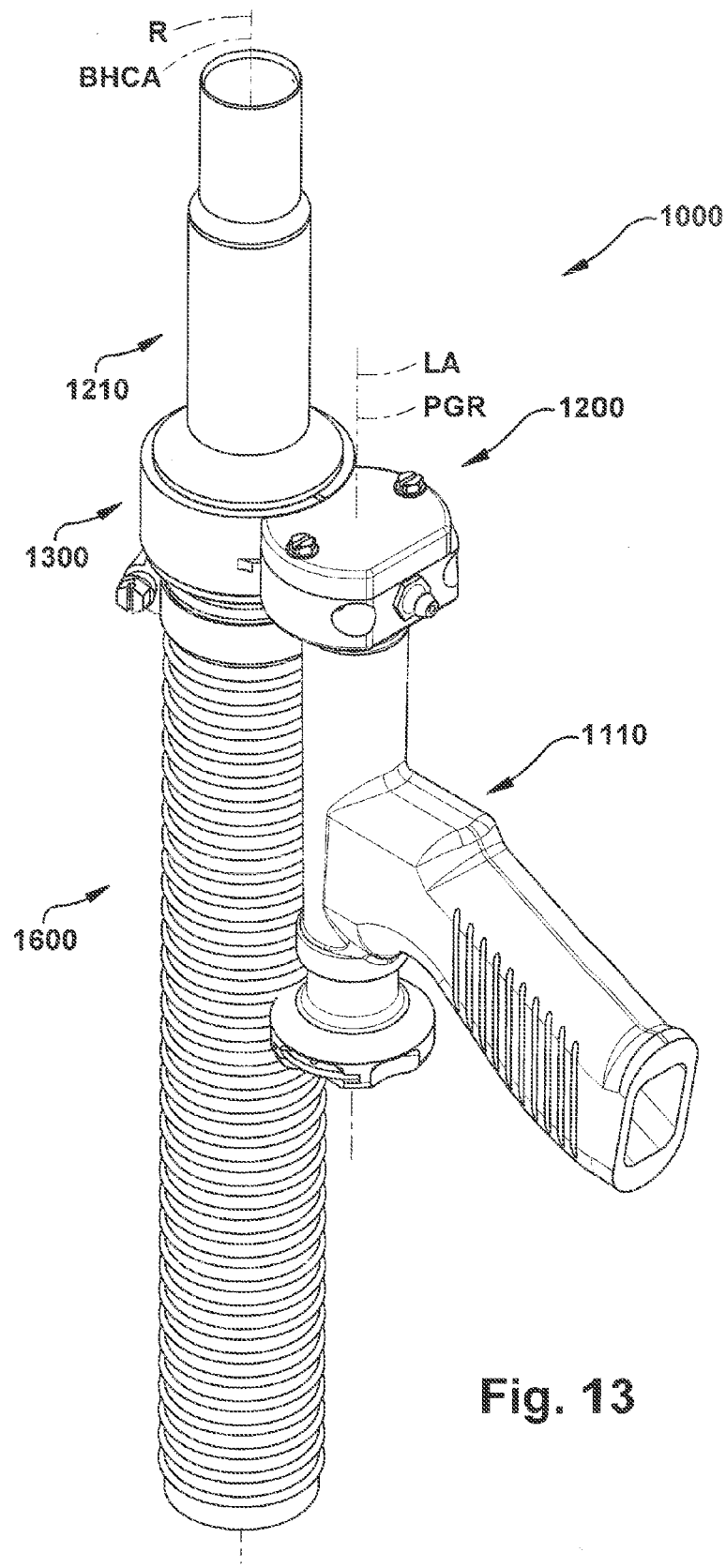
FIG. 13 is a schematic front perspective view of a second exemplary embodiment of a power operated rotary knife of the present disclosure including a handle assembly, a head assembly, and a vacuum attachment assembly.

A second exemplary embodiment of a power operated rotary knife of the present invention is generally shown at 1100 in FIG. 13. Like the power operated rotary knife 100 of the first exemplary embodiment, the power operated rotary knife 1000 of the second exemplary embodiment includes an elongated handle assembly 1110, a head assembly 1200 releasably coupled to and extending from a distal end of the handle assembly 1110 and a vacuum attachment assembly 1600 releasably coupled to a proximal end of a blade housing 1300 of the head assembly 1200. The handle assembly 1110 extends along a longitudinal axis LA. The blade housing 1300 supports an annular rotary knife blade 1210 for rotation about a central axis of rotation R, which substantially parallel to the handle assembly longitudinal axis LA. The knife blade central axis of rotation R is radially spaced from the handle assembly longitudinal axis LA by a radial offset RO.

Certain components and assemblies of the power operated rotary knife 1000 of the second exemplary embodiment are similar in structure and function to the power operated rotary knife 100 of the first exemplary embodiment. Further details regarding the power operated rotary knife 1000 of the second exemplary embodiment of the present disclosure are disclosed in U.S. application Ser. No. 14/811,221, filed Jul. 28, 2015, previously referenced, from which the present application claims priority. U.S. application Ser. No. 14/811, 221 is incorporated by reference herein in its entirety.

Third Exemplary Embodiment—Power Operated Rotary Knife 2000

A third exemplary embodiment of a power operated rotary knife of the present invention is generally shown at 2000 in FIGS. 14-23. Certain components and assemblies of the power operated rotary knife 2000 of the third exemplary embodiment are similar in structure and function to the corresponding components and assemblies of the power operated rotary knife 100 of the first exemplary embodiment. For brevity, the structural details/functions/advantages of those components and assemblies of the power operated rotary knife 2000 which are similar to the corresponding components and assemblies of the power operated rotary knife 100 will not be repeated in detail, all of the structural details/functions/advantages discussed above with respect to the power operated rotary knife 100 are hereby incorporated by reference. Common reference numbers and letters used in the two embodiments are assumed to represent similar concepts and/or structural details.

Overview

The power operated rotary knife 2000 includes a elongated handle assembly 2110, a head assembly 2200 releasably coupled to and extending from a forward or distal end 2118 of the handle assembly 2110 and a vacuum attachment assembly 2600 releasably coupled to a first lower section 2400a of frame 2400 of the head assembly 2200. The handle assembly 2110 includes an elongated, generally cylindrical handle housing 2112, similar to the handle housing 112 of the power operated rotary knife 100 of the first exemplary embodiment, defining a central, longitudinally extending throughbore 2114 that extends from a first, proximal or rearward end 2116 of the handle assembly 2110 to the second, distal or forward end 2118 of the handle assembly 2110. The handle assembly 2110 defines a central longitudinal axis LA of the handle assembly 2110. The handle assembly 2110 of the power operated rotary knife 2000 is similar in structure and function to the handle assembly 110, described in connection with the power operated rotary knife 100 of the first exemplary embodiment.

In addition to the frame 2400, the head assembly 2200 includes a blade housing 2300 which supports an annular rotary knife blade 2210 for rotation about a central axis R of rotation. The power operated rotary knife 2000 additionally includes a drive mechanism 2500 (seen, for example, in FIGS. 20-23) that is operatively coupled to the annular rotary knife blade 2210 of the head assembly 2200 and provides motive power to rotate the rotary knife blade 2210 with respect to the blade housing assembly 2300 about the rotary knife blade central axis of rotation R. As was the case with the power operated rotary knife 100 of the first exemplary embodiment, in the power operated rotary knife 2000, advantageously, as can be seen, for example, in FIG. 20, the central axis of rotation R of rotary knife blade 2210 is radially offset from the longitudinal axis LA of the handle assembly 2110 by a radial distance, that is a distance orthogonal to the central axis of rotation R and labeled in, for example FIGS. 20 and 28 as radial offset RO, while the rotary knife blade central axis of rotation R is substantially parallel from the handle assembly longitudinal axis LA.

Figure 30:
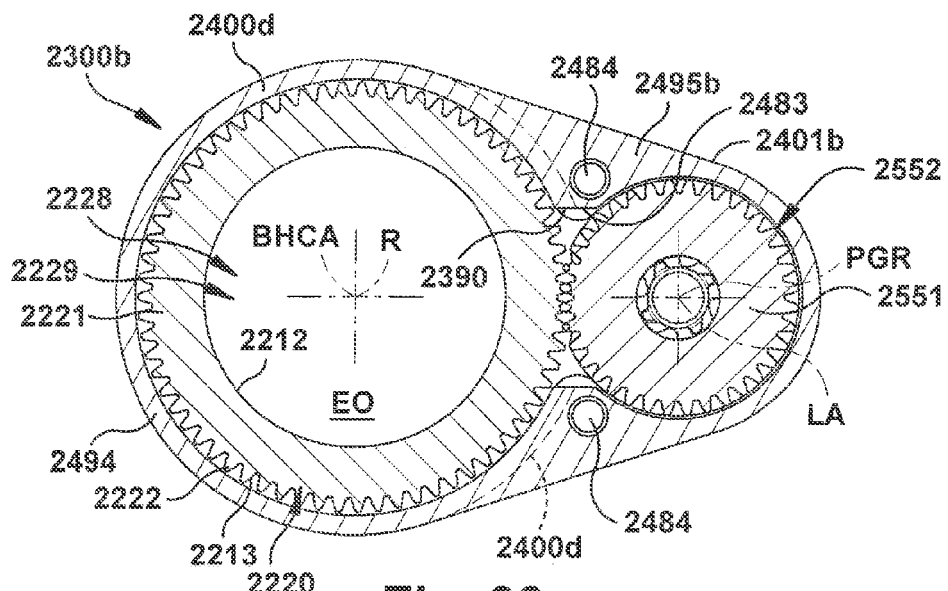
FIG. 30 is a schematic top plan, radial section view through the head assembly of FIG. 24.
Figure 31:
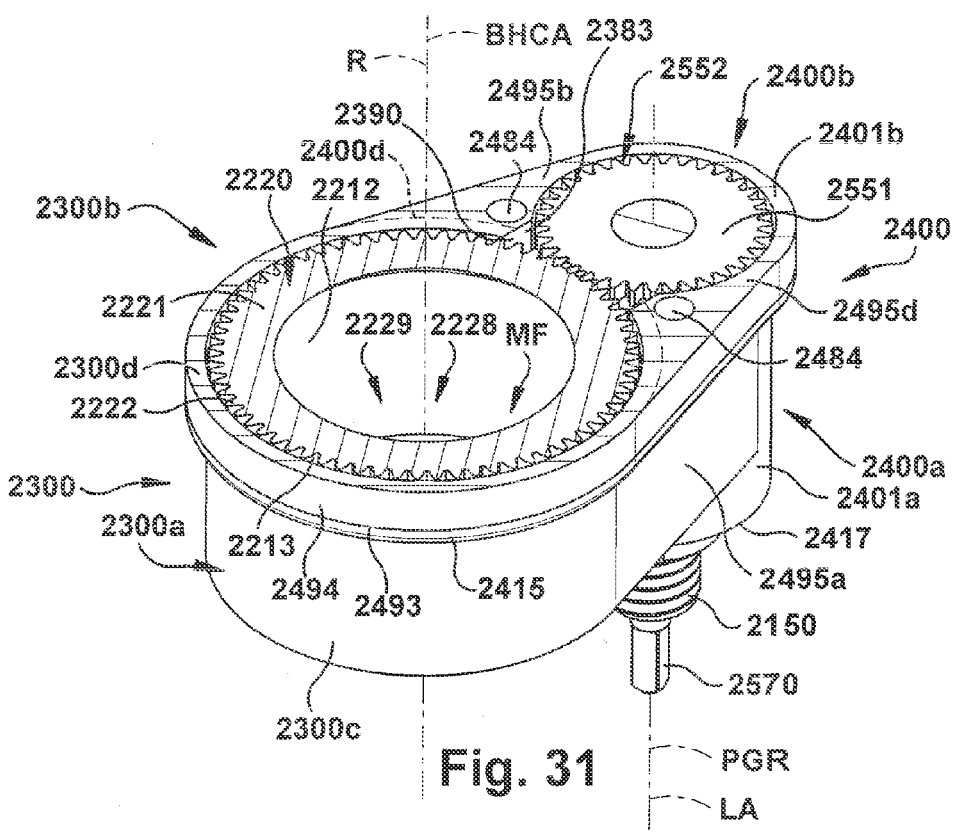
FIG. 31 is a schematic rear perspective, radial section view through a portion of the head assembly of FIG. 24.
Figure 36:
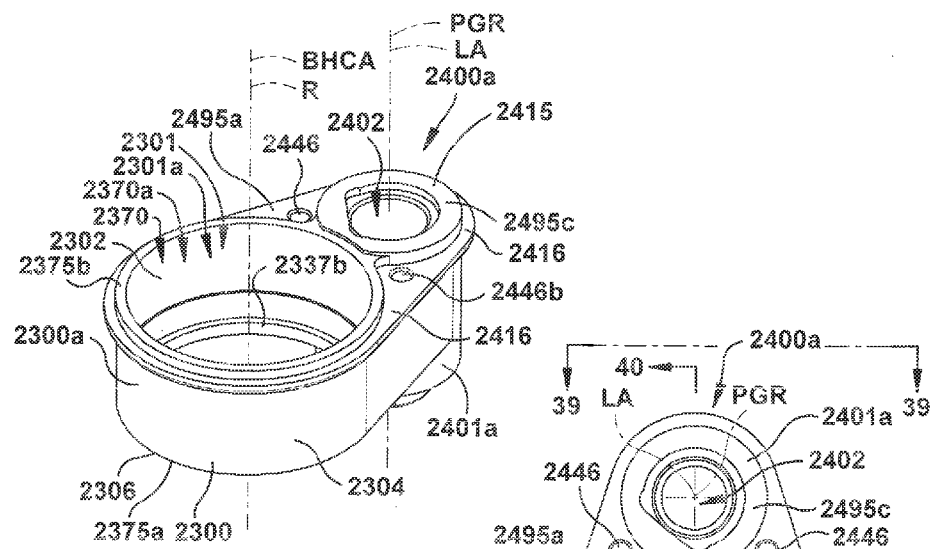
FIG. 36 is a front perspective view of a portion of the head assembly of FIG. 24, including a second, lower section of the blade housing of the blade housing assembly and a second, lower section of the frame.
Figure 37:
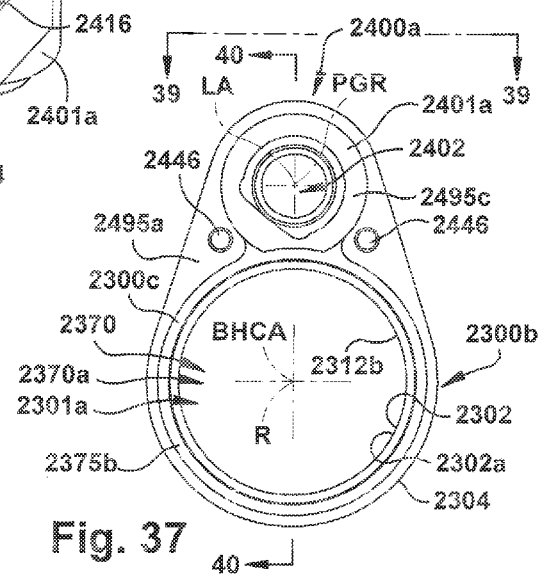
FIG. 37 is a schematic top plan view of the portion of the head assembly of FIG. 36.

In one exemplary embodiment, the drive mechanism 2500 includes a pneumatic motor 2510 and a drive train 2550 that are substantially similar to the pneumatic motor 510 and a drive train 550 of the power operated rotary knife 100 of the first exemplary embodiment. The pneumatic motor 2510 and at least a portion of the drive train 2550 are disposed within the throughbore 2114 of the handle housing 2114. The pneumatic motor 2510 and the drive train of the drive mechanism 2500 couple the rotational force of a rotating output shaft of the pneumatic motor 2510 to rotate the rotary knife blade 2210. In one exemplary embodiment, the drive train 2550 includes a pinion gear 2552 (like the pinion gear 552 of the first exemplary embodiment) and a drive coupling 2570. The drive coupling 2570 engages the rotating output shaft of the pneumatic motor 2510 and a drive coupling of the pinion gear 2552 to rotate the pinion gear 2552 about a pinion gear axis of rotation PGR. As schematically depicted in FIGS. 30 and 31, the pinion gear 2552 includes a gear head 2551 that engages and meshes with and rotatably drives a driven gear 2221 of the rotary knife blade 2210 to rotate the blade 2210 about the blade central axis of rotation R. The pinion gear axis of rotation PGR is coincident, that is, lying along the same axis line, as the handle assembly longitudinal axis LA. The drive mechanism 2500 of the power operated rotary knife 2000 is similar in structure and function to the drive mechanism 500 of the power operated rotary knife 100 of the first exemplary embodiment. For brevity, reference is made to the description of the power operated rotary knife 100 for details of the drive mechanism 2500 of the power operated rotary knife 2000.

Figure 28:
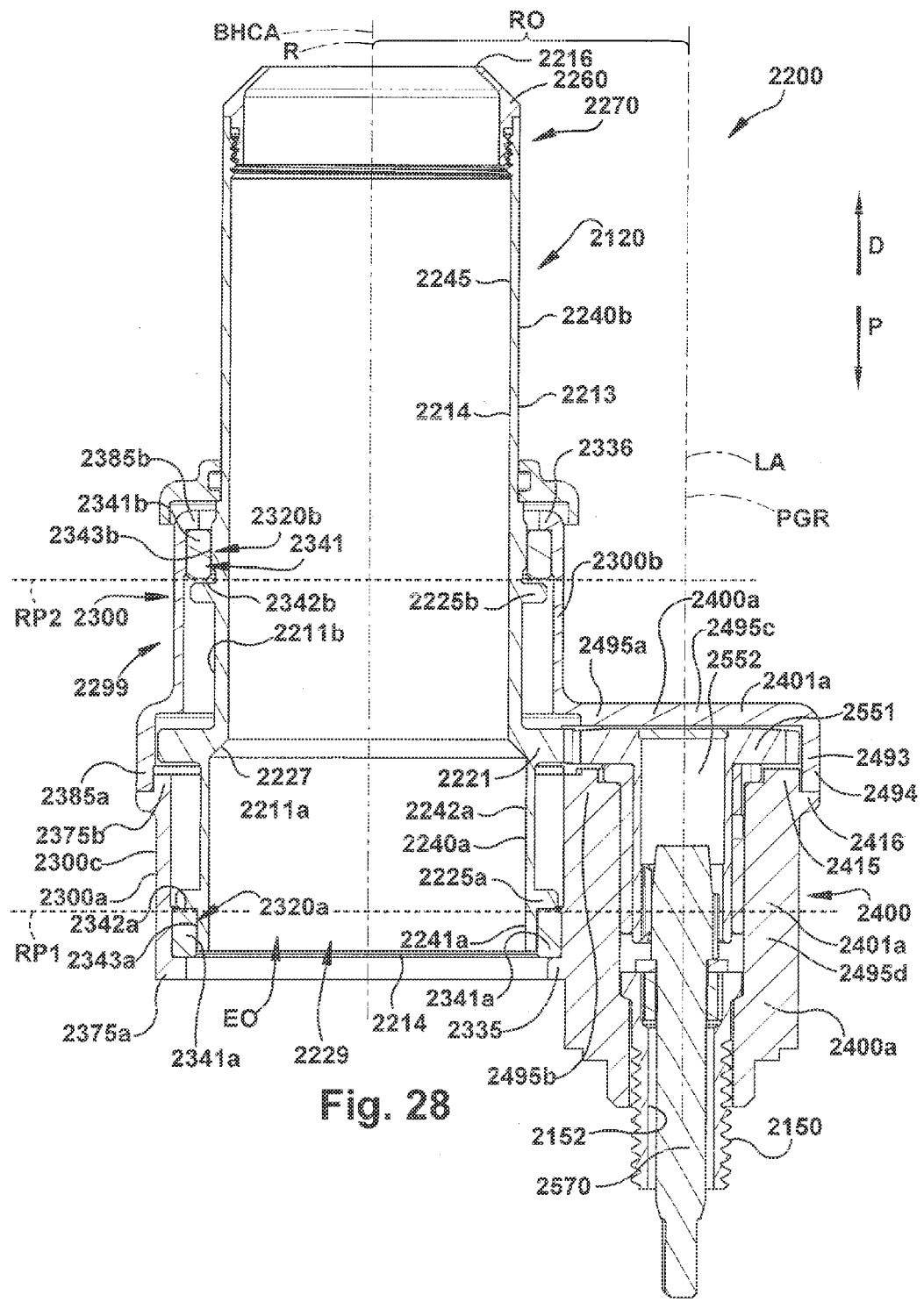
FIG. 28 is a schematic longitudinal section view of the head assembly of FIG. 24.

The head assembly 2200 includes the annular rotary knife blade 2210 (seen, for example, in FIG. 29) rotatably supported by the blade housing 2300 (seen, for example, in FIG. 28). The annular rotary knife blade 2210 includes a generally cylindrical annular body 2211 centered about the blade central axis of rotation R. The annular body 2211 of the rotary knife blade 2210 includes an inner wall 2212 and a radially spaced apart outer wall 2213 and extends from a first, proximal end 2214 and a second, distal end 2216, which defines a cutting edge 2218 of the blade 2210. The inner wall 2212 of the annular body 2211 includes a longitudinally extending throughbore 2229 defining an interior region 2228 of the rotary knife blade 2210. Material cut or trimmed by the cutting edge 2218 through the interior region 2228 and exits from the rotary knife blade 2210 at the proximal end 2214 of the blade 2110 where the removed material (that is, the cut or trimmed material) is directed into a vacuum adapter 2610 and then into an attached vacuum hose 2680 of the vacuum assembly 2600. The removed material moves along a material flow path MF (schematically depicted in FIG. 20) from the cutting edge 2218 of the rotary knife blade 2210 to the vacuum hose 2680 of the vacuum assembly 2600 along axially aligned throughbores AT of the rotary knife blade 2210, the blade housing 2300 and the vacuum adapter 2210. The cutting edge 2218 at the distal end 2216 of the rotary knife blade 2210 defines a cutting plane CP (FIG. 29) of the power operated rotary knife 2000. The cutting plane CP is substantially orthogonal to the central axis of rotation R of the rotary knife blade 2210 and is substantially orthogonal to the longitudinal axis LA of the handle assembly 2110.

The annular blade housing 2300 supports the blade for rotation about the knife blade central axis of rotation R. The blade housing 2300 defines a central longitudinal opening 2370 which receives a lower portion of an annular body 2211 of the rotary knife blade 2210, including the driven gear 2221. The central longitudinal opening 2370 of the blade housing 2300 defines an interior region 2301 of the blade housing 2300 which is centered about a blade housing central axis BHCA. The blade housing central axis BHCA is coincident with the rotary knife blade central axis of rotation R. In one exemplary embodiment, the blade housing 2300 of the present disclosure is an assembly comprising a first, upper section 2300a, a second lower section 2400b, a first lower annular bearing or bushing member 2341a disposed and supported in the first, lower section 2300a and a second annular bearing or bushing member 2341b disposed and supported in the second, lower section 2300b. The first, lower section 2300a of the blade housing 2300 defines a lower portion 2370a of the blade housing throughbore 2370 which encircles a lower portion of the rotary knife blade 2210, while the second, upper section 2300b of the blade housing 2300 defines an upper portion 2370b of the blade housing throughbore 2370 which encircles the driven gear 2221 of the rotary knife blade 2210 and a portion of the rotary knife blade 2210 above (that is, in the distal direction D) the driven gear 2221.

Because the blade housing 2300 comprises the lower and upper sections 2300a, 2300b, an axial extent of the blade housing 2300 along an outer surface of the rotary knife blade 2210 (as seen, for example in FIG. 28) is relatively large compared with, for example, an axial extent of the blade housing 300 along an outer surface of the rotary knife blade 210 of the first exemplary embodiment (as seen, for example, in FIG. 6). This greater axial extent of the blade housing 2300 is advantageously used in the power operated rotary knife 2000 of the present disclosure to provide a bearing interface structure 2299 that supports the rotary knife blade 2210 for rotation about its central axis of rotation R and which spans a significant axial extent of an outer wall 2313 of the annular body 2211 of the rotary knife blade 2210. Specifically, the bearing interface structure 2299 of the power operated rotary knife 2000 includes a bearing assembly 2341 of the blade housing 2300, including axially spaced apart first and second bearing members 2341a, 2341b, and a cooperating bearing structure 2230 of the rotary knife blade 2210, including axially spaced apart first and second lands 2225a, 2225b and axially spaced apart cylindrical surfaces 2226a, 2226b. The blade housing bearing assembly 2341 includes the pair of axially spaced apart annular bearing members 2341a, 2341b supported in the lower and upper sections 2300a, 2300b of the blade housing 2300. The lower bearing member 2341a is supported in the blade housing 2300 near a proximal or lower end 2306 of the blade housing 2300, while the upper bearing member 2341b is supported in the blade housing 2300 near a distal or upper end 2308 of the blade housing 2300. The axially spaced first and second bearing members 2341a, 2341b advantageously respectively engage a first, proximal or lower land 2225a protruding from the outer wall 2313 of the blade annular body 2211 axially spaced below the driven gear 2211 of the rotary knife 2210 and a second, distal or upper land 2225b protruding from the outer wall 2313 of the blade annular body 2211 axially spaced above the driven gear 2211.

This bearing interface structure 2299 of the power operated rotary knife 2000 advantageously provides axially spaced apart bearing regions 2230a, 2230b (FIG. 28) to support the rotary knife blade 2210 for rotation about the central axis of rotation R. Specifically, the axially spaced apart bearing regions 2230a, 2230b include bearing surfaces or bearing faces for axial and radial support of the rotary knife blade 2210 that are on opposite axial sides of the driven gear 2221 of the rotary knife blade and are at axial locations that are spaced relatively far apart. That is, the upper bearing member 2341b is near an upper end of the upper section 2300b of the blade housing 2300, which is axially above the driven gear 2221, while the lower bearing member 2341a is near a lower end of the lower section 2300a of the blade housing 2300, which is axially below the driven gear 2221, such that an axial distance between the lower and upper bearing members 2341a, 2341b is maximized.

This axial spacing of the blade bearing regions 2230a, 2230b provide for greater stability of the rotary knife blade 2210 and reduced reaction forces at the bearing regions 2230a, 2230b under a variety of load conditions and load forces experienced by the blade 2210 and the blade cutting edge 2218 during various cutting and trimming operations. Positioning the driven gear 2221 of the rotary knife blade 2210 between the axially spaced apart bearing regions 2230a, 2230b also advantageously provides for reduced reaction forces at the bearing regions 2230a, 2230b resulting from gear forces applied to the blade 2210 resulting from the pinion gear 2552 meshing with driving the driven gear 2210. Greater stability of the rotating blade 2210 and reduced wear of the driven gear 2221, the pinion gear 2252, and other components of the power operated rotary knife 2000 are all potential advantages of the bearing interface structure 2299 of the present disclosure. Stated another way, the blade housing 2300 and, specifically, the widely spaced apart axial positions of the lower and upper bearing members 2341a, 2341b, support the rotary knife blade 2210 for rotation about the central axis of rotation R and advantageously provide for greater stability and improved bearing support of the rotating rotary knife blade 2210 under both thrust and radial load conditions. Moreover, the fact that the upper and lower bearing members 2341a, 2341b are on opposite axial sides of the driven gear 2221 advantageously reduces or mitigates torque or twisting effects on the rotary knife blade 2210 resulting from loading forces applied to the rotating rotary knife blade 2210 by the meshing and rotation of the driven gear 2221 by the gear head 2251 of the pinion gear 2552.

Figure 20:
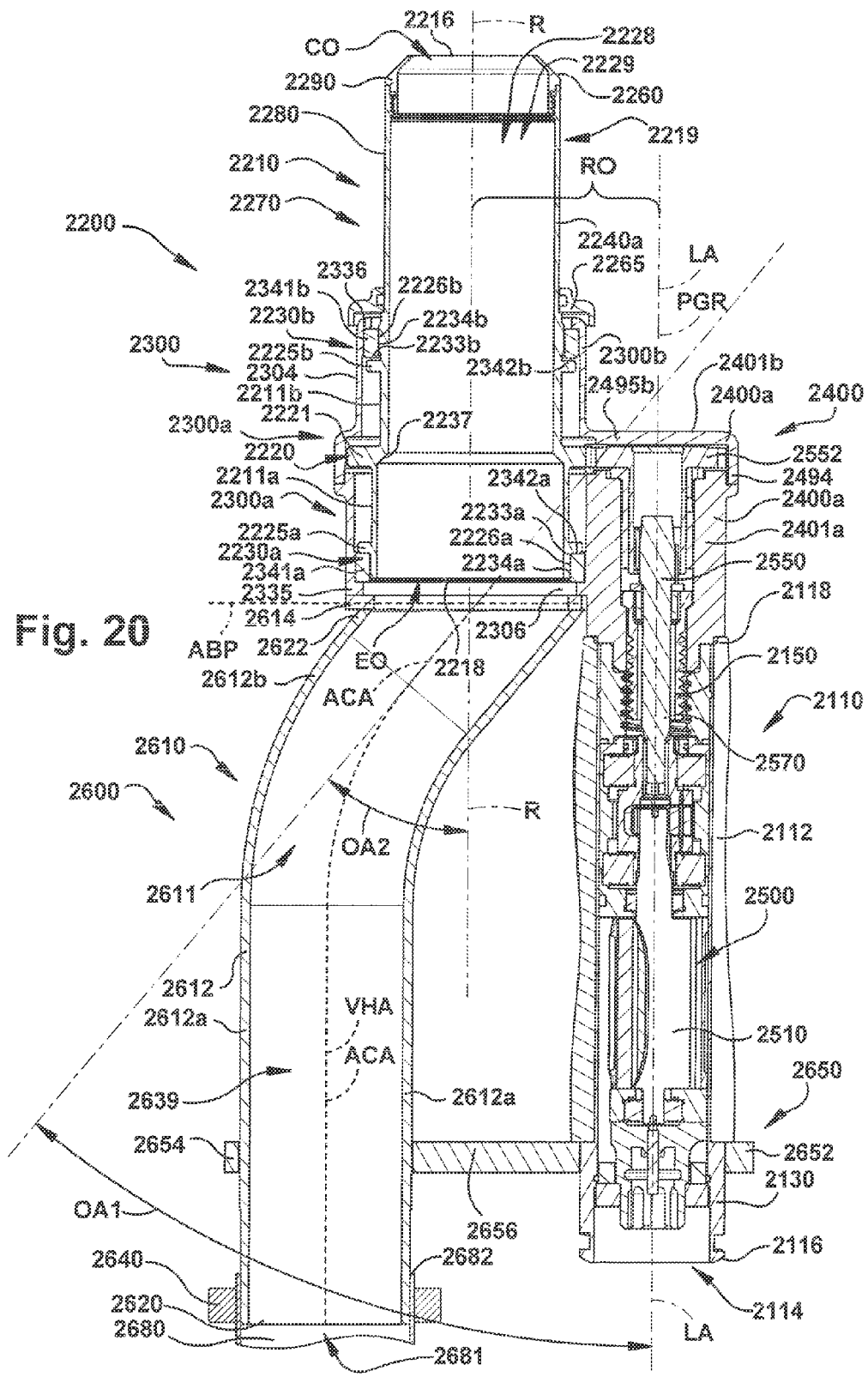
FIG. 20 is a schematic side elevation, longitudinal section view of the power operated rotary knife of FIG. 14, as seen from a plane indicated by the line 20-20 in FIG. 17.
Figure 21:
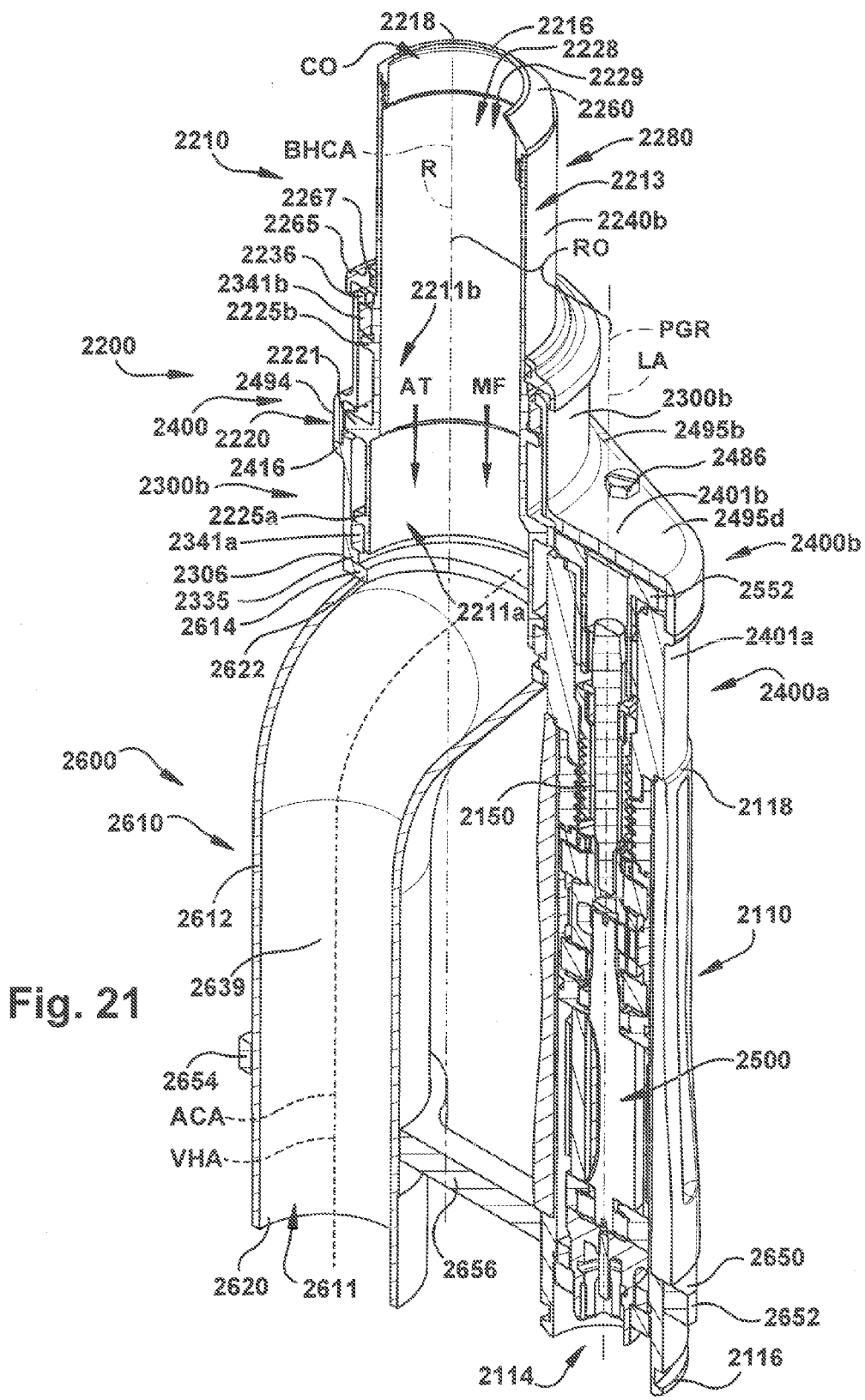
FIG. 21 is a schematic front perspective, longitudinal section view of the power operated rotary knife of FIG. 14, as seen from a plane indicated by the line 20-20 in FIG. 17.
Figure 22:
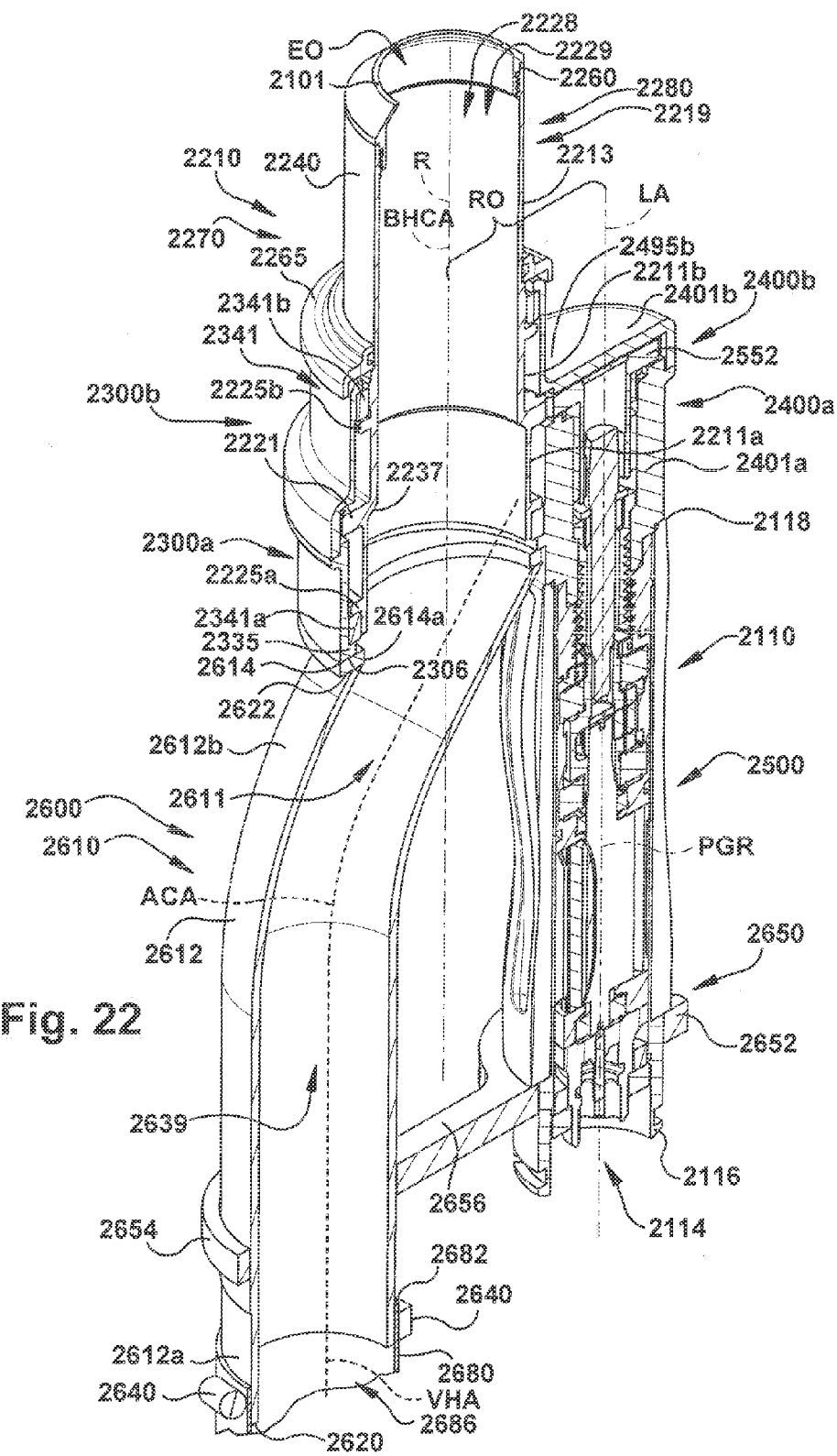
FIG. 22 is a schematic rear perspective, longitudinal section view of the power operated rotary knife of FIG. 14, as seen from a plane indicated by the line 20-20 in FIG. 17.

The head assembly 2200 further includes a frame or frame body 2400 (FIG. 20) which supports the blade housing 2300 and, in turn, the rotary knife blade 2210 for rotation about its axis of rotation R. The frame 2400, in turn, is releasably coupled to the handle assembly 2110 by a threaded cylindrical fastener 2150 which is part of both the handle assembly 2120 and the head assembly 2200. As best seen in FIG. 20, the threaded cylindrical fastener 2150 includes external threads extends between and is threadedly received in threaded interface regions at a proximal end of the frame 2400 and a distal end of the handle housing 2112 of the handle assembly 2110. In one exemplary embodiment, the frame 2400 is a two part assembly that includes a first, upper section 2400a and a second, lower section 2400b. The first, upper section 2400b of the frame 2400 functions a protective cover to overlie and protect the gear head 2251 of the pinion gear 2522 and thus may be referred to alternately as a pinion gear cover and is similar in function to the pinion gear cover 480 of the power operated rotary knife 100 of the first exemplary embodiment. Advantageously, the blade housing 2300 is integral with and extends from the frame 2400. Specifically, the first, upper section 2300a of the blade housing 2300 extends laterally or radially from an interface region 2495a of the first, upper section 2400a of the frame 2400, while the second, lower section 2300b of the blade housing 2300 extends laterally or radially from an interface region 2495a of the second, lower section 2400b of the frame 2400.

The second upper section 2400b of the frame 2400 includes a pair of axially extending threaded openings 2484 which are aligned with a pair of threaded openings 2446 in the first upper section 2400a of the frame 2400. A pair of threaded fasteners 2486 (FIG. 23) extend through the aligned openings 2484, 2446 to secure the first lower section 2400a to the second upper section 2400b of the frame 2400. The lower section 2400a of the frame 2400 further comprises a throughbore 2402 (seen, for example, in FIGS. 36-37 and 40-41) that extends through the lower section 2400a of the frame 2400 and is axially aligned with the handle assembly throughbore 2114 along the handle assembly longitudinal axis LA. As can best be seen in FIG. 20, the throughbore 2402 of the frame lower section 2400a receives a sleeve bushing 2560 that supports the pinion gear 2552 for rotation about the pinion gear axis PGR. The throughbore 2402 also receives the threaded cylindrical fastener 2150 which couples the head assembly 2200 and the handle assembly 2110 and the drive adapter 2570 of the drive train 2550 of the drive mechanism 2500. The throughbore 2402 and means of coupling (e.g., the cylindrical fastener 2150) the frame 2400 and the handle assembly 2110 of the power operated rotary knife 2000 are similar in structure and function to the throughbore 402 and cylindrical fastener 150 of the power operated rotary knife 100 of the first exemplary embodiment. For brevity, reference is made to the description of the power operated rotary knife 100 for details of the throughbore 2402 and the means of coupling the frame 2400 to the handle assembly 2110.

Figure 14:
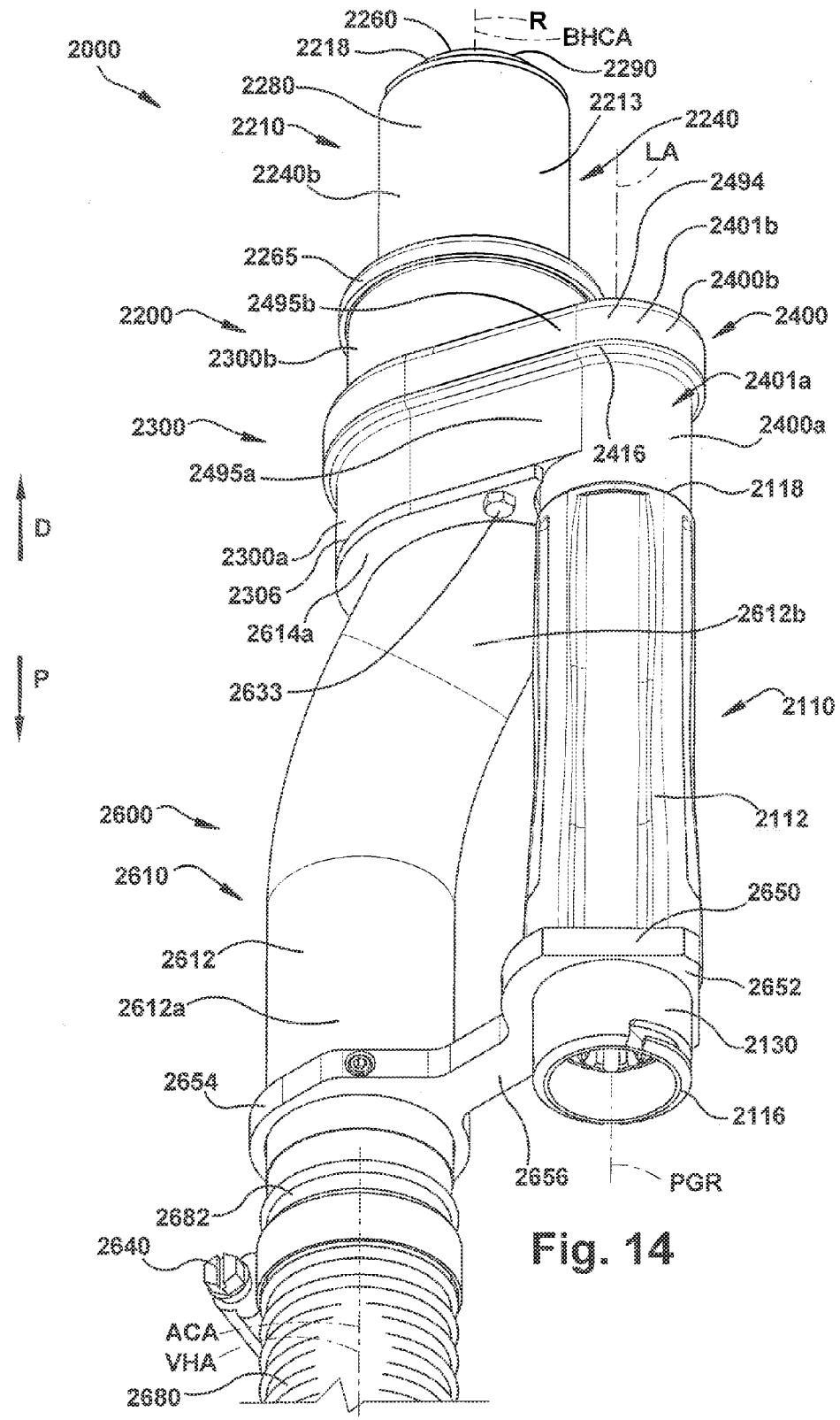
FIG. 14 is a schematic front perspective view of a third exemplary embodiment of a power operated rotary knife of the present disclosure including a handle assembly, a head assembly, and a vacuum attachment assembly.
Figure 15:
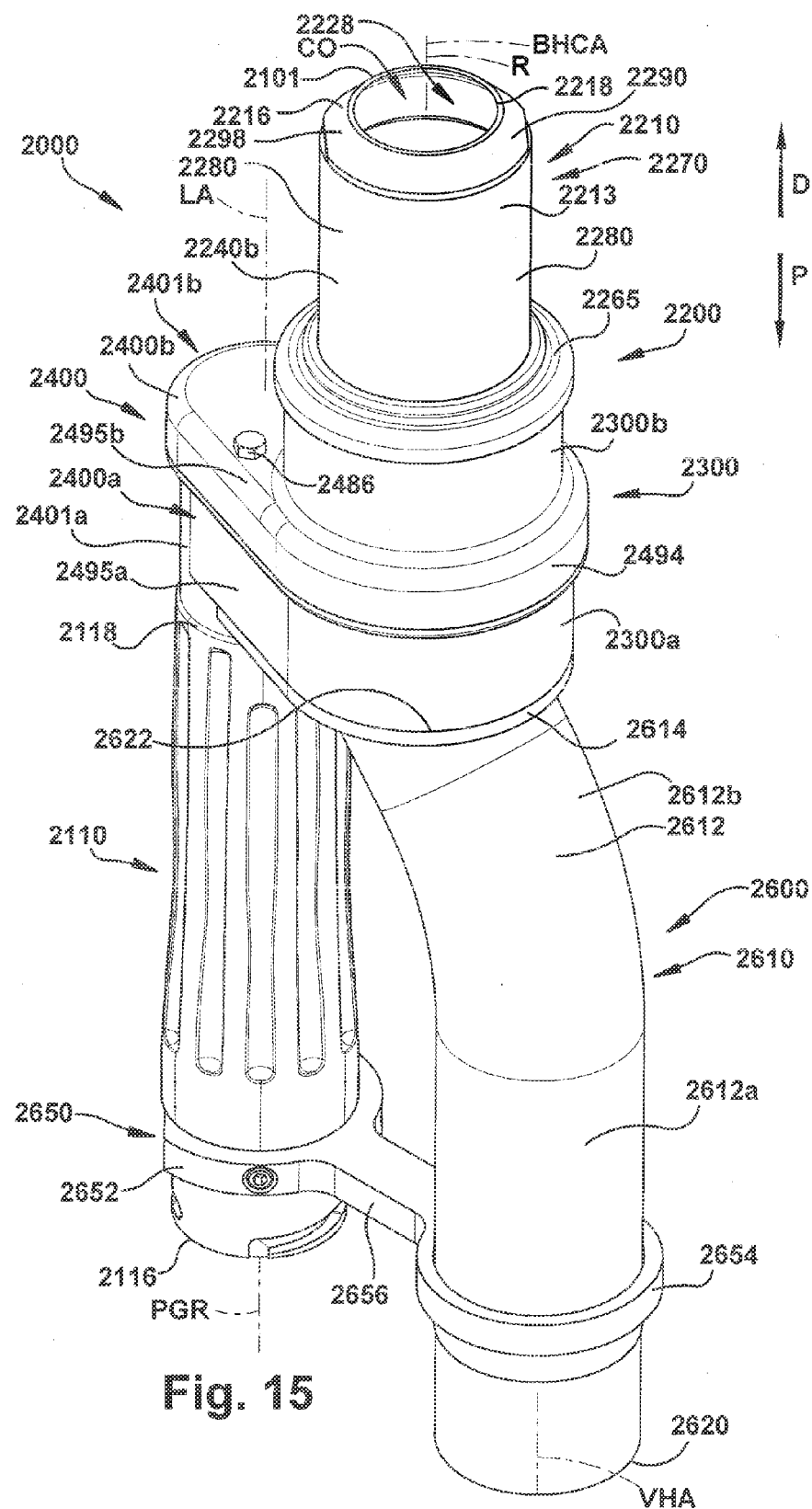
FIG. 15 is a schematic rear perspective view of the power operated rotary knife of FIG. 14.
Figure 16:
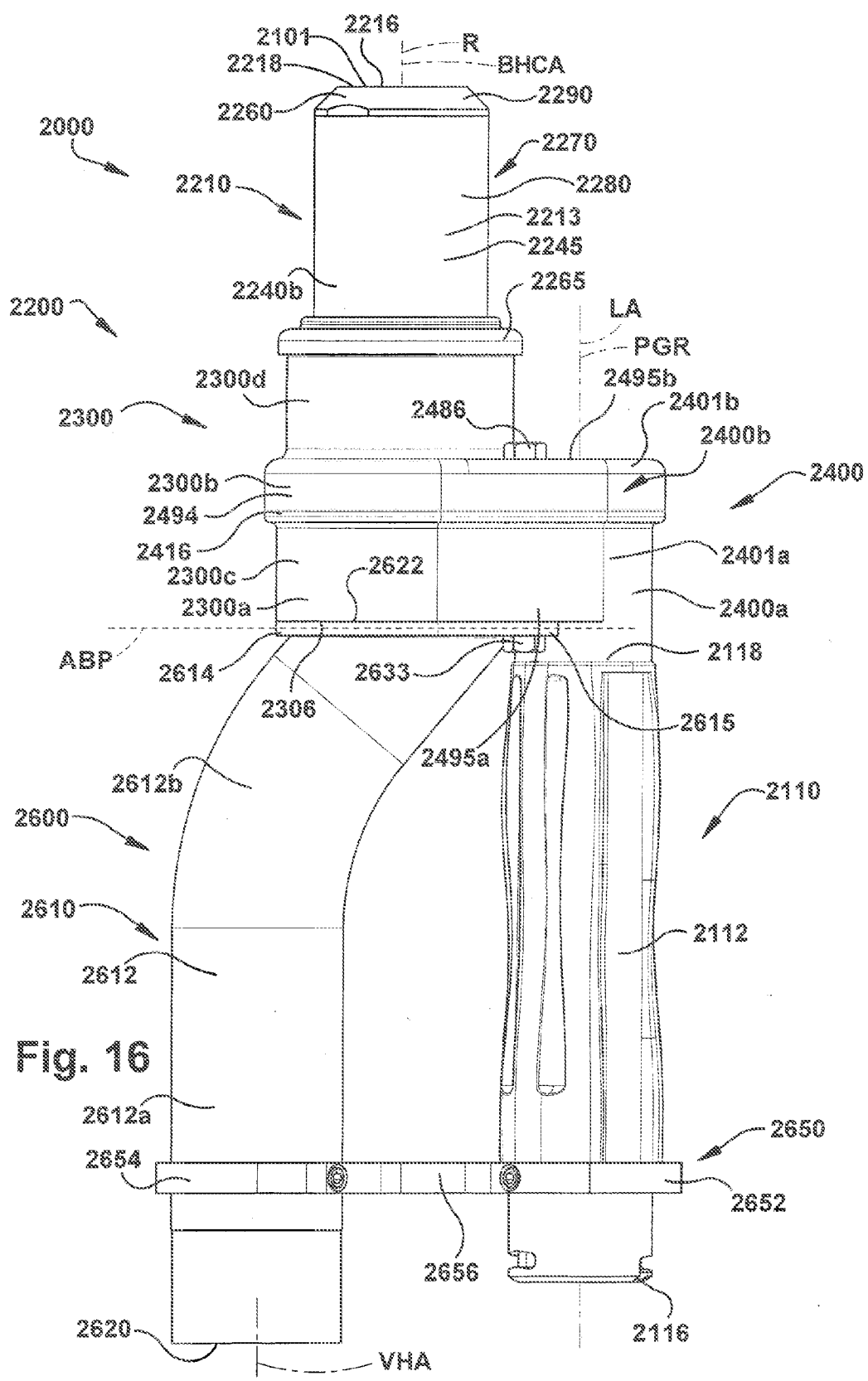
FIG. 16 is a schematic side elevation view of the power operated rotary knife of FIG. 14.
Figure 17:
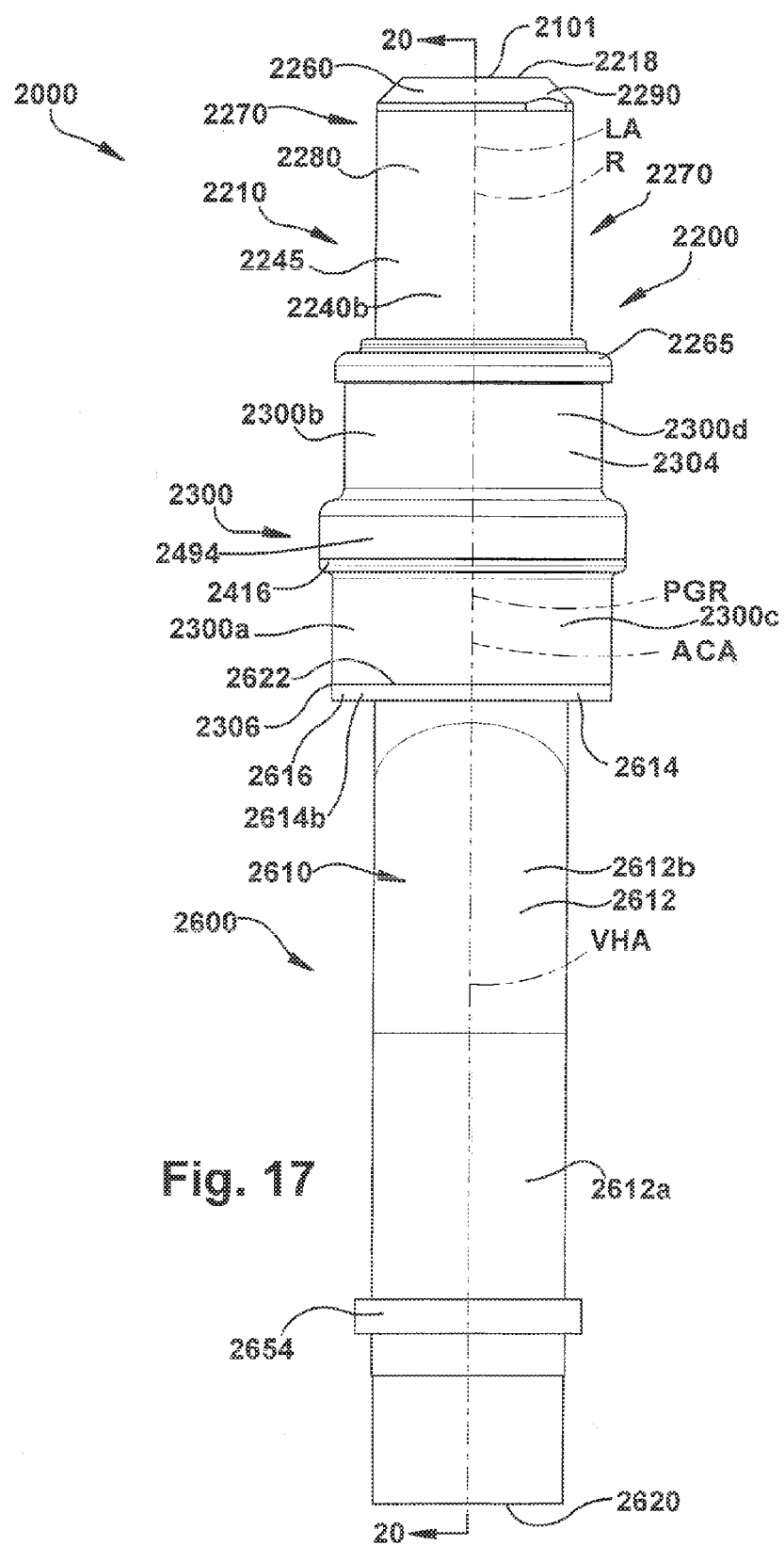
FIG. 17 is a schematic rear elevation view of the power operated rotary knife of FIG. 14, as seen from a plane indicated by the line 17-17 in FIG. 16.
Figure 18:
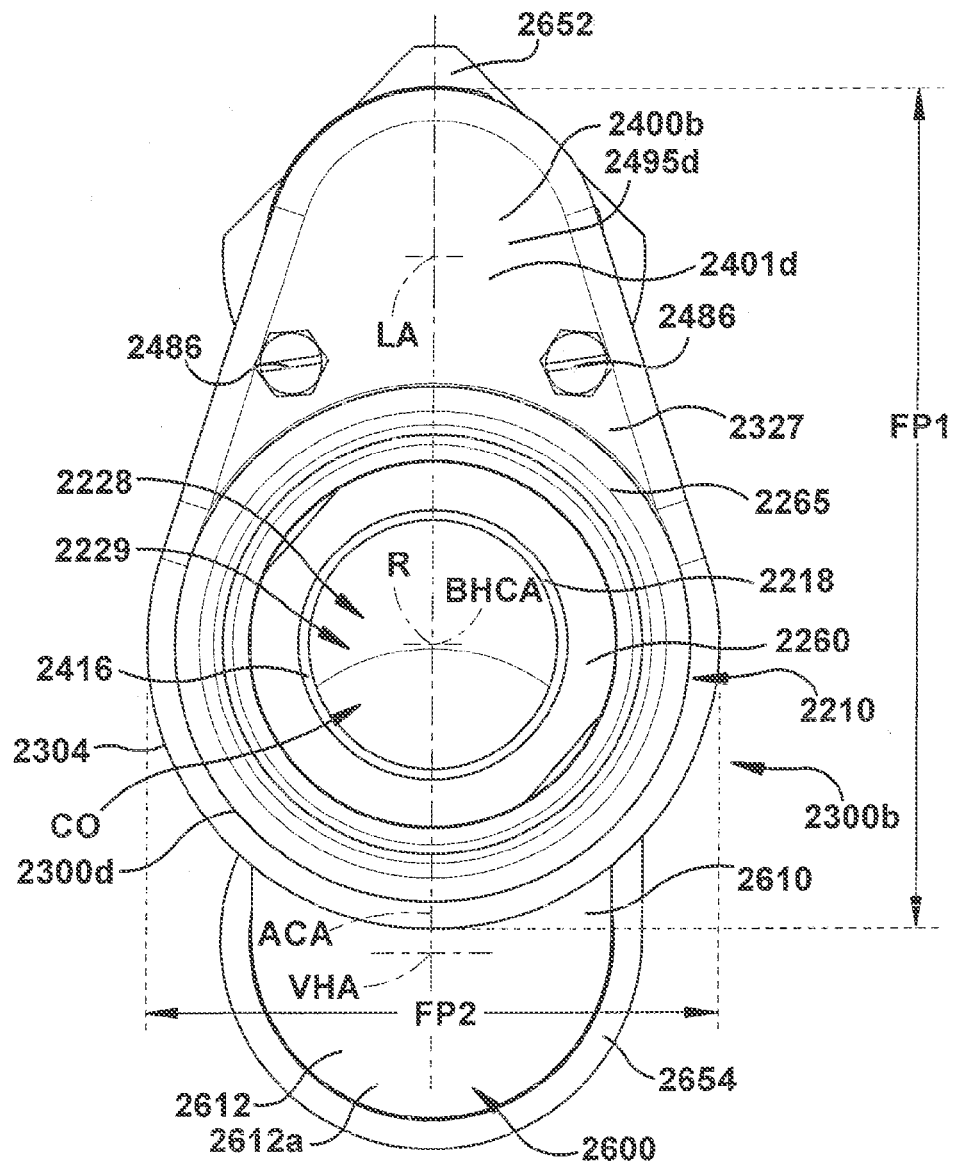
FIG. 18 is a schematic top plan view of the power operated rotary knife of FIG. 14.
Figure 19:
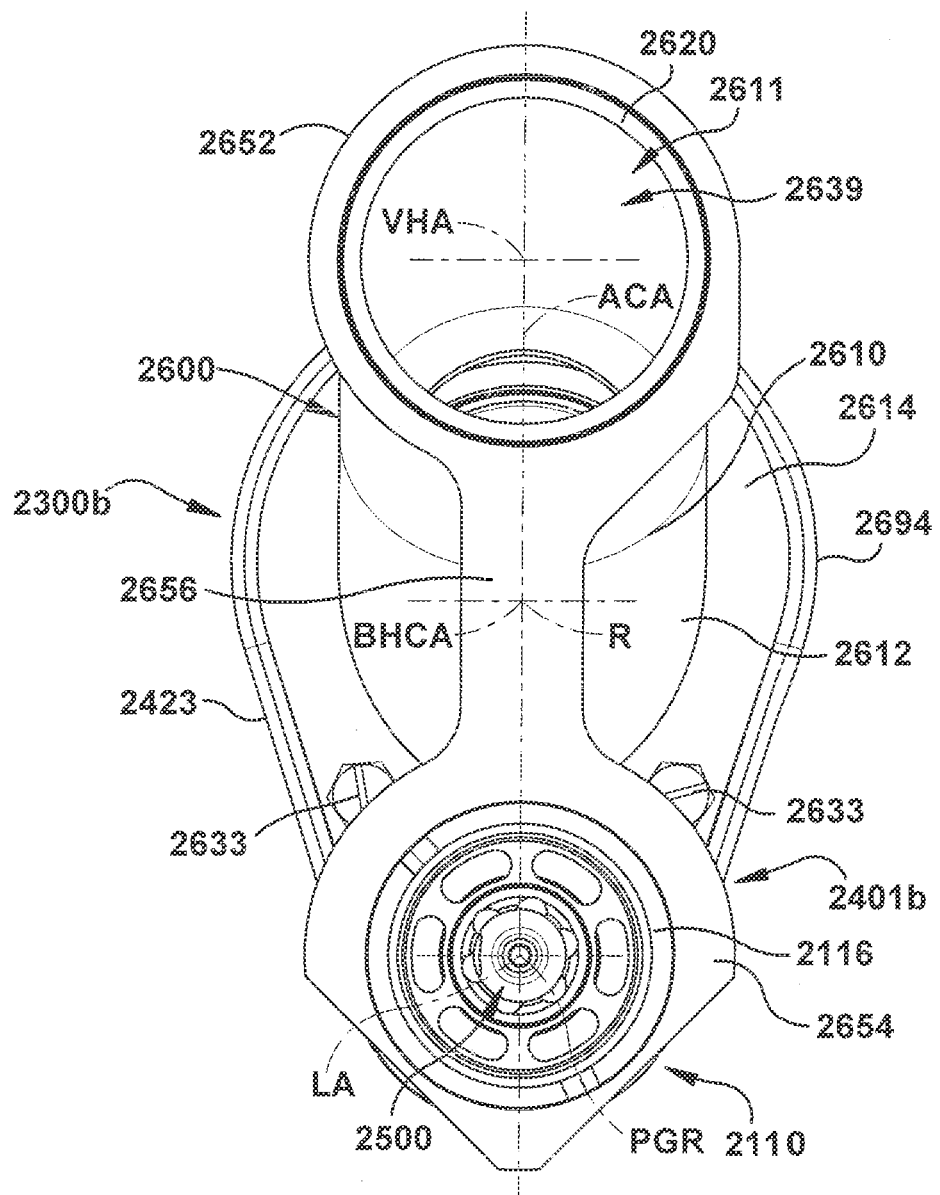
FIG. 19 is a schematic bottom plan view of the power operated rotary knife of FIG. 14.

The vacuum attachment assembly 2600 includes a vacuum adapter 2610 and the flexible vacuum hose 2680 coupled to a proximal end 2620 of the vacuum adapter 2610, similar in function to the vacuum adapter 610 and the flexible vacuum hose 680 of the vacuum attachment assembly 600 of the power operated rotary knife 100 of the first exemplary embodiment. As best seen in FIG. 14, the vacuum adapter 2610 is releasably affixed to the first lower section 2400a of the frame 2400 with a pair of threaded fasteners 2633 (FIG. 23) such that the vacuum attachment assembly 2600 is coupled to the interface region 2495a of the first proximal or lower section 2300a of the blade housing 2300. The attachment of the vacuum adapter 2610 to the first lower section 2400a of the frame 2400 aligns an interior region 2686 of defined by a throughbore 2681 of the vacuum hose 2680 such that the interior region 2686 of the vacuum hose 2680 is in fluid communication with respective: interior regions 2228, 2301 of the rotary knife blade 2210 and the blade housing 2300. Vacuum pressure drawn in the vacuum hose interior region 2686 is communicated through the rotary knife blade interior region 2228 and the blade housing interior region 2301 such that removed material cut by the rotary knife blade 2210 flows or is routed fiom the distal cutting edge 2218 of the rotary knife blade 2210 though the interior regions 2228, 2301 of the rotary knife blade and blade housing 2210, 2300 and into the vacuum hose interior region 2686. The removed material accumulates in a container (not shown) at a proximal end of the vacuum hose 2680. The vacuum hose 2680 of the power operated rotary knife 2000 is similar in function to the vacuum hose 680 of the power operated rotary knife 100 of the first exemplary embodiment. For brevity, reference is made to the description of the power operated rotary knife 100 for details of the vacuum hose 2680 of the power operated rotary knife 2000.

Handle Assembly 2110

The handle assembly 2110 of the power operated rotary knife 2000 is similar in structure and function to the handle assembly 110 of the power operated rotary knife 100 of the first exemplary embodiment. For brevity, reference is made to the description of the power operated rotary knife 100 for details of the handle assembly 2110 of the power operated rotary knife 2000. As can best be seen in FIGS. 20-23, the threaded cylindrical fastener 2150 releasably secures the frame 2400 to the handle assembly 2110, in the same manner as the threaded cylindrical fastener 150 releasably secures the frame 400 to the handle assembly 110 of the power operated rotary knife 100 of the first exemplary embodiment. The threaded cylindrical fastener 2150 is seated in the throughbore 2402 of the frame 2400 and engages a threaded internal region of the handle housing 2112 to couple the frame 2400 and thereby the head assembly 2200 to the handle assembly 2110, as described with respect to the power operated rotary knife 100 of the first exemplary embodiment. The cylindrical fastener 2150 includes a throughpassage 2152 (FIG. 27) that is aligned with the handle assembly longitudinal axis LA, thus, providing a passageway for the rotating drive adapter 2570 that extends through the throughpassage 2152 and rotatably couples the pneumatic motor 2510 and the pinion gear 2552 of the drive mechanism 2500. Extending forward from the proximal end 2116 of the handle housing 2112 is a coupling collar 2130 which receives an air supply coupling (not shown) to releasably connect an air hose supplying compressed air to drive the pneumatic motor 2510 of the drive mechanism 2500.

Head Assembly 2200 and Frame 2400

The head assembly 2200 includes the annular rotary knife blade 2210 (FIGS. 24-25 and 29) rotatably supported for rotation about the central axis of rotation R by the blade housing 2300 (FIGS. 24-25, 28 and 32-41). The head assembly 2200 also includes the frame or frame body 2400 (FIGS. 24-25, 28 and 32-41). In one exemplary embodiment, the blade housing 2300 is integral with and extends from the frame 2400. The frame 2400 includes a first, proximal or lower section 2440a and a second, distal or upper section 2400b coupled together by a pair of threaded fasteners 2486 which extend through vertically oriented threaded openings 2484 of the upper section 2400b and thread into aligned vertically oriented threaded openings 2446 of the lower section 2400a of the frame 2400 to secure the upper and lower frame sections 2400b, 2400a together. As the first proximal blade housing section 2300a extends from an interface region 2495a of the lower frame section 2400a and the second distal blade housing section 2300b extends from an interface region 2495b of the upper frame section 2400b, when the lower and upper frame sections 2400a, 2400b are secured together, the corresponding lower and upper blade housing sections 2300a, 2300b are similarly secured together. The pair of threaded fasteners 2486 are captured in the threaded openings 2484 of the upper section 2400b of the frame 2400. That is, the fasteners 2486 are configured with enlarged threaded portions such that the fasteners 2486 do not fall out of the threaded openings 2484 of the upper section 2400b when the fasteners 2486 are unscrewed or unthreaded from the respective pair of threaded openings 2446 of the interface region 2495a of the lower section 2400a of the frame 2400.

Figure 38:
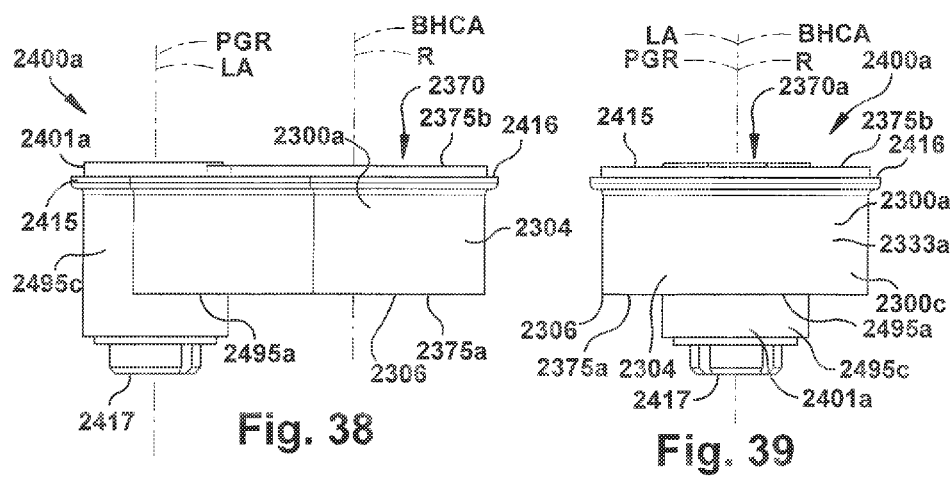
FIG. 38 is a schematic side elevation view of the portion of the head assembly of FIG. 36.
Figure 39:
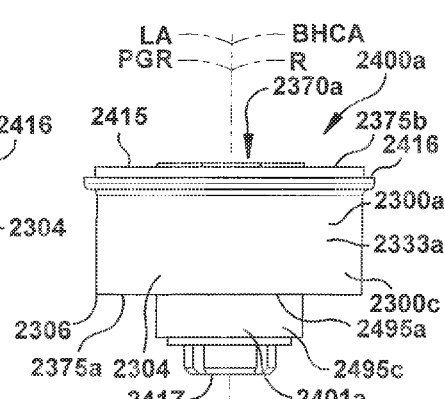
FIG. 39 is a schematic front elevation view of the portion of the head assembly of FIG. 36, as seen from a plane indicated by the line 39-39 in FIG. 37.
Figure 40:
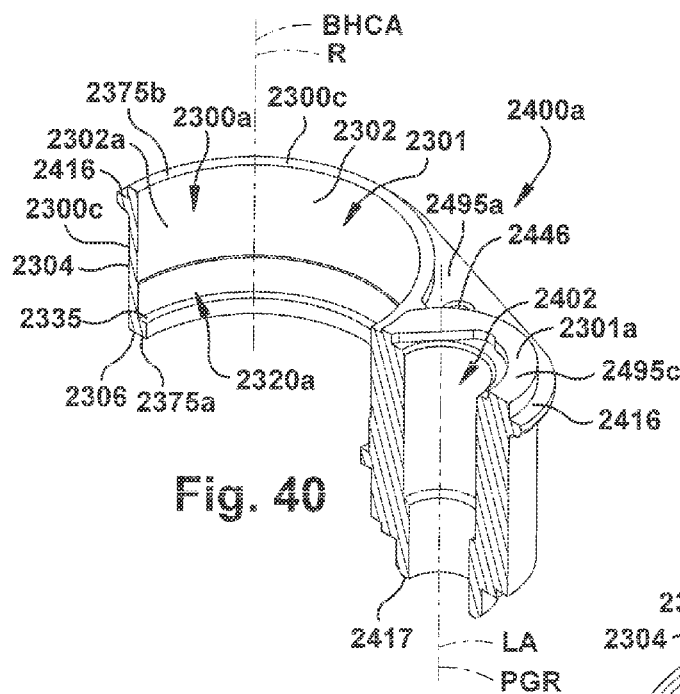
FIG. 40 is a schematic front perspective, longitudinal section view of the portion of the head assembly of FIG. 36, as seen from a plane indicated by the line 40-40 in FIG. 37.
Figure 41:
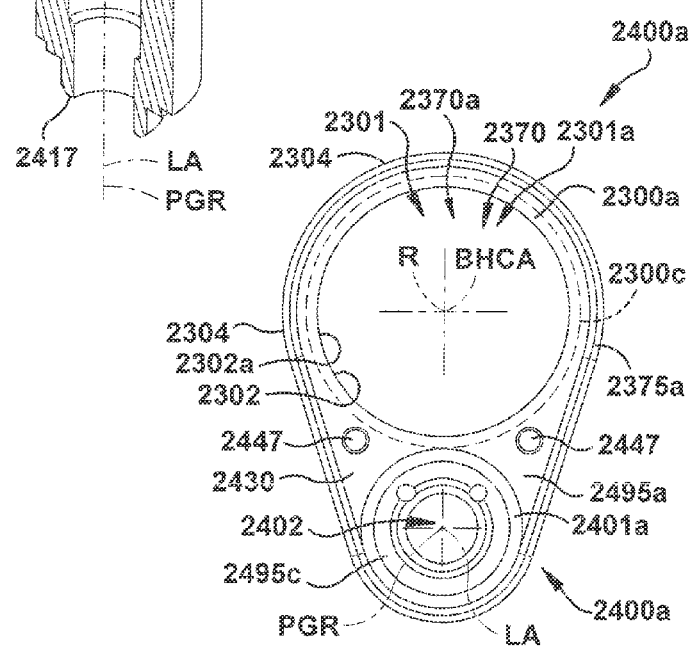
FIG. 41 is a schematic bottom plan view of the portion of the head assembly of FIG. 36.

Specifically, in one exemplary embodiment, as best seen in FIG. 28, a lower end 2493 of the upper frame section 2400b defines a peripheral, downwardly extending rim 2494 which is received by an upper end 2415 of the lower frame section 2400a and bears against a radially outwardly extending shoulder 2416 formed at the upper end 2415 of the lower frame section 2400a thereby providing a seal between the lower and upper sections 2400a, 2400b of the frame 2400 when the threaded fasteners 2486 are tightened. The first, proximal or lower frame section 2400a comprises a central cylindrical body 2401a, the lower blade housing section 2300a, and the interface region 2495a intermediate the central cylindrical body 2401a and the lower blade housing section 2300a and from which the lower blade housing section 2300a laterally or radially extends. As can best be seen in FIGS. 36-41, the central cylindrical body 2401a of the upper section 2400b of the frame body 2400 includes a central region 2495c which defines the frame throughbore 2402 which receives the sleeve bushing 2560 which, in turn, supports the pinion gear 2552 for rotation about the pinion gear axis of rotation PGR. The interface region 2494a of the lower section 2400a of the frame 2400 angles laterally or radially outwardly from the central cylindrical body 2401a and the central region 2495c. Stated another way, the lower section 2300b of the blade housing 2300 extends laterally from the interface region 2495a of the frame lower section 2400a and the interface region 2495a extends laterally from the central region 2495c defined by the central body 2401a. The blade housing lower section 2300a comprises a generally cylindrical wall 2300c (best seen in FIGS. 28, 37 and 41) that encircles a lower portion of the rotary knife blade 2300 extending from an upper end 2375b to a lower end 2375a of the lower section 2300a. The cylindrical wall 2300a of the blade housing lower section 2300a encircles a lower portion of the rotary knife blade 2210 extending from a proximal end 2214 of the rotary knife 2300 to just below or proximal to the driven gear 2221. The cylindrical wall 2300c can be considered as having a substantially uniform thickness or width around an entirety of a 360° circumference, as is schematically depicted in dashed line in FIGS. 37 and 41. The uniform thickness or width of the cylindrical wall 2300c extends 360° through the interface region 2495a, as can best be seen in FIG. 41. As can be seen in FIGS. 38-40, a lower end of the central cylindrical body 2401a extends axially below a lower end 2375a of the lower blade housing section 2300a.

The second, distal or upper frame section 2400b comprises a central body 2401b, the upper blade housing section 2300b, and the interface region 2495b intermediate the central body 2401b and the upper blade housing section 2300b. As can best be seen in FIGS. 30-35, the central body 2401b of the upper section 2400b of the frame body 2400 includes a generally planar, central region 2495d which axially overlies the pinion gear gear head 2551 and the pinion gear rotational axis PGR. As best seen in FIG. 34, the central body 2401 also includes a portion of the rim 2494 of the upper section 2400b that extends axially downwardly from the planar central region 2495d. The interface region 2495b of the upper section 2400b of the frame 2400 angles laterally or radially outwardly from the central body 2401a. Stated another way, the upper section 2300b of the blade housing 2300 extends laterally from the interface region 2495b of the frame upper section 2400b and the interface region 2495b extends laterally from the central region 2495d defined by the central body 2401b. The blade housing upper section 2300b defines a generally cylindrical wall 2300d (best seen in FIG. 34 and schematically shown in dashed line in FIG. 35 to depict a width of the cylindrical wall 2300c) that extends from a lower end 2385a to a lower end 2385b of the upper section 2300b. The cylindrical wall 2300d of the blade housing upper section 2300b encircles a middle portion of the rotary knife blade 2210 extending from the driven gear 2221 to a region of the blade 2210 distal to a second annular land 2225b of the outer wall 2313 of the rotary knife blade 2210. The cylindrical wall 2300d can be considered as having a substantially uniform thickness or width around an entirety of a 360° circumference, as is schematically depicted in dashed line in FIGS. 30-31 and 35. The uniform thickness or width of the cylindrical wall 2300d extends 360° through the interface region 2495b, as can best be seen in FIG. 41.

As best seen in FIG. 35, a downward facing side 2481 of the central region 2495d of the upper frame section 2400b includes a recessed region 2482. The recessed region 2482 provides clearance for the gear head 2551 of the pinion gear 2552 to interact with the driven gear 2221 of the annular body 2211. The recessed region 2482 additionally includes a circumferential clearance gap 2483 (FIG. 35) that provides clearance for the gear head 2551 of the pinion gear 2552 interact and mesh with a plurality of gear teeth 2222 of the driven gear 2221 to operatively engage and rotatably drive the driven gear 2221 of the rotary knife blade 2210.

A planar downward facing side 2430 (FIG. 41) of the lower section 2400a of the frame 2400 in the interface region 2495a includes a pair of threaded openings 2447. A pair of threaded fasteners 2633 extend through aligned threaded openings 2619 in a radially extending tongue portion 2615 of an annular boss 2614 of the vacuum adapter 2610 and thread into the pair of openings 2447 of the lower section 2400b of the frame 2400. The threaded fasteners 2633 secure the vacuum adapter 2610 of the vacuum attachment assembly 2600 to the frame 2400 and thereby couple the vacuum attachment assembly 2600 to the blade housing 2300 such that the interior region 2686 of the vacuum hose 2680 is in fluid communication with respective interior regions 2228, 2301 of the rotary knife blade 2210 and the blade housing 2300. The threaded attachment structure of the annular boss 2614 of the vacuum adapter 2610 to the lower section 2400a of the frame advantageously provides a direct axial alignment of the annular boss 2416 and a proximal end 2306 of the blade housing 2300 and a proximal end 2214 of the rotary knife blade 2210 and a throughbore alignment AT (FIG. 20) their respective throughbores 2611, 2229, 2370. This direct axial alignment of the vacuum adapter 2610, the rotary knife blade 2210 and the blade housing 2300 provides for a direct axial alignment of a central interior region 2639 defined by a throughbore 2611 of the vacuum adapter 2611 with the central interior regions 2228, 2301 defined by the throughbores 2229, 2370 of the rotary knife blade 2210 and the blade housing 2300. This direct axial alignment of the central interior regions 2639, 2228, 2301 advantageously provides for increased vacuum pressure within the central interior region 2228 of the rotary knife blade 2210 by reducing areas where suction may be lost. The goal is to have as much of the vacuum as possible drawn by the vacuum attachment assembly 2600 to be communicated into the interior region 2228 of the rotary knife blade 2210 and through the throughbore 2229 of the rotary knife blade 2210 to the cutting edge 2218 such that removed product is readily drawn by a strong vacuum through the central open interior regions 2228, 2301 of the rotary knife blade 2210 and the blade housing 2300 and into the vacuum attachment assembly 2600.

Annular Rotary Knife Blade 2210

Figure 23:
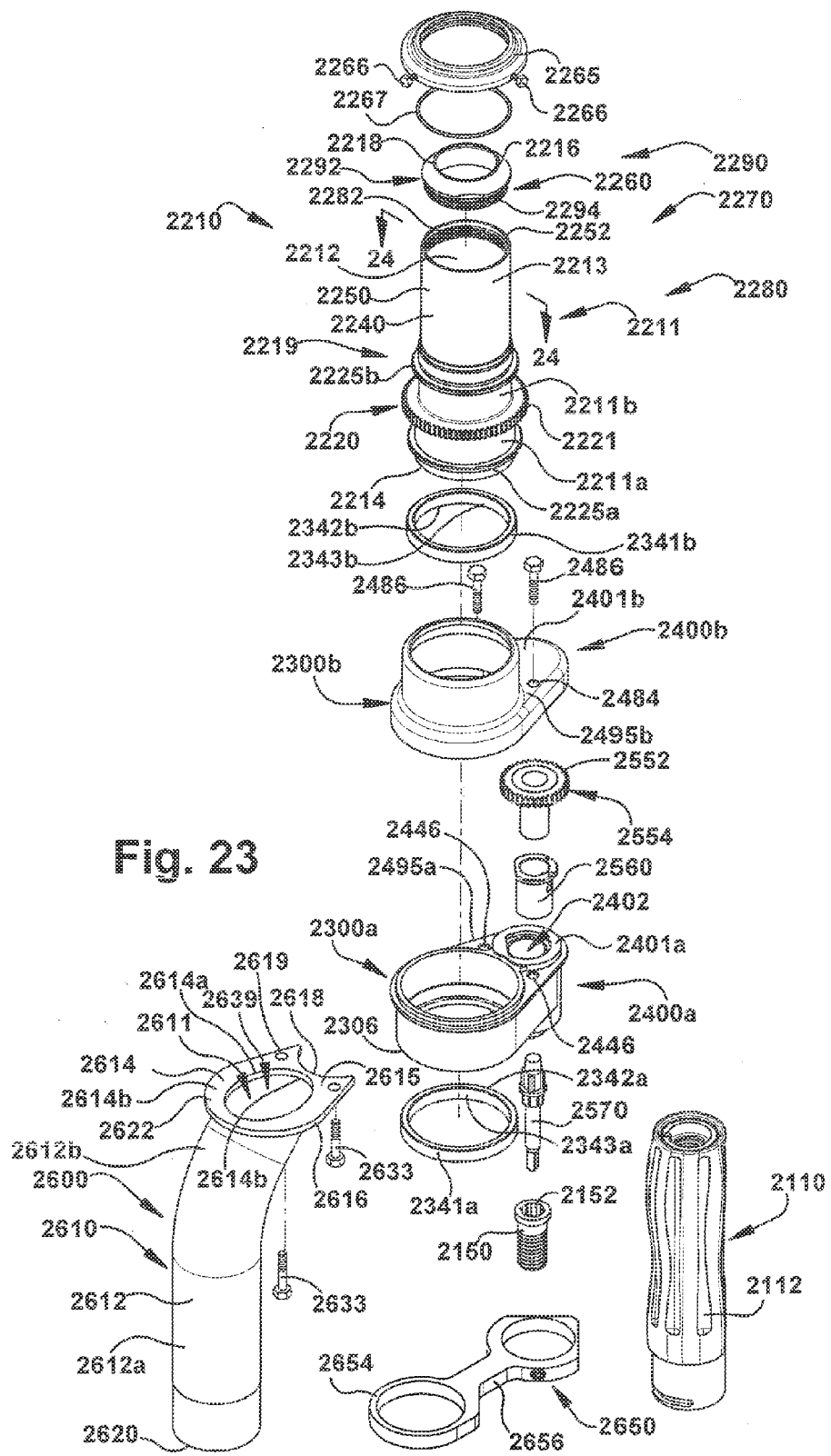
FIG. 23 is a schematic exploded perspective view of the power operated rotary knife of FIG. 14.
Figure 26:
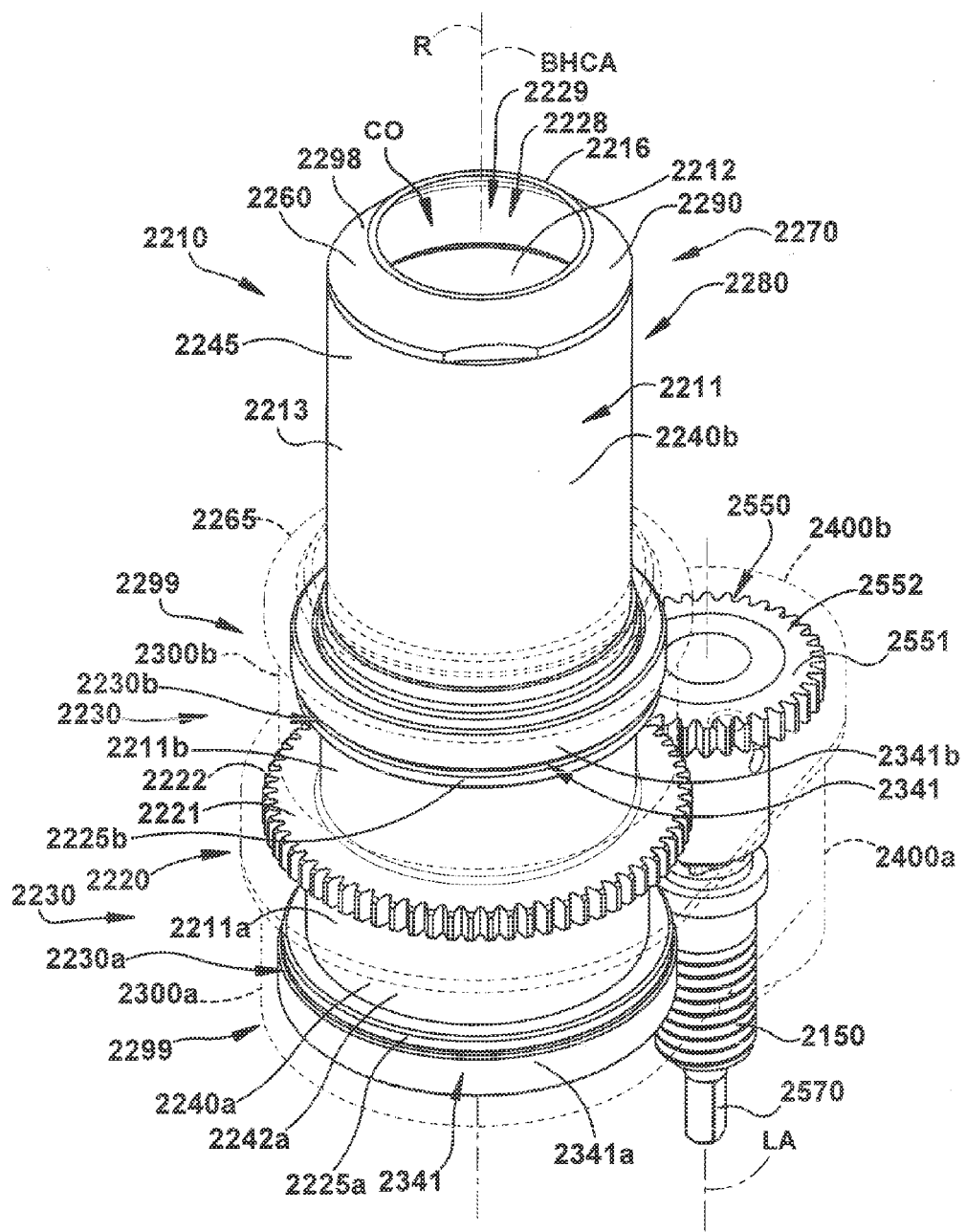
FIG. 26 is a schematic top, rear perspective view of the head assembly of FIG. 24, with the blade housing assembly and the frame in dashed lines.
Figure 27:
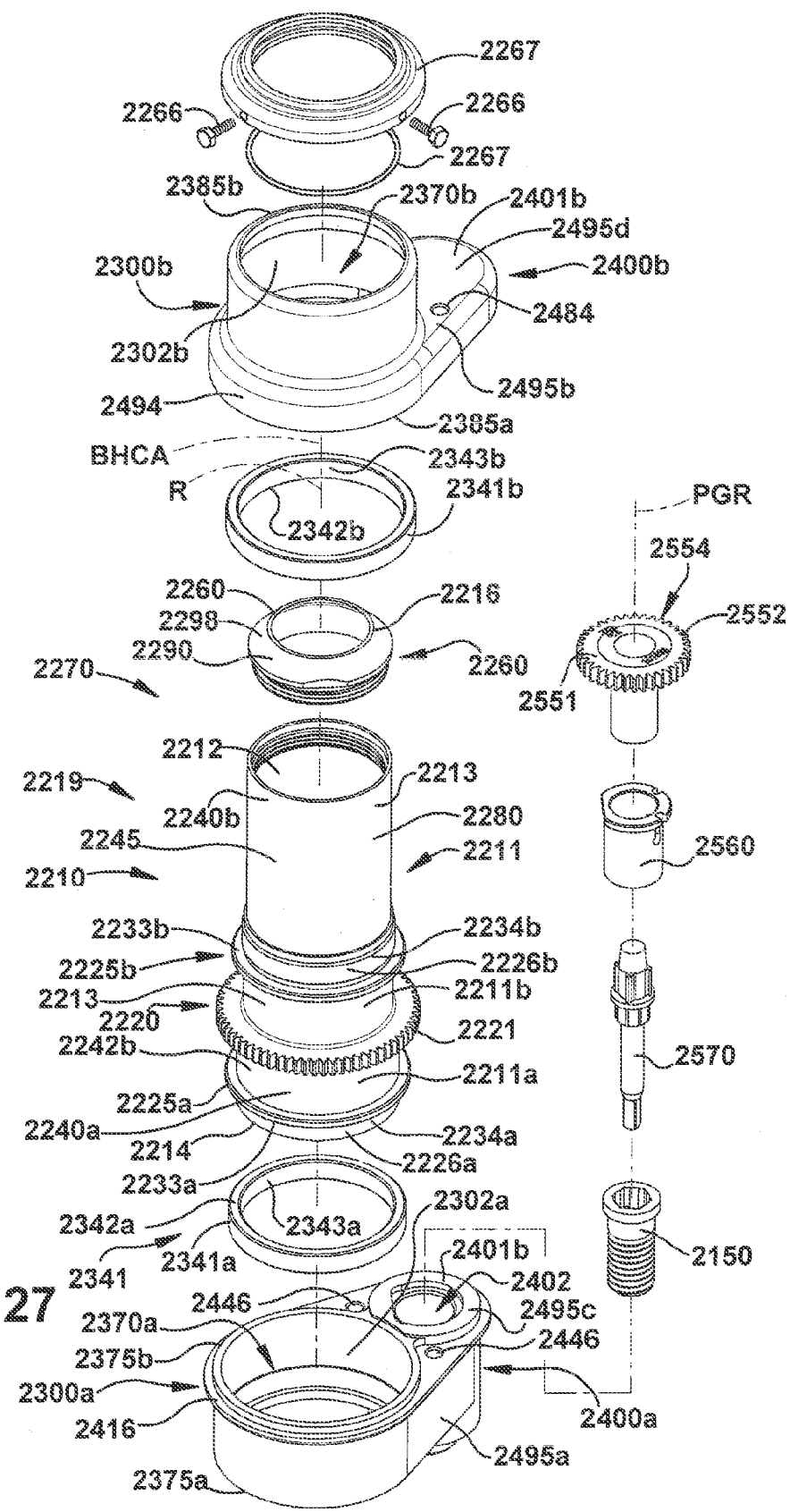
FIG. 27 is a schematic exploded perspective view of the head assembly of FIG. 24.
Figure 29:
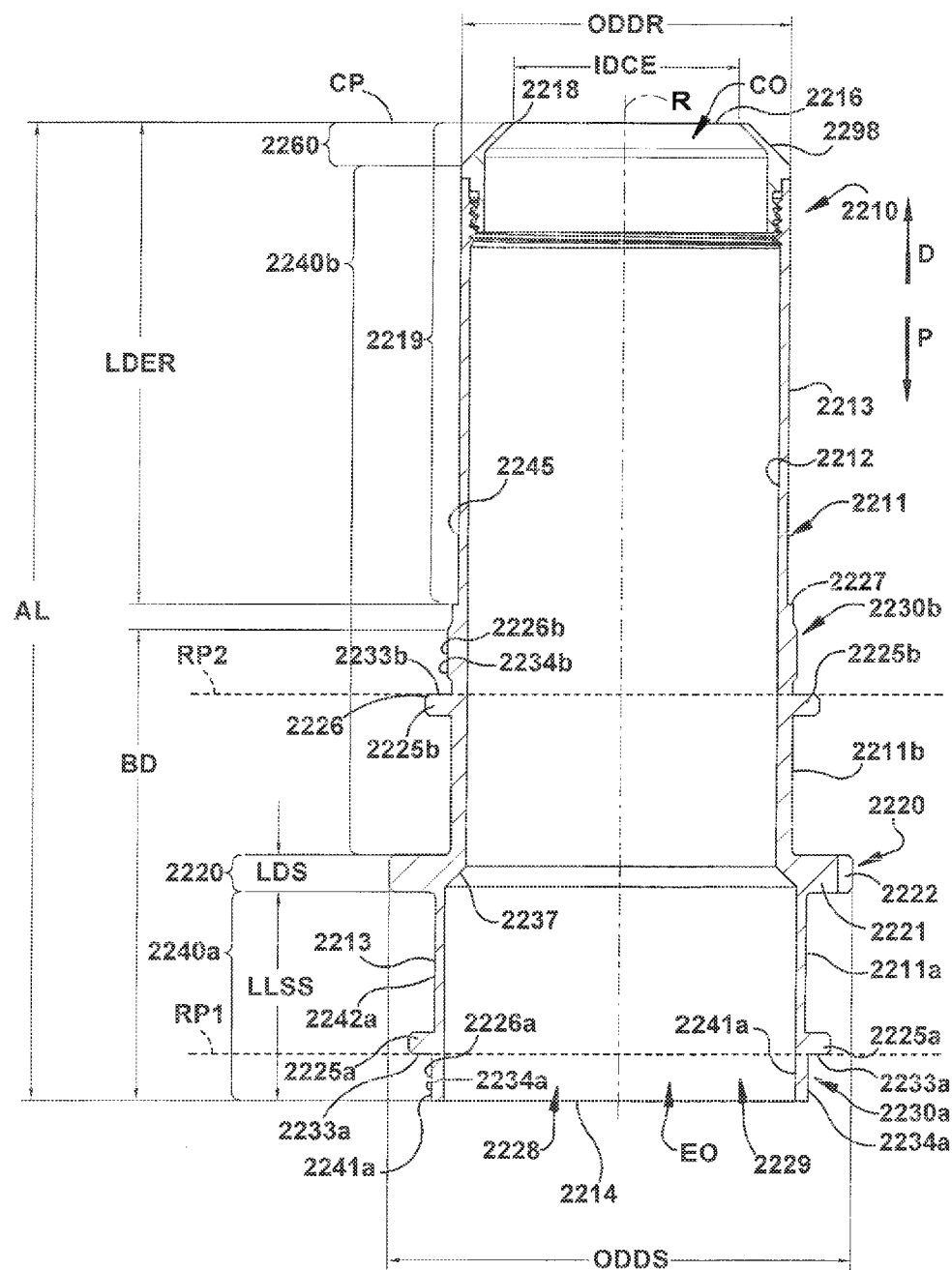
FIG. 29 is a schematic longitudinal section view of the annular rotary knife blade of the head assembly of FIG. 24.

As can best be seen in FIGS. 23, 27 and 29, the annular rotary knife blade 2210 includes the generally cylindrical annular body 2211. The annular body 2211 of the rotary knife blade 2210 includes the inner wall 2212 and the radially spaced apart outer wall 2213 and extends from a first, lower or proximal end 2214 to a second, upper or distal end 2216. The distal end 2216 of the rotary knife blade 2210 is also a distal end 2101 of the power operated rotary knife 2000. The second, upper or distal end 2216 of the rotary blade 2210 defines the cutting edge 2218 and the cutting plane CP of the rotary knife blade 2300. The annular body 2211 of the rotary knife blade 2210 includes an annular drive section 2220, which comprises the driven gear 2221 intermediate and spaced axially from both the proximal end 2214 and the distal end 2216 of the blade 2210.

The annular rotary knife blade 2210 advantageously includes two axially spaced apart bearing regions 2230a, 2230b (FIG. 29) which engage and bear against corresponding first and second axially spaced apart bearing regions 2320a, 2320b (FIG. 28) of the blade housing 2300 to rotatably support the rotary knife blade 2210 for rotation with respect to the blade housing 2300 about the knife blade central axis of rotation R. In one exemplary embodiment of the power operated rotary knife 2210 of the present disclosure, the first lower bearing region 2230a of the blade 2210 includes thrust and radial bearing surfaces 2233a, 2234a that bear against respective corresponding thrust and radial bearing surfaces 2342a, 2343a of the lower bearing member 2341a. The second upper bearing region 2230b of the blade 2210 includes thrust and radial bearing surface 2233b, 2234b that bear against respective corresponding thrust and radial bearing surfaces 2342b, 2243b of the upper bearing member 2341b.

In one exemplary embodiment, the annular body 2211, commencing at the proximal end 2214 includes: a) a first, proximal or lower annular spacer section 2240a adjacent the proximal end 2214, b) the annular drive section 2220, which includes the driven gear 2221, c) a second, upper annular spacer section 2240b, and d) an annular blade section 2260 adjacent the distal end 2216 of the annular body 2211, which includes the cutting edge 2218. The driven gear 2221 is axially spaced from both the proximal and distal ends 2214, 2216 of the rotary knife blade 2210. Stated another way, the first and second spacer sections 2240a, 2240b of the annular body 2211 are interrupted or are split by the intermediate positioning of the driven gear 2221. As can be seen in FIG. 28, the blade housing 2300 encircles two axially extending portions 2211a, 2211b of the annular body 2211 which are adjacent the driven gear 2221. The axially extending portion 2211a is within the first, lower or proximal spacer section 2240a and is axially below the driven gear 2221, that is, in the down or proximal direction P, as labeled in FIGS. 14 and 28-29. The axially extending portion 2211b is within the second, upper or distal spacer section 2240b and is axially above the driven gear 2221, that is, in the up or distal direction D, as labeled in FIGS. 14 and 28-29). The driven gear 2221 of the rotary knife blade 2210 of the power operated rotary knife 2000 is similar in structure and function to the driven gear 221 of the power operated rotary knife 100 of the first exemplary embodiment. For brevity, reference is made to the description of the power operated rotary knife 100 for details of the driven gear 2221 of the power operated rotary knife 2000. As can be seen in FIG. 29, the driven gear 2221 is formed as an annular radially outwardly extending protuberance in the outer wall 2313. The driven gear 2221 extends radially outwardly with respect to the adjacent axially extending portions 2211a, 2211b of the annular body 2211 of the rotary knife blade 2210, that is, the driven gear 2221 extends radially outwardly from a general extent of the outer wall 2213 of the annular body 2211.

In addition to the radially extending driven gear 2221, the outer wall 2213 of the annular body includes two other radially outwardly extending protuberances or lands 2225a, 2225b, axially spaced from the driven gear 2221, which provide thrust bearing support surfaces 2233a, 2233b for the rotary knife blade 2300. In one exemplary embodiment, the first, lower or proximal land 2225a is axially spaced by the first axially extending portion 2211a from the driven gear 2221 from. A lower radial surface 2226a of the first proximal land 2225a defines the axially downwardly facing first bearing support surface 2233a of the blade 2210, which, in conjunction with the first lower or proximal bearing member 2341a of the blade housing 2300, limits axial travel of the rotary knife blade 2210 with respect to the blade housing 2300 in the proximal or downward direction P. Specifically, the lower radial surface 2226a of the first proximal land 2225a bears against an upper radial bearing surface 2342a of the first proximal bearing member 2341a to limit axial travel of the blade 2210 with respect to the blade housing 2300 in the proximal direction P. In one exemplary embodiment, the second, upper or distal land 2225b is axially spaced by the second axially extending portion 2211b from the driven gear 2221. An upper radial surface 2226b of the second distal land 2225b defines the axially upward facing second bearing support surface 2233b of the blade 2210, which, in conjunction with the second upper or distal bearing member 2241b of the blade housing 2300, limits axial travel of the rotary knife blade 2210 with respect to the blade housing 2300 in the distal or upward direction D. Specifically, the upper radial surface 2226b of the second distal land 2225b bears against a lower radial bearing surface 2342b of the second distal bearing member 2341b to limit axial travel of the blade 2210 with respect to the blade housing 2300 in the distal direction D. As best seen in the illustrated example embodiment of FIGS. 28 and 29, the first and second lands 2225a, 2225b are annular and extend radially outwardly with respect to the adjacent axially extending portions 2211a, 2211b of the annular body 2211 of the rotary knife blade 2210, that is, the first and second lands 2225a, 2225b extend radially outwardly from a general extent of the outer wall 2213 of the annular body 2211 in respective regions of the lands 2225a, 2225b.

As can best be seen in FIG. 29, in one exemplary embodiment, radial bearing support for the rotary knife blade 2210 is provided by the first and second bearing members 2341a, 2341b as follows. In the lower spacer section 2240a, a radial thickness of the annular body 2211, that is, a radial distance between inner and outer walls 2212, 2213 is different axially above and axially below the first proximal land 2225a. Specifically, a proximal or lower region 2241a of the lower spacer section 2240a extending between the proximal land 2225a and the lower or proximal end 2214 of the blade 2210 is radially outwardly steps as compared to a distal or upper region 2242a extending between the proximal land 2225a and the driven gear 2221. Because the interior diameter defined by the inner wall 2213 of the blade body 2211 in the region of the lower spacer section 2240a is uniform, the radial thickness or radial width of the annular body 2211 is greater in the proximal region 2241a. Hence, it is proper to view the outer wall 2213 in the proximal region 2241a as a radially outwardly extending thickened cylindrical surface or thickened cylindrical band 2226a. As can best be seen in FIG. 29, the thickened cylindrical surface or band 2226a of the outer wall 2213 functions as a lower cylindrical radial bearing surface 2234a for proposes of handling radial bearing loads applied to the rotary knife blade 2210. Specifically, the lower cylindrical radial bearing surface 2234a of the outer wall 2213 of the annular body 2211 bears against a vertically or axially extending cylindrical outer bearing surface 2343a (FIG. 28) of the first proximal bearing member 2341a of the blade housing 2300 to provide radial bearing support for the blade 2210.

Similarly, as can best be seen in FIG. 29, in the second, upper spacer section 2240b, in a distal or upper region 2245 of the upper spacer section 2240b axially above the second distal land 2225b, there is a radially outwardly extending thickened cylindrical surface or thickened cylindrical band 2226b. Because the interior diameter defined by the inner wall 2213 of the blade body 2211 in the region of the upper spacer section 2240a is uniform, the radial thickness or radial width of the annular body 2211 is greater in the region of the thickened cylindrical surface or band 2226b. Hence, it is proper to view the outer wall 2213 in the region of the cylindrical band 2226b as a radially outwardly extending or thickened cylindrical surface. The thickened cylindrical band 2226b of the outer wall 2213 functions as an upper cylindrical radial bearing surface 2234b for proposes of handling radial bearing loads applied to the rotary knife blade 2210. Specifically, the upper cylindrical radial bearing surface 2234b of the outer wall 2213 of the annular body 2211 bears against a vertically or axially extending cylindrical outer bearing surface 2343b (FIG. 28) of the first proximal bearing member 2341a of the blade housing 2300 to provide radial bearing support for the blade 2210. The thickened cylindrical bands 2226a, 2226b defining the lower and upper cylindrical radial bearing surfaces 2234a, 2234b, respectively, of the blade annular body 2211, as can best be seen in FIG. 29, are advantageously regions of increased thickness or increased width of the annular body 2211 (that is, thickness or width being measured as a radial distance between the inner and outer walls 2212, 2213) and are spaced axially far apart with respect to a longitudinal extent of the rotary knife blade 2210. The increased radial thickness of the thickened cylindrical bands 2226a, 2226b advantageously provides for greater stiffness and durability of the respective bearing surfaces 2234a, 2234b, while large axial spacing between the thickened cylindrical bands 2226a, 2226b advantageously provide for greater stability and improved bearing support of the rotating rotary knife blade 2210 under radial load conditions, as previously explained.

Looking at the outer wall 2213 of the annular body 2211 of the rotary knife blade 2210, ignoring the drive section 2220, which includes the driven gear 2221, and further ignoring the first and second lands 2225a, 2225b, an outer diameter of the second upper spacer section 2240b is smaller in diameter than an outer diameter of the first lower spacer section 2240a and an outer diameter of the blade section 2260 in a distal tapered region 2298 tapers from an the outer diameter of the second upper spacer section 2240b in a region adjacent the blade section 2260 to a minimum outer diameter of the rotary knife blade 2210, which is present at the cutting edge 2218 or upper distal end 2216 of the blade 2210. The cutting edge defines a cutting opening CO of the rotary knife blade 2210, while an exit opening EO of the blade is defined by an inner diameter of the proximal end 2214 of the blade 2210. The driven gear 2221 defines the largest outer diameter of the rotary knife blade 2210. The outer wall 2313, in the region of the upper spacer section 2240b axially spaced from and above or distal to the upper cylindrical radial bearing surface 2234b includes a radially inward step 2227 in the outer wall 2313 that functions to reduce the outer diameter of the outer wall in the region of the upper spacer section 2240b adjacent the blade section 2260. The step 2227 in the outer wall 2214 also acts as an axial stop for the positioning of a shroud 2265 on the outer wall 2313 of the upper spacer section 2240b.

Advantageously, the diameter blade section 2260 and the upper spacer section 2240b have reduced outer diameters compared with an outer diameter of a drive section 2220 comprising the driven gear 2221 and the lower spacer section 2240a. A distally extending section 2219 (FIG. 29) of the rotary knife blade 2210, which is distal to the step 2227 in the outer wall 2313 and the shroud 2265, includes the smallest outer diameter of the rotary knife blade 2210, other than the tapered blade section 2260 which tapers from the outer diameter of the upper region of the upper spacer section 2240a to the cutting opening CO defined by the cutting edge 2218. The reduced outer diameter of the smaller diameter blade section 2260 and the spacer section 2240 affords reduced drag and ease of manipulation and position of the distally extending region 2219 of the rotary knife blade 2210 which is likely to contact the product during cutting and trimming operations. For example, the reduced outer diameter of the distally extending region 2219 of the rotary knife blade 2210 is advantageous for reduced drag and ease of manipulation, for example, when the power operated rotary knife 2000 is inserted into an abdominal cavity of a carcass and the distally extending region 2219 of the blade 2210 is moved forward into a narrow portion of the abdominal cavity to remove a pocket of fat tissue disposed between the rib cage and a front leg of the carcass.

In the illustrated example embodiment of FIG. 29, the driven gear 2221 comprises a set of involute spur gear teeth 2222 extending from the outer wall 2213 for rotatably driving the blade 2210 about its central axis of rotation R. The annular rotary knife blade 2210 is an annular structure defining the annular body 2211 that is generally cylindrical and tapered from the driven gear 2221 to the smaller diameter blade section 2260. The inner wall 2212 of the rotary knife blade 2210 defines an interior region 2228 and a throughbore 2229 (seen, for example, in FIG. 29) extending through the blade 2280 and longitudinally centered about the axis of rotation R. In the region of the driven gear 2221, the inner and outer walls 2212, 2213 both have a reduction in diameter. The outer diameter of the lower spacer section 2240a is larger than an outer diameter of the upper spacer section 2240b adjacent the driven gear 2221. Similarly, the inner diameter of the lower spacer section 2240a is larger than an inner diameter of the upper spacer section 2240b. A tapered necked down region 2237 of the inner wall 2212 extends between the inner diameter of the lower spacer section 2240a and the inner diameter of the upper spacer section 2240b. Except for the discontinuities in the outer wall 2213 of the blade annular body 2211 in the regions of the driven gear 2221 and the first and second lands 2225a, 2225b; the inner and outer walls 2212, 2213 are generally parallel.

In the one exemplary embodiment of the annular rotary knife blade 2210 and as best seen in FIG. 29, an overall axial length AL of the rotary knife blade is approximately 4.65 in. and an axial bearing distance BD between a lower extent of the lower radial bearing surface 2234a (adjacent the lower or proximal end 2214 of the blade 2210) defined by the lower cylindrical surface 2226a and an upper extent of the upper radial bearing surface 2234b defined by an upper or distal end of the upper cylindrical surface 2226b is approximately 2.20 in. In one exemplary embodiment, the axial bearing distance BD is approximately 47% of the overall axial length AL of the rotary knife blade 2210. The relatively large distance between the upper and lower radial bearing surface 2234b, 2234a advantageously provides for increased stability of the rotary knife blade 2210 with respect to the blade housing 2300 under radial load forces applied to the cutting edge 2218. The maximum outer diameter of the rotary knife blade 2210 is defined by a maximum outer diameter ODDS of the drive section 2220, that is the outer diameter in the region of the driven gear 2221, which in one exemplary embodiment is approximately 2.16 in.

In one exemplary embodiment, an axial length LDS of the drive section 2220 is approximately 0.18 in. In one exemplary embodiment, an axial length LDER of the distally extending region 2219, which includes the upper spacer section 2240b distal to the step 2227 and the blade section 2260, is approximately 2.25 in., while an axial length LLSS of the lower spacer section 2240a is approximately 0.98 in. In one exemplary embodiment, an outer diameter ODDER of the distally extending region 2219 is approximately 1.52 in. and an inner diameter IDCE defined by the cutting edge 218 is approximately 1.04 in.

Thus, in the rotary knife blade 2210 of the present disclosure, a maximum outer diameter ODDER of the spacer section 2240 is smaller than the maximum outer diameter ODDS of the blade 2210, as defined by the outer diameter for the driven gear 2221. In one exemplary embodiment, the maximum outer diameter ODDER of the distally extending region 2219 is less than or equal to 70% of the maximum outer diameter ODDS of rotary knife blade 2210. Advantageously, this reduced diameter configuration of the rotary knife blade 2210 maintains the mechanical advantage of having a larger diameter drive gear 2221 for purposes of more easily rotating the rotary knife blade 2210 with the pneumatic motor, while, at the same time, the smaller outer diameter of the distally extending region 2219 affords reduced blade drag and facilitates ease of manipulation of the blade 2210 when the blade is used for example for trimming or cutting operations in a narrow region of the abdominal cavity of a carcass to be trimmed.

As noted above, in one exemplary embodiment of the rotary knife blade 2210, the axial length LDER of the distally extending region 2219, comprising the spacer section 2240b above the step 2227 and the blade section 2260, is approximately 2.25 in., while the overall axial length AL of the rotary knife blade 2210 is 4.65 in. Accordingly, in one exemplary embodiment, the distally-extending or forwardly-extending, reduced outer diameter distally extending region 2219 comprises or accounts for approximately 48% of the overall axial length AL of the rotary knife blade 2210. Advantageously, this rotary knife blade configuration, which has the reduced outer diameter, forwardly extending region 2219 accounting for approximately 48% of the total axial extent AL of the blade 2210, facilitates ease of insertion and manipulation of the blade edge 2218 within narrow openings in a product. For example, the reduced outer diameter coupled with the large axial length (compared to the overall blade length) of the distally extending region 2219 of the rotary knife 2210 facilitates an operator of the power operated rotary knife 2000 manipulating the knife such that the distally extending region 2219 of the blade 2210 may be moved forward and inserted into a narrow portion or region of an abdominal cavity of a carcass for the purpose of trimming an internal pocket of fat tissue deep within the abdominal cavity, while the vacuum attachment assembly 2600 advantageously provides for vacuum removal and collection of the trimmed pieces of fat tissue as they are trimmed without the necessity of the operator picking up or otherwise collecting the trimmed pieces of fat tissue.

Affixed to and rotary with the rotary knife blade 2210 is the shroud 2265 which is secured to the rotating blade 2210 by a pair of set screws 2226 which extend through threaded apertures in the shroud 2265 and bear against the outer wall 2213 of the blade 2210. The shroud 2265 includes an internal o-ring 2267 which engages and seals against the outer wall 2213 of the blade 2210. Advantageously, the shroud 2265 mitigates the ingress of debris, e.g., small pieces of cut material, bone fragments, blood, gristle, etc. into a clearance region between the outer wall 2213 of the blade 2210 and the upper end 2385b of the upper section 2300b of the blade housing 2300. If such debris working their way into the upper bearing region 2230b of the rotary knife blade 2210 and the upper bearing region 2320b of the upper section 2300b of the blade housing 2300, such debris could impinge the bearing interface causing undesirable heating, melting of fat debris resulting in a gummy mixture degrading performance of the power operated rotary knife 2000, and/or resulting premature wear of the blade 2210 and/or blade housing 2300 and/or components of the drive train 2550.

One of skill in the art will understand and appreciate that the dimensions and configuration of the rotary knife blade 2210 may vary depending on the cutting/trimming applications that the rotary knife blade 2210 is contemplated for use in connection with. The foregoing dimensions and specific configuration of the rotary knife blade 2210 is by way of example, without limitation, and the present disclosure contemplates other dimensions and configurations of the rotary knife blade 2210 depending on the specific cutting and trimming applications. For example, and without limitation, the blade section 2260 is a so-called hook style blade. Depending on the cutting or trimming task, other blade styles may be advantageously employed, for example, a flat style blade or a straight style blade.

Two Part Rotary Knife Blade 2270

In the illustrated exemplary embodiment of FIG. 29, the annular rotary knife blade 2210 of the present disclosure is a two-part annular rotary knife blade 2270 including a proximal carrier component or portion 2280 and a blade component or portion 2290 which are releasably connected via a threaded engagement. The blade component or portion 2290 and the connection mechanism of the blade component or portion 2290 to the carrier component or portion 2280 of the two-part annular rotary knife blade 2270 of the power operated rotary knife 2000 is similar in structure and function to the two-part annular rotary knife blade 270 of the power operated rotary knife 100 of the first exemplary embodiment. For brevity, reference is made to the description of the power operated rotary knife 100 for details of the two-part annular rotary knife blade 2270 of the power operated rotary knife 2000. Again, one of skill in the art will understand that the dimensions and configuration of an exemplary embodiment of the rotary knife blade 2210, as stated above and as shown in the FIG. 24, may vary depending on the cutting/trimming applications that the rotary knife 2000 will be used for. Additionally, the rotary knife blade 2210 may be fabricated as a one-piece or one-part blade.

Blade Housing 2300

As can best be seen in FIGS. 23-25, 27-28, 30-31 and 32-41, the blade housing 2300 is a generally cylindrical blade housing having an inner wall 2312 defining the interior region 2301 and a radially spaced apart outer wall 2313. Further, the blade housing 2300 includes the proximal end 2306 and an axially spaced apart distal end 2308. A throughbore 2370 extends through the blade housing 2300 from the proximal end 2306 to the distal end 2308. In one exemplary embodiment, the blade housing 2300 includes an upper section 2300a and the lower section 2300b. The blade housing 2300 extends from the frame 2400, wherein the frame 2400 secures the blade housing to the handle assembly 2110. Specifically, the lower section 2300a of the blade housing 2300 extends laterally with respect to the handle assembly longitudinal axis LA from the interface region 2495a of the lower frame section 2400a, while the upper section 2300b of the blade housing 2300 extends laterally with respect to the handle assembly longitudinal axis LA from the interface region 2495b of the upper frame section 2400b.

In the illustrated embodiment of FIG. 28, the blade housing 2300 encircles a portion of the outer wall 2313 of the rotary knife blade annular body 2211 and supports the annular rotary knife blade 2210 as it rotates about the blade central axis of rotation R. More specifically, the lower section 2300b of the blade housing 2300 encircles the first lower spacer section 2240a of the rotary knife blade 2210 extending approximately from the proximal end 2214 of the annular body 2211 to a lower radial surface of the driven gear 2221. The upper section 2300a of the blade housing 2300 encircles: a) the driven gear 2221; b) a region of the second upper spacer section 2240b extending from the driven gear 2211 to an upper end of the thickened cylindrical surface 2226b of the outer wall 2313 above the second distal land 2225b and below the step 2227. As best seen in the illustrated embodiment of FIGS. 32-35, the upper section 2300b of the blade housing 2300 comprises an upper portion 2333b and a lower portion 2333a (FIG. 33). The lower portion 2333a of the upper section 2300b of the blade housing 2300 includes a circumferentially extending recess 2334 (FIGS. 34 and 35) providing clearance for the driven gear 2221 of the annular body 2211 of the rotary knife blade 2210. The lower portion 2233a of the upper section 2300b of the blade housing 2300 also includes a circumferential clearance gap 2390. The circumferential clearance gap 2390 is an extension of the circumferential clearance gap 2483 of the recessed region 2482 of the downward facing side 2481 of the central region 2495d of the upper frame section 2400b. The respective circumferential clearance gaps 2390, 2483 provide clearance for the gear head 2551 of the pinion gear 2552 to interact and mesh with a plurality of gear teeth 2222 of the driven gear 2221 to operatively engage and rotatably drive the driven gear 2221 of the rotary knife blade 2210. The upper portion 2333b of the upper section 2300a of the blade housing 2300 supports the second upper bearing member 2341b and overlies and encircles a portion of the second upper spacer section 2240b of the rotary knife blade 2210 distal to or axially above the knife blade driven gear 2221, as described above.

In the illustrated example embodiments of FIGS. 23-25 and 27-28, the blade housing 2300 includes a bearing assembly 2341 rotationally supporting the rotary knife blade 2210 for rotation about the central axis of rotation R. In one example embodiment, the bearing assembly 2341 includes a first bearing member 2341a and a second bearing member 2341b, spaced axially apart. The first and second bearing member 2341a, 2341b are generally rectangular in cross section and are continuous around the entire 360° of the outer wall 2313 of the rotary knife blade 2210 and the inner wall 2312 of the blade housing 2300.

The first proximal bearing member 2341a of the bearing assembly 2341 of the blade housing 2300 is disposed in and supported by the first, lower blade housing section 2300a. In one exemplary embodiment, the proximal bearing member 2341a is press fit into the proximal or lower end 2375a of the lower blade housing section 2300a. The first bearing member 2341a is bottomed out against a radially inwardly extending annular ledge 2335 (FIG. 28) of the proximal or lower end 2375a of the lower blade housing section 2300a. The first proximal bearing member 2341a is advantageously spaced axially below the driven gear 2221 of the annular body 2211 of the rotary knife blade 2210. The first bearing member 2341a of the bearing assembly 2341 provides two bearing surfaces that support the blade 2210 for rotation: a) an upper surface of the first bearing member 2341a defines a thrust bearing surface 2342a that bears against the lower thrust bearing surface 2233a of the proximal or lower land 2225a of the rotary knife blade 2210; and b) an inner surface of the first bearing member 2341a defines a radial bearing surface 2343a that bears against the radial bearing surface 2234a of the blade cylindrical surface 2226a of the blade outer wall 2213. The bearing engagement of the respective thrust bearing surfaces 2342a, 2233a define a first or lower rotational plane RP1 (FIGS. 28 & 29) for the rotary knife blade 2210, the lower rotational plane RP1 being substantially orthogonal to the blade axis of rotation R.

The second distal bearing member 2341b of the bearing assembly 2341 of the blade housing 2300 is disposed in and supported by the second, upper blade housing section 2300b of the blade housing 2300. In one exemplary embodiment, the distal bearing member 2341b is press fit into the distal or upper end 2385b of the upper blade housing section 2300b. The second bearing member 2341b is bottomed out against a radially inwardly extending annular ledge 2336 of the upper end 2385a of the upper blade housing section 2300b. The second distal bearing member 2341b is advantageously spaced axially above the driven gear 2221 of the annular body 2211 of the rotary knife blade 2210. The second bearing member 2341b of the bearing assembly 2341 provides two bearing surfaces that support the blade 2210 for rotation: a) a lower surface of the second bearing member 2341b defines a thrust bearing surface 2342b that bears against the upper thrust bearing surface 2233b of the distal or upper land 2225b of the rotary knife blade 2210; and b) an inner surface of the second bearing member 2341b defines a radial bearing surface 2343b that bears against the radial bearing surface 2234b of the blade cylindrical surface 2226b of the blade outer wall 2213. The bearing engagement of the respective thrust bearing surfaces 2342b, 2233b define a second or upper rotational plane RP2 (FIGS. 28 & 29) for the rotary knife blade 2210, the upper rotational plane RP2 also being substantially orthogonal to the blade axis of rotation R.

The first and second bearing members 2341a, 2341b of the bearing assembly 2341 support the rotary knife blade 2210 for rotation. The bearing members 2341a, 2341b, being press fit into the blade housing sections 2300a, 2300b, do not rotate and advantageously define the pair of axially spaced apart rotational planes RP1, RP2 for rotational support of the rotary knife blade 2210. However, as would be understood by one of skill in the art, the requirements of operating or running clearance and machining/fabrication tolerance and tolerance stacking issues require that the bearing interface structure 2299 of the power operated rotary knife 2000 be configured to permit the rotary knife blade 2210 have some limited radial and axial clearance or movement with respect to the stationary first and second bearing members 2341a, 2341b. Thus, the axial distance between the first and second bearing members 2341a, 2341b is such that the rotary knife blade 2210 will have limited axial movement between the members 2341a, 2341b depending on the load conditions/loading forces applied to the blade 2210. Additionally, the blade 2210 will have similarly have limited radial movement between the radial bearing surfaces of the first and second bearing members 2341a, 2341b. Accordingly, under any given blade load condition, the thrust and radial bearing surfaces 2233a, 2233b, 2234a, 2234b of the blade 2210 will not be in simultaneous bearing contact with all of the mating thrust and bearing surfaces 2342a, 2342b, 2343a, 2342b of the first and second bearing members 2341a, 2341b. Rather, specific regions and areas of bearing contact between the mating bearing surfaces of the rotary knife blade 2210 and the bearing members 2341a, 2341b will change dynamically as blade load conditions change. As would be understood by one of skill in the art, operating or running clearances allow the rotary knife blade 2210 to freely spin or rotate about its central axis of rotation R without undue friction and generated heat.

The upper central body 2401a comprises a cover for the pinion gear 2552. The first laterally extending interface region 2427 includes a first pair of axially extending threaded openings 2446a and the second laterally extending interface region 2423 includes a second pair of axially extending threaded openings 2446b, that when the upper and lower sections 2400a, 2400b of the frame 2400 are assembled into the frame 2400 axially align to comprise a pair of axially extending threaded openings 2446. As shown in the illustrated example embodiment of FIG. 14, a pair of threaded fasteners 2486 extend through the pair of axially extending threaded openings 2446 openings to secure the first section 2400a of the frame 2400 to the second section 2400b of the frame 2400.

The rotary knife blade 2210 can be removed from the blade housing 2300 by: a) loosing the set screws 2326 of the shroud 2265 and moving the shroud 2265 axially along the blade annular body 2211 in the distal direction D until the shroud 2325 clears the distal end 2216 of the rotary knife blade 2210; and 2) loosening the pair of fasteners 2486 such that the upper and lower frame sections 2400a, 2400b can be axially separated and then moving upper frame section 2400a distally until the lower end 2375b of the upper blade housing section 2300a clears the distal end 2216 of the rotary knife blade 2210. The blade 2210 can then be lifted distally or upwardly away from the lower blade housing section 2300a.

If the rotary knife blade 2210 is the two-part rotary knife blade 2270, as described above, and it is only necessary to replace the blade component 2290 of the rotary knife blade 2210, the blade component 2290 may be unthreaded from the carrier component 2280 and a new blade component 2290 threaded onto the carrier component 2280 which the necessity of removing the carrier component 2280 from the blade housing 2300 or removing the shroud 2325 from the knife blade annular body 2211. Typically, the expected useful lives of the other components of the power operated rotary knife 2000, including the blade housing 2300 and the vacuum adapter 2610, are much greater than the useful life of the rotary knife blade 2210, thus, it is expected that the rotary knife blade 2210 will be replaced many times during the lifetime of the power operated rotary knife 2100. Thus, easy removal and replacement of the rotary knife blade 2210 is beneficial and time saving.

Vacuum Attachment Assembly 2600

As can best be seen in FIGS. 14, 19-20 and 23, the vacuum attachment assembly 2600 includes the vacuum adapter 2610, the hose bracket 2650 and the vacuum hose 2680. The vacuum hose 2680 and hose clamp 2640 of the vacuum attachment assembly 2600 of the power operated rotary knife 2000 are similar in structure and function to the vacuum hose 680 and hose clamp 640 of the vacuum attachment assembly 600 of the power operated rotary knife 100 of the first exemplary embodiment. For brevity, reference is made to the description of the power operated rotary knife 100 for details of the vacuum hose 2680 and hose clamp 2640 of the power operated rotary knife 2000.

The vacuum adapter 2610 includes a generally cylindrical, proximal body 2612 and the generally planar annular boss 2610. The annular boss 2614 extends along a generally horizontal annular body plane ABP (FIG. 20) that is substantially orthogonal to the blade central axis of rotation R and the handle assembly longitudinal axis LA and substantially parallel to the blade cutting plane CP. An upper portion 2612b of the proximal body 2612 extends at an angle away from the annular boss 2610a. The annular boss 2610 has a larger outer diameter than the proximal body 2612. As best seen in the illustrated example embodiment of FIG. 20, the throughbore 2611 extends between a first proximal end 2620 and a second distal end 2622 of the vacuum adapter 2610 and defines the interior region 2639 of the adapter 2610. The throughbore 2611 also defines a central axis ACA of the adapter 2610.

The proximal body 2612 of the vacuum adapter 2610 has the general shape of an elongated cylinder having an approximately 45° bend intermediate the proximal and distal ends 2620, 2622. The upper portion 2612b of the proximal body 2612 is adjacent the annular boss 2614 while the lower portion 2612b of the proximal body is spaced from the annular boss 2614. The annular boss 2614 includes a circular central opening 2614 defined by a central region 2614b (FIG. 23) of the boss 2614. The central opening 2614 of the boss 2614 is aligned with and is part of the throughbore 2611 of the vacuum adapter 2610. The boss 2614 further includes the radially extending tongue 2615. The tongue 2615 includes the pair of threaded openings 2619 through which the pair of threaded fasteners 2633 extend and thread into corresponding, aligned threaded openings 2447 of the interface region 2495a of the first lower section 2400a of the frame 2400 to secure the vacuum adapter 2610 to the frame 2400. A radial extending wall 2616 of the annular boss 2610a includes a recessed cutout 2618. The cutout 2618 is configures to snugly receive an outer arcuate surface of the central cylindrical body 2401a of the lower section 2400a of the frame 2400 to provide a sure alignment of the respective threaded openings 2619, 2447 of the boss 2614 of the vacuum adapter 2610 and the lower section 2400a of the frame 2400. The pair of vacuum threaded fasteners 2633 are captured in the threaded openings 2619 of the annular boss 2614 of the vacuum adapter 2610. The fasteners 2633 are configured with enlarged threaded portions such that the fasteners 2633 do not fall out of the threaded openings 2619 of the adapter annular boss 2614 when the fasteners 2633 are unscrewed or unthreaded from the respective pair of threaded openings 2447 of the interface region 2495a of the lower section 2400a of the frame 2400.

The proximal end 2620 of the vacuum adapter 2610 defines a sleeve that receives an end portion 2682 of the flexible vacuum hose 2680. As noted previously, in the upper portion 2612b of the proximal body 2612, the central axis ACA of the vacuum adapter 2610 is angled away from the handle assembly longitudinal axis LA and the blade axis of rotation R to provide clearance between the vacuum hose 2680 and the operator's hand, while at the same time addressing the need to keep the front profile of the power operated rotary knife 2100 as small as possible given the need for the power operated rotary knife 2000 to be inserted into and manipulated in narrow body cavities, such as abdominal cavities of carcasses, and the like. The front profile of the rotary knife 2100, the boundaries of which are shown schematically by dimensions FP1, FP2 in FIG. 18, may be viewed as an approximate total frontage area or area effectively occupied by the power operated rotary knife 2100 when looking in a proximal direction P toward the distal end 2101 of the knife 2100 along a line of the axis of rotation R.

As best seen in FIG. 14, the hose bracket 2650 functions to fix the position of the proximal portion 2612a of the body 2612 of the vacuum adapter 2610 a fixed distance away from the handle assembly 2110 such that the vacuum adapter 2610 does not interfere with the operator's hand as the operator grips and manipulates the handle assembly 2110, while, at the same time, maintains the proximal portion 2612a of the body 2612 of the vacuum adapter 2610 in a generally parallel direction with respect to the handle assembly longitudinal axis LA and the rotary knife blade axis of rotation R. That is, as best seen in FIG. 20, in the region of the proximal portion 2612a of the body 2612, the central axis ACA of the vacuum adapter 2610 is substantially parallel to the handle assembly longitudinal axis LA and the blade central axis of rotation R. In this way, the vacuum adapter 2610 does not hinder manipulation of the power operated rotary knife 2000 by the operator and, at the same time, provides as small a possible front profile FP (FIG. 18) for the knife 2000. The vacuum adapter 2610 is supported by the hose bracket 2650 that includes a cylindrical sleeve 2652 and a collar 2654 which are connected by a brace 2656. The brace 2656 functions to space apart and offset the cylindrical sleeve from the collar 2654 laterally. The vacuum adapter 2610 extends through the sleeve 2652 and the collar 2654 fits over the handle assembly 2110.

As shown in the illustrated embodiment of FIG. 20, the vacuum hose 2680 is in fluid communication with the throughbore 2611 and the interior region 2639 of the vacuum adapter 2610 which are in fluid communication with the interior region 2301 of the lower portion 2300b of the blade housing 2300 which is in fluid communication with the throughbore 2229 and interior region 2228 of the rotary knife blade 2210. Accordingly, when the vacuum attachment assembly 2600 is assembled to the blade housing 2300 via the frame 2400 and the rotary knife blade 2210 is assembled to the blade housing 2300 and a vacuum pump (not shown) is actuated to draw a vacuum pressure in the vacuum hose 2680, because of the fluid communication between the vacuum attachment assembly 2600, the blade housing 2300 and the rotary knife blade 2210 of the head assembly 2200, vacuum pressure will be present in the interior region 2228 and the throughbore 2229 of the rotary knife blade 2210. Thus, cut or trimmed product (removed material), cut by the cutting edge 2218 of the blade 2210 will be pulled or routed by the vacuum pressure in a proximal or rearward direction though the aligned throughbores 2229, 2611, and, ultimately, routed through the vacuum hose 2680 where the removed material is collected in a canister (not shown) for further processing, inspection, grading, packaging, or disposal, depending on the nature of the removed material.

Advantageously, as best seen in FIG. 20, the central axis of rotation R of the rotary knife blade 2210 is radially offset by a radial offset distance RO from and substantially parallel to the longitudinal axis LA of handle assembly 2110. The radially offset and parallel configuration between the rotary knife blade 2210 and the handle assembly 2110 allows the vacuum adapter 2610 of the vacuum attachment assembly 2600 to be directly coupled to the lower end 2306 of the blade housing 2300 and further allows a general extent or longitudinal axis VHA of a vacuum hose 2680 of the vacuum attachment assembly 2610 in a region of a hose bracket 2650 to be substantially parallel to the handle assembly longitudinal axis LA and the axis of rotation R of the rotary knife blade 2210 for efficient extraction of cut or trimmed material (removed material) by the vacuum attachment assembly 2600. Additionally, the adapter 2610 of the vacuum attachment assembly 2600 is angled away from the handle assembly 2110 to provide clearance for the operator's fingers as he or she grips the handle assembly 2110 and manipulates the power operated rotary knife 2000. The adapter 2610 defines an adapter central axis ACA which substantially intersects both the handle assembly longitudinal axis LA and the rotary knife blade axis of rotation R. In one exemplary embodiment, an offset angle OA1 between the adapter central axis ACA in the region of the upper portion 2612b of the vacuum adapter body 2612 and the handle assembly longitudinal axis LA is approximately 45° and, similarly, the offset angle OA2 between the adapter central axis ACA in the region of the upper portion 2612b of the vacuum adapter body 2612 and the blade axis of rotation R is 45°. Of course, in the lower portion 2612a of the vacuum adapter body 2612, the adapter central axis ACA is substantially parallel to and radially offset from both the handle assembly longitudinal axis LA and the blade central axis of rotation R.

In one exemplary embodiment of the power operated rotary knife 2100, the frame 2400 of the head assembly 2200 may be fabricated of aluminum or stainless steel or other material or materials known to have comparable properties and may be formed/shaped by casting and/or machining. The blade and blade housing 2400 may be fabricated of a hardenable grade of alloy steel or a hardenable grade of stainless steel, or other material or materials known to have comparable properties and may be formed/shaped by machining, forming, casting, forging, extrusion, metal injection molding, and/or electrical discharge machining or another suitable process or combination of processes. The vacuum adapter 2610 of the vacuum attachment assembly 2600 may be fabricated of aluminum or steel.

As used herein, terms of orientation and/or direction such as front, rear, forward, rearward, distal, proximal, distally, proximally, upper, lower, inward, outward, inwardly, outwardly, horizontal, horizontally, vertical, vertically, axial, radial, longitudinal, axially, radially, longitudinally, etc., are provided for convenience purposes and relate generally to the orientation shown in the figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A power operated rotary knife comprising:
an elongated handle assembly including a throughbore and a handle assembly longitudinal axis extending through the throughbore;
a head assembly coupled to and extending from a distal end of the handle assembly, the head assembly including:
   a rotary knife blade supported by a blade housing for rotation about a central axis of rotation, the rotary knife blade including:
      an annular body having an inner wall and a radially spaced apart outer wall, the inner wall defining a central open region extending from a first end to a spaced apart second end of the annular body;
      the outer wall of the annular body including a drive section disposed intermediate the first and second ends of the annular body, the drive section including a driven gear axially spaced from the first and second ends of the annular body; and
      a blade section adjacent the second end of the annular body;
   a blade housing including an upper section and a lower section, the blade housing encircling an axially extending portion of the annular body of the rotary knife blade adjacent the driven gear of the annular body of the rotary knife blade; and
   a frame having a first section and a second section, the first section of the frame including a central body and a laterally extending interface region, the lower section of the blade housing extending from the interface region of the first section, the second section of the frame including a central body and a laterally extending interface region, the upper section of the blade housing extending from the interface region of the second section, the handle assembly secured to the frame, the blade housing being positioned radially offset from the handle assembly such that the central axis of rotation of the rotary knife blade is spaced apart from the handle assembly longitudinal axis; and
a vacuum attachment assembly coupled to the frame.

2. The power operated rotary knife of claim 1 wherein the blade housing includes a bearing assembly rotatably supporting the rotary knife blade for rotation about the central axis of rotation, the bearing assembly including a first bearing member and a second bearing member, spaced axially apart, the first bearing member disposed in the lower section of the blade housing and spaced axially below the driven gear of the annular body of the rotary knife blade and the second bearing member disposed in the upper section of the blade housing and spaced axially above the driven gear of the annular body of the rotary knife blade.

3. The power operated rotary knife of claim 2 wherein the first bearing member bears against a first land extending radially from the outer wall of the annular body of the rotary knife blade to inhibit downward axial movement of the rotary knife blade and the second bearing member bears against a second land extending radially from the outer wall of the annular body of the rotary knife blade to inhibit upward axial movement of the rotary knife blade.

4. The power operated rotary knife of claim 1 wherein the lower section of the blade housing encircles an axially extending first portion of the annular body of the rotary knife blade axially below the driven gear and the upper section of the blade housing encircles an axially extending second portion of the annular body of the rotary knife blade axially above the driven gear.

5. The power operated rotary knife of claim 1 wherein the driven gear extends radially outwardly with respect to axially extending portions of the annular body of the rotary knife blade axially above and below the driven gear.

6. The power operated rotary knife of claim 1 wherein a lower portion of the upper section of the blade housing includes a circumferentially extending recess providing clearance for the driven gear of the rotary knife blade.

7. The power operated rotary knife of claim 1 wherein the central body of the first section of the frame is secured to a distal end of the handle assembly and includes a throughbore, the longitudinal axis of the handle assembly extending through the throughbore of the central body and being in fluid communication with the throughbore of the handle assembly.

8. The power operated rotary knife of claim 1 wherein the first section and second sections of the frame are secured by a fastener extending through the first and second sections of the frame.

9. The power operated rotary knife of claim 1 wherein the blade housing is radially offset from the handle assembly longitudinal axis such that the central axis of rotation of the rotary knife blade is substantially parallel to the handle assembly longitudinal axis.

10. The power operated rotary knife of claim 1 wherein the vacuum attachment assembly includes a vacuum adapter secured to the first section of the frame, a central open region of the vacuum adapter being in fluid communication with the central open region of the annular body of the rotary knife blade and the vacuum adapter extends at an angle away from the handle housing such that a central axis of the vacuum adapter in a region of the vacuum adapter adjacent the second section of the frame and is transverse to the central axis of rotation of the rotary knife blade and the handle assembly longitudinal axis.

11. A power operated rotary knife comprising:
an elongated handle assembly including a throughbore and a handle assembly longitudinal axis extending through the throughbore;
a head assembly coupled to and extending from a distal end of the handle assembly, the head assembly including:
   a rotary knife blade supported by a blade housing for rotation about a central axis of rotation, the rotary knife blade including:
      an annular body having a central open region extending from a first end to a spaced apart second end of the annular body;
      a drive section including a driven gear extending from the outer wall of the annular body, the driven gear being axially spaced from the first and second ends of the annular body; and
      a cutting edge of the rotary knife blade at the second end of the annular body;
   the blade housing including an upper section and a lower section, the blade housing encircling an axially extending portion of the annular body of the rotary knife blade adjacent the driven gear of the annular body of the rotary knife blade, wherein the blade housing includes a bearing assembly rotatably supporting the rotary knife blade for rotation about the central axis of rotation; and a frame having a first section and a second section, the first section of the frame including a central body and a laterally extending interface region, the lower section of the blade housing extending from the first section interface region, the second section of the frame including a central body and a laterally extending interface region, the upper section of the blade housing extending from the second section interface region, the blade housing positioned radially offset from the handle housing such that the central axis of rotation of the rotary knife blade is spaced apart from the handle assembly longitudinal axis; and a vacuum attachment assembly coupled to the frame.

12. The power operated rotary knife of claim 11 wherein the blade housing includes a bearing assembly rotatably supporting the rotary knife blade for rotation about the central axis of rotation, the bearing assembly including a first bearing member and a second bearing member, spaced axially apart, the first bearing member disposed in the lower section of the blade housing and spaced axially below the driven gear of the annular body of the rotary knife blade and the second bearing member disposed in the upper section of the blade housing and spaced axially above the driven gear of the annular body of the rotary knife blade.

13. The power operated rotary knife of claim 12 wherein the first bearing member bears against a first land extending radially from the outer wall of the annular body of the rotary knife blade to inhibit downward axial movement of the rotary knife blade and the second bearing member bears against a second land extending radially from the outer wall of the annular body of the rotary knife blade to inhibit upward axial movement of the rotary knife blade.

14. The power operated rotary knife of claim 11 wherein the lower section of the blade housing encircles an axially extending first portion of the annular body of the rotary knife blade axially below the driven gear and the upper section of the blade housing encircles an axially extending second portion of the annular body of the rotary knife blade axially above the driven gear.

15. The power operated rotary knife of claim 11 wherein the driven gear extends radially outwardly with respect to axially extending portions of the annular body of the rotary knife blade axially above and below the driven gear.

16. The power operated rotary knife of claim 11 wherein a lower portion of the upper section of the blade housing includes a circumferentially extending recess providing clearance for the driven gear of the rotary knife blade.

17. The power operated rotary knife of claim 11 wherein the central body of the first section of the frame is secured to a distal end of the handle assembly and includes a throughbore, the longitudinal axis of the handle assembly extending through the throughbore of the central body and being in fluid communication with the throughbore of the handle assembly.

18. The power operated rotary knife of claim 11 wherein the first section and second sections of the frame are secured by a fastener extending through the first and second sections of the frame.

19. The power operated rotary knife of claim 11 wherein the blade housing is radially offset from the handle assembly longitudinal axis such that the central axis of rotation of the rotary knife blade is substantially parallel to the handle assembly longitudinal axis.

20. The power operated rotary knife of claim 11 wherein the vacuum attachment assembly includes a vacuum adapter secured to the first section of the frame, a central open region of the vacuum adapter being in fluid communication with the central open region of the annular body of the rotary knife blade, the vacuum adapter extending at an angle away from the handle housing such that a central axis of the vacuum adapter in a region of the vacuum adapter adjacent the second section of the frame and is transverse to the central axis of rotation of the rotary knife blade and the handle assembly longitudinal axis.

21. A power operated rotary knife comprising:
a handle assembly including an elongated cylindrical handle housing defining a handle assembly longitudinal axis extending through a throughbore in the handle housing;
a head assembly coupled to and extending from a distal end of the handle assembly, the head assembly including:
a rotary knife blade supported by a blade housing for rotation about a central axis of rotation, the rotary knife blade including:
an annular body having an inner wall and a radially spaced apart outer wall, the inner wall defining a central open region extending from a first end to a spaced apart second end of the annular body;
a driven gear formed in the outer wall of the annular body and axially spaced from the first and second ends of the annular body; and
a blade section adjacent the second end of the annular body;
the blade housing including an upper section and a lower section, the blade housing encircling an axially extending portion of the annular body of the rotary knife blade adjacent the driven gear of the annular body of the rotary knife blade, wherein the blade housing includes a bearing assembly rotatably supporting the rotary knife blade for rotation about the central axis of rotation, the bearing assembly including a first bearing member and a second bearing member, spaced axially apart, the first bearing member disposed in the lower section of the blade housing and spaced axially below the driven gear of the annular body of the rotary knife blade and the second bearing member disposed in the upper section of the blade housing and spaced axially above the driven gear of the rotary knife blade; and
a frame having a first section and a second section, the first section of the frame including a central body and a laterally extending interface region, the upper section of the blade housing extending from the first section interface region, the second section of the frame including a central body and a laterally extending interface region, the lower section of the blade housing extending from the second section interface region; and
a vacuum attachment assembly coupled to the frame.

22. The power operated rotary knife of claim 21 wherein the blade housing is radially offset from the handle assembly longitudinal axis such that the central axis of rotation of the rotary knife blade is substantially parallel to the handle assembly longitudinal axis.

23. The power operated rotary knife of claim 21 wherein the first bearing member bears against a first land extending radially from the outer wall of the annular body of the rotary knife blade to inhibit downward axial movement of the rotary knife blade and the second bearing member bears against a second land extending radially from the outer wall of the annular body of the rotary knife blade to inhibit upward axial movement of the rotary knife blade.

24. The power operated rotary knife of claim 21 wherein the lower section of the blade housing encircles an axially extending first portion of the annular body of the rotary knife blade axially below the driven gear and the upper section of the blade housing encircles an axially extending second portion of the annular body of the rotary knife blade axially above the driven gear.

25. The power operated rotary knife of claim 21 wherein the driven gear extends radially outwardly with respect to axially extending portions of the annular body of the rotary knife blade axially above and below the driven gear.

26. An annular knife blade for rotation about a central axis of rotation in a power operated rotary knife, the annular knife blade comprising:
an annular body having an inner wall and a radially spaced apart outer wall, the inner wall defining a central open region extending from a first end to a spaced apart second end of the annular body;
the outer wall of the annular body including a drive section disposed intermediate the first and second ends of the annular body, the drive section including a driven gear extending radially outwardly from an extent of the outer wall axially above and below the driven gear, the driven gear axially spaced from the first and second ends of the annular body;
the outer wall of the annular body including a first annular land extending radially outwardly from an extent of the outer wall axially above and below the first annular land, the first annular land disposed between the first end of the annular body and the driven gear and axially spaced from the driven gear and the first end of the annular body, a lower surface of the first annular land defining a first radially extending thrust bearing surface;
the outer wall of the annular body including a second annular land extending radially outwardly from an extent of the outer wall axially above and below the second annular land, the second annular land disposed between the second end of the annular body and the driven gear and axially spaced from the driven gear and the second end of the annular body, an upper surface of the first annular land defining a second radially extending thrust bearing surface;
the outer wall of the annular body including a first annular band disposed between the first annular land and the first end of the annular body, a radially outer surface of the first annular band defining a first radial bearing surface;
the outer wall of the annular body including a second annular band disposed between the second annular land and the second end of the annular body, a radially outer surface of the second annular band defining a second radial bearing surface; and
a blade section adjacent the second end of the annular body.

27. The annular rotary knife blade of claim 26 wherein the first annular band is adjacent the first end of the annular body.

28. The annular rotary knife blade of claim 26 wherein the first annular band the second annular band are of greater radial thickness, as defined by a radial distance between the inner and outer walls of the annular body, than a radial thickness of a region of the annular body axially disposed between the blade section and the second annular band.

29. The annular rotary knife blade of claim 26 wherein the rotary knife blade comprises a two part structure including a blade component releasably affixed to a carrier component, the blade component including the blade section and the carrier component including the driven gear, the first and second annular lands and the first and second annular bands.

30. The annular rotary knife blade of claim 29 wherein the rotary knife blade includes a threaded engagement between the blade component and the carrier component.

31. A power operated rotary knife comprising:
an elongated handle assembly;
a head assembly coupled to and extending from a distal end of the handle assembly, the head assembly including:
a rotary knife blade supported by a blade housing for rotation about a central axis of rotation, the rotary knife blade including:
an annular body having an inner wall and a radially spaced apart outer wall, the inner wall defining a central open. region extending from a first end to a spaced apart second end of the annular body;
the outer wall of the annular body including a driven gear; and
a blade section at the second end of the annular body;
a blade housing encircling an axially extending portion of the annular body of the rotary knife blade; and
a frame coupled to the handle assembly, the blade housing extending from the frame in a position radially offset from the handle assembly such that the central axis of rotation of the rotary knife blade is spaced apart from the handle assembly longitudinal axis.

32. The power operated rotary knife of claim 31 including a vacuum attachment assembly coupled to the frame.

33. The power operated rotary knife of claim 31 wherein the frame includes a first section and a second section and the blade housing includes an upper section extending from the second section of the frame and a lower section extending from the first section of the frame.

34. The power operated rotary knife of claim 33 wherein the rotary knife blade includes a driven gear formed in the outer wall of the annular body and axially spaced from the first and second ends of the annular body, the blade housing including a bearing assembly rotatably supporting the rotary knife blade for rotation about the central axis of rotation, the bearing assembly including a first bearing member and a second bearing member, spaced axially apart, the first bearing member disposed in the lower section of the blade housing and spaced axially below the driven gear of the annular body of the rotary knife blade and the second bearing member disposed in the upper section of the blade housing and spaced axially above the driven gear of the rotary knife blade.

35. The power operated rotary knife of claim 33 wherein the first section of the frame includes a central body and a laterally extending interface region, the lower section of the blade housing extending from the first section interface region and the second section of the frame includes a central body and a laterally extending interface region, the upper section of the blade housing extending from the second section interface region.

36. An annular knife blade for rotation about a central axis of rotation in a power operated rotary knife, the annular knife blade comprising:
an annular body having an inner wall and a radially spaced apart outer wall, the inner wall defining a central open region extending from a first end to a spaced apart second end of the annular body;

the outer wall of the annular body including a drive section disposed intermediate the first and second ends of the annular body, the drive section including a driven gear axially spaced from the first and second ends of the annular body;

the outer wall of the annular body including a first annular land disposed between. the first end of the annular body and the driven gear, a lower surface of the first annular land defining a first radially extending thrust bearing surface;

the outer wall of the annular body including a second annular land disposed between the second end of the annular body and the driven gear, an upper surface of the first annular land defining a second radially extending thrust bearing surface;

the outer wall of the annular body including a first radial bearing surface disposed between the first annular land and the first end of the annular body;

the outer wall of the annular body including a second radial bearing surface disposed between the second annular land and the second end of the annular body; and a blade section adjacent the second end of the annular body.

37. The annular knife blade of claim 36 wherein the driven gear extends radially outwardly from an extent of the outer wall axially above and below the driven gear, the first annular land is axially spaced from the driven gear and the second end of the annular body and extends radially outwardly from an extent of the outer wall axially above and below the first annular land, the second annular land is axially spaced from the driven gear and the second end of the annular body and extends radially outwardly from an extent of the outer wall axially above and below the second annular land and.

38. The annular knife blade of claim 37 wherein the outer wall of the annular body includes a first annular band and a radially outer surface of the first annular band defines the first radial bearing surface and the outer wall of the annular body includes a second annular band and a radially outer surface of the second annular band defines the second radial bearing surface.

* * * * *